(12) United States Patent
Hart et al.

(10) Patent No.: US 12,481,028 B2
(45) Date of Patent: Nov. 25, 2025

(54) HARDENED OPTICAL WINDOWS WITH ANTI-REFLECTIVE, REFLECTIVE, AND ABSORBING LAYERS FOR INFRARED SENSING SYSTEMS

(71) Applicant: CORNING INCORPORATED, Corning, NY (US)

(72) Inventors: Shandon Dee Hart, Elmira, NY (US); Karl William Koch, III, Elmira, NY (US); Carlo Anthony Kosik Williams, Painted Post, NY (US); Charles Andrew Paulson, Painted Post, NY (US); James Joseph Price, Corning, NY (US)

(73) Assignee: CORNING INCORPORATED, Corning, NY (US)

( * ) Notice: Subject to any disclaimer, the term of this patent is extended or adjusted under 35 U.S.C. 154(b) by 1028 days.

(21) Appl. No.: 17/616,056

(22) PCT Filed: Jun. 1, 2020

(86) PCT No.: PCT/US2020/035497
§ 371 (c)(1),
(2) Date: Dec. 2, 2021

(87) PCT Pub. No.: WO2020/247292
PCT Pub. Date: Dec. 10, 2020

(65) Prior Publication Data
US 2022/0299606 A1    Sep. 22, 2022

Related U.S. Application Data

(60) Provisional application No. 62/857,502, filed on Jun. 5, 2019.

(51) Int. Cl.
*G01S 7/481* (2006.01)
*G01S 17/931* (2020.01)
*G02B 5/02* (2006.01)

(52) U.S. Cl.
CPC .......... *G01S 7/4811* (2013.01); *G02B 5/0289* (2013.01); *G01S 17/931* (2020.01)

(58) Field of Classification Search
CPC .. G02B 1/11; G02B 1/14; G02B 1/115; G02B 5/281; G02B 5/208
(Continued)

(56) References Cited

U.S. PATENT DOCUMENTS 5,398,133 A     3/1995   Tsai et al.
8,300,313 B2 *  10/2012  Pradhan ................ G02B 5/283
                                              359/359
(Continued)

FOREIGN PATENT DOCUMENTS

CN    101369015 A    2/2009
CN    101809512 A    8/2010
(Continued)

OTHER PUBLICATIONS

Oliver et al., "An improved technique for determining hardness and elastic modulus using load and displacement sensing indentation experiements", J. Mater. Res., vol. 7, No. 6, 1992, pp. 1564-1583.
(Continued)

*Primary Examiner* — Bumsuk Won
*Assistant Examiner* — Seth D Moser
(74) *Attorney, Agent, or Firm* — Daniel J. Greenhalgh

(57) ABSTRACT

A window for a sensing system is provided. The window includes a substrate, a layered film disposed on a first surface of the substrate, the layered film including alternating layers of higher refractive index materials and lower refractive index materials, wherein the refractive index of the higher
(Continued)

refractive index materials is greater than the refractive index of the lower refractive index materials, and a maximum hardness, measured at the layered film and by the Berkovich Indenter Hardness Test, of at least 8 GPa. The window has: an average percentage transmittance of greater than 75% for electromagnetic radiation having a wavelength of 1550 nm at normal or near normal incidence; and an average percentage reflectance of less than 10% for electromagnetic radiation having a wavelength of 1550 nm at any angle of incidence within the range of 0° to 8°.

20 Claims, 31 Drawing Sheets

(58) Field of Classification Search
USPC .................................. 359/359, 586, 588, 589
See application file for complete search history.

(56) References Cited

U.S. PATENT DOCUMENTS

| | | |
|---|---|---|
| 8,619,021 B2 | 12/2013 | Hayton |
| 9,023,457 B2 | 5/2015 | Carrilero et al. |
| 9,079,802 B2 | 7/2015 | Bellman et al. |
| 9,140,534 B2 | 9/2015 | Manlay |
| 9,140,543 B1 | 9/2015 | Allan et al. |
| 9,335,444 B2 | 5/2016 | Hart et al. |
| 9,359,261 B2 | 6/2016 | Bellman et al. |
| 9,366,784 B2 | 6/2016 | Bellman et al. |
| 9,411,180 B2 | 8/2016 | Gollier et al. |
| 9,573,842 B2 | 2/2017 | Gollier et al. |
| 9,582,098 B2 | 2/2017 | Rosenberg et al. |
| 9,701,579 B2 | 7/2017 | Gollier et al. |
| 9,869,754 B1 | 1/2018 | Campbell et al. |
| 10,288,973 B1 | 5/2019 | Gupta et al. |
| 10,620,344 B2 | 4/2020 | Hart et al. |
| 10,919,473 B2 | 2/2021 | Bhatia et al. |
| 10,948,640 B2 | 3/2021 | Ockenfuss et al. |
| 11,267,973 B2* | 3/2022 | Amin .................... G02B 1/115 |
| 11,714,219 B2* | 8/2023 | Mu ........................ G01N 21/35 359/359 |
| 2005/0099678 A1* | 5/2005 | Wang .................... G02B 5/208 359/359 |
| 2014/0226145 A1* | 8/2014 | Steffey .................. G01S 17/89 356/4.01 |
| 2014/0335330 A1* | 11/2014 | Bellman ............... G02B 1/113 428/428 |
| 2014/0362444 A1* | 12/2014 | Paulson ................ G02B 1/115 359/586 |
| 2015/0015959 A1* | 1/2015 | Lee ....................... C23C 14/044 359/586 |
| 2015/0138638 A1* | 5/2015 | Mashimo ............... G02B 1/18 359/581 |
| 2015/0323705 A1* | 11/2015 | Hart ....................... G02B 1/18 359/601 |
| 2015/0355382 A1* | 12/2015 | Henn .................. C23C 14/0641 428/212 |
| 2016/0097885 A1* | 4/2016 | Comstock, II .......... C23C 14/35 359/359 |
| 2017/0160434 A1* | 6/2017 | Hart ........................ G02B 1/115 |
| 2018/0314368 A1 | 11/2018 | Isaacson et al. |
| 2018/0373913 A1 | 12/2018 | Panchawagh et al. |
| 2020/0247715 A1* | 8/2020 | Adib ....................... C03C 3/097 |
| 2020/0363329 A1* | 11/2020 | Okumura ................ G02B 5/26 |
| 2021/0063609 A1* | 3/2021 | Bellman .............. C03C 17/3435 |
| 2021/0130230 A1* | 5/2021 | Decker .................... G02B 1/14 |
| 2021/0132273 A1* | 5/2021 | Yamamoto ............. G02B 5/208 |
| 2021/0181382 A1 | 6/2021 | Gregorski et al. |
| 2022/0206201 A1 | 6/2022 | Sugihara et al. |
| 2022/0274368 A1 | 9/2022 | Burdette et al. |
| 2022/0299606 A1 | 9/2022 | Hart et al. |
| 2022/0317353 A1* | 10/2022 | Hart ....................... G02B 1/115 |
| 2023/0103350 A1* | 4/2023 | Takahoshi .............. G02B 5/281 359/359 |
| 2024/0377556 A1* | 11/2024 | Gonta ...................... G02B 1/11 |
| 2025/0020842 A1* | 1/2025 | Hart ....................... G02B 1/115 |
| 2025/0085459 A1* | 3/2025 | Hart ....................... G02B 5/281 |

FOREIGN PATENT DOCUMENTS

| | | |
|---|---|---|
| CN | 105593705 A | 5/2016 |
| CN | 110218006 A | 9/2019 |
| CN | 213210525 U | 5/2021 |
| EP | 2196870 A1 | 6/2010 |
| EP | 3663814 A1 | 6/2020 |
| WO | 2018/015312 A1 | 1/2018 |
| WO | 2019/027526 A2 | 2/2019 |
| WO | 2019/058834 A1 | 3/2019 |
| WO | 2020/247292 A1 | 12/2020 |
| WO | 2023/167837 A1 | 9/2023 |
| WO | 2024/015094 A2 | 1/2024 |

OTHER PUBLICATIONS

Oliver et al., "Measurement of Hardness and Elastic Modulus by Instrument Indentation: Advances in Understanding and Refinements to Methodology", J. Mater. Res., vol. 19, No. 1, 2004, pp. 3-20.
Williams, "Optimization of eyesafe avalanche photodiode lidar for automobile safety and autonomous navigation systems", Optical Engineering, vol. 56(3), 2017, 10 pages.
Maniyara, R. et al., "An antireflection transparent conductor with ultralow optical loss(<2%) and electrical resistance (<sq-1)", Nature Communications, vol. 7, (2016), 8 pages.
Chinese Patent Application No. 202080041379.4, Office Action dated Jan. 31, 2024, 5 pages (English Translation only), Chinese Patent Office.
International Search Report and Written Opinion of the International Searching Authority; PCT/US2020/035497; dated Sep. 22, 2019; 10 pages; European Patent Office.

* cited by examiner

HARDENED OPTICAL WINDOWS WITH ANTI-REFLECTIVE, REFLECTIVE, AND ABSORBING LAYERS FOR INFRARED SENSING SYSTEMS

CROSS-REFERENCE TO RELATED APPLICATIONS

This application claims the benefit of priority under 35 U.S.C. § 371 of International Application No. PCT/US2020/035497, filed on Jun. 1, 2020, which claims the benefit of priority under 35 U.S.C. § 119 of U.S. Provisional Application Ser. No. 62/857,502 filed on Jun. 5, 2019 the content of which are relied upon and incorporated herein by reference in their entirety.

BACKGROUND

Light detection and ranging ("LIDAR") systems include a laser and a sensor. The laser emits a laser beam, which may reflect off an object, and the sensor detects the reflected laser beam. The laser beams are pulsed or otherwise distributed across a radial range to detect objects across a field of view. Information about the object can be deciphered from the properties of the detected reflected laser beam. Distance of the object from the laser beam can be determined from the time of flight from emission of the laser beam to detection of the reflected laser beam. If the object is moving, path and velocity of the object can be determined from shifts in radial position of the emitted laser beam being reflected and detected as a function of time, as well as from Doppler frequency measurements.

LIDAR systems in automobiles, and other infrared sensing systems in exposed environments, such as aerospace or home security applications, need to be protected from the environment and various sources of damage, for example, with a covering lens or cover glass window. Vehicles are another potential application for LIDAR systems, with the LIDAR systems providing spatial mapping capability to enable assisted, semi-autonomous, or fully autonomous driving. In such applications, the laser emitter and sensor are mounted on the roof of the vehicle or on a low forward portion of the vehicle. Lasers emitting electromagnetic radiation having a wavelength outside the range of visible light, such as at 905 nm or 1550 nm are considered for vehicle LIDAR applications. To protect the laser and sensor from impact from rocks and other objects, a window is placed between the laser and sensor, and the external environment in the line of sight of the laser and sensor. A window is similarly placed between the laser/sensor and the external environment for other applications of the LIDAR system, such as aerospace and home security applications. However, there is a problem in that rocks and other objects impacting the window scratch and cause other types of damage to the window, which cause the window to scatter the emitted and reflected laser beams, thus impairing the effectiveness of the LIDAR system.

SUMMARY

The present disclosure solves that problem with a layered film for the window that includes one or more layers of material that provides hardness and scratch resistance to the window. Thus, rocks and other objects impacting the window are less likely to cause defects to the window that scatter the emitted and reflected electromagnetic radiation from the LIDAR sensor and, therefore, improves the performance thereof. In addition, the layered film further includes alternating layers of materials having different indices of refraction (including the material providing the hardness and scratch resistance), such that the number of alternating layers and their thicknesses can be configured so that the window has high transmissivity and low reflection of the 1550 nm wavelength (and surrounding wavelengths), as well as low transmissivity and high reflection of visible light wavelengths, if desired. Further, the layered film can include one or more layers that absorb visible light wavelengths, if desired.

According to an embodiment of the present disclosure, a window is provided. The window includes a substrate that includes a refractive index, a first surface, and a second surface, the first surface and the second surface being primary surfaces of the substrate, and a layered film disposed on the first surface of the substrate, the layered film including alternating layers of one or more higher refractive index materials and one or more lower refractive index materials, each of the one or more higher refractive index materials and the one or more lower refractive index materials having a refractive index, and the refractive index of the one or more higher refractive index materials being greater than the refractive index of the one or more lower refractive index materials, and a maximum hardness, measured at the layered film and by the Berkovich Indenter Hardness Test, of at least 8 GPa. The quantity, the thicknesses, and materials of the alternating layers of the layered film are configured so that the window has: an average percentage transmittance of greater than 75% for electromagnetic radiation having a wavelength of 1550 nm at normal or near normal incidence; and an average percentage reflectance of less than 10% for electromagnetic radiation having a wavelength of 1550 nm at any angle of incidence within the range of 0° to 8°.

According to an embodiment of the present disclosure, a LIDAR system is provided. The LIDAR system includes an electromagnetic radiation emitter and sensor that emits electromagnetic radiation having a wavelength of 1550 nm, and a window in the path of the electromagnetic radiation. The window includes a substrate that includes a refractive index, a first surface, and a second surface, the first surface and the second surface being primary surfaces of the substrate, and a layered film disposed on the first surface of the substrate, the layered film including alternating layers of one or more higher refractive index materials and one or more lower refractive index materials, each of the one or more higher refractive index materials and the one or more lower refractive index materials having a refractive index, and the refractive index of the one or more higher refractive index materials being greater than the refractive index of the one or more lower refractive index materials, and a maximum hardness, measured at the layered film and by the Berkovich Indenter Hardness Test, of at least 8 GPa. The quantity, the thicknesses, and materials of the alternating layers of the layered film are configured so that the window has: an average percentage transmittance of greater than 75% for electromagnetic radiation having a wavelength of 1550 nm at normal or near normal incidence; and an average percentage reflectance of less than 10% for electromagnetic radiation having a wavelength of 1550 nm at any angle of incidence within the range of 0° to 8°.

Additional features and advantages will be set forth in the detailed description which follows, and in part will be readily apparent to those skilled in the art from that description or recognized by practicing the embodiments as described herein, including the detailed description which follows, the claims, as well as the appended drawings.

It is to be understood that both the foregoing general description and the following detailed description are merely exemplary, and are intended to provide an overview or framework to understanding the nature and character of the claims. The accompanying drawings are included to provide a further understanding, and are incorporated in and constitute a part of this specification. The drawings illustrate one or more embodiments, and together with the description serve to explain principles and operation of the various embodiments.

DETAILED DESCRIPTION

Figure 1:
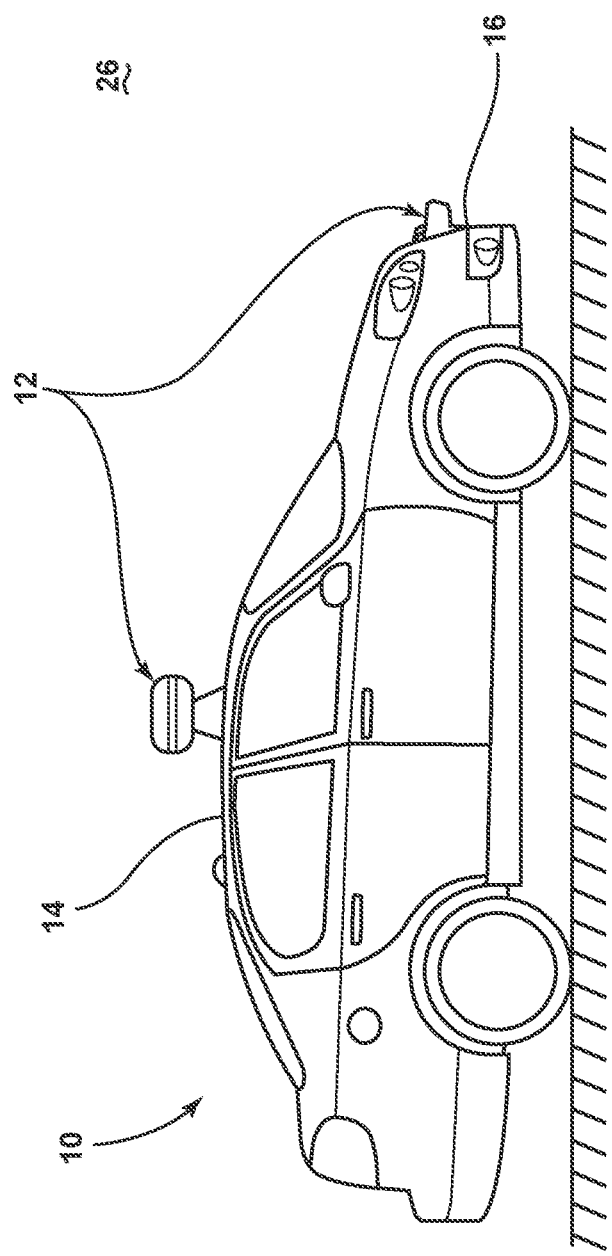
FIG. 1 is a side view of a vehicle in an external environment, illustrating a LIDAR system on a roof of the vehicle and another LIDAR system on a forward portion of the vehicle.

Reference will now be made in detail to the present preferred embodiments, examples of which are illustrated in the accompanying drawings. Whenever possible, the same reference numerals will be used throughout the drawings to refer to the same or like parts.

Referring now to FIG. 1, a vehicle 10 includes one or more LIDAR systems 12. The one or more LIDAR systems 12 can be disposed anywhere on or within the vehicle 10. For example, the one or more LIDAR systems 12 can be disposed on a roof 14 of the vehicle 10 and/or a forward portion 16 of the vehicle 10.

Figure 2:
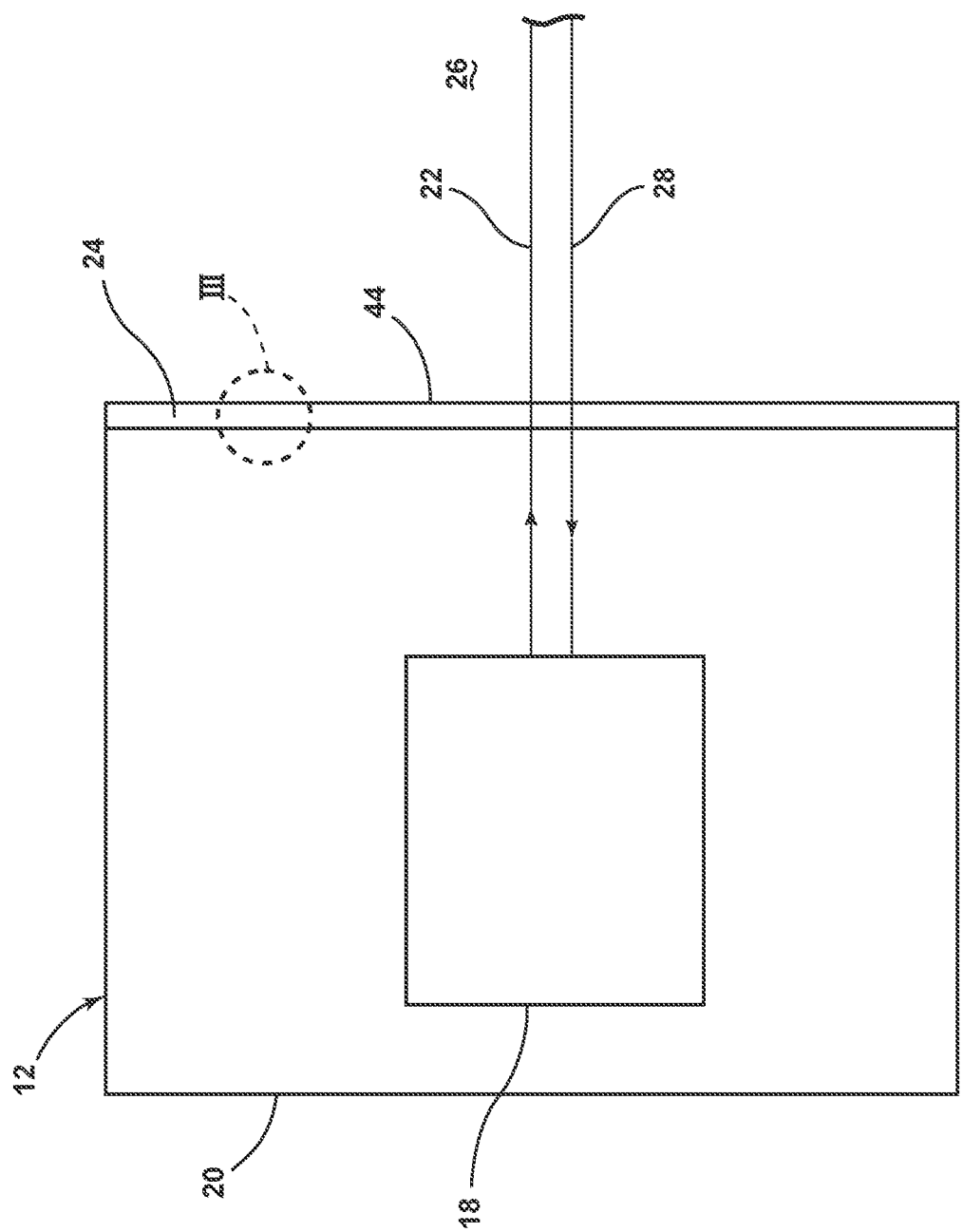
FIG. 2 is a schematic view of one of the LIDAR systems of FIG. 1, illustrating an electromagnetic radiation emitter and sensor in an enclosure, and the electromagnetic radiation emitter and sensor emitting electromagnetic radiation that exits the enclosure through a window and returns as reflected radiation through the window.

Referring now to FIG. 2, each of the one or more LIDAR systems 12 include an electromagnetic radiation emitter and sensor 18, as known in the art, which may be enclosed in an enclosure 20. The electromagnetic radiation emitter and sensor 18 emits electromagnetic radiation 22 having a wavelength or range of wavelengths. The emitted radiation 22 exits the enclosure 20 through a window 24, which is in the path of the emitted electromagnetic radiation. If an object (not illustrated) in an external environment 26 is in the path of the emitted radiation 22, the emitted radiation 22 will reflect off of the object and return to the electromagnetic radiation emitter and sensor 18 as reflected radiation 28. The reflected radiation 28 again passes through the window 24 to reach the electromagnetic radiation emitter and sensor 18. In embodiments, the emitted radiation 22 and the reflected radiation 28 have a wavelength of 905 nm or 1550 nm or a range including either the 905 nm or 1550 nm wavelengths. Electromagnetic radiation other than the reflected radiation 28 (such as electromagnetic radiation having wavelengths in the visible spectrum, portions of the ultraviolet range, and portions of the infrared range shorter than the desired 905 nm and/or 1550 nm wavelengths) may or may not pass through the window 24, depending on the optical properties of the window 24 as described herein. The "visible spectrum" is the portion of the electromagnetic spectrum that is visible to the human eye and generally refers to electromagnetic radiation having a wavelength within the range of about 380 nm or 400 nm to about 700 nm. The "ultraviolet range" is the portion of the electromagnetic spectrum having wavelengths between about 10 nm and about 400 nm. The "infrared range" of the electromagnetic spectrum begins at about 700 nm and extends to longer wavelengths. The sun generates solar electromagnetic radiation, commonly referred to as "sunlight," having wavelengths that fall within all three of those ranges.

Figure 3:
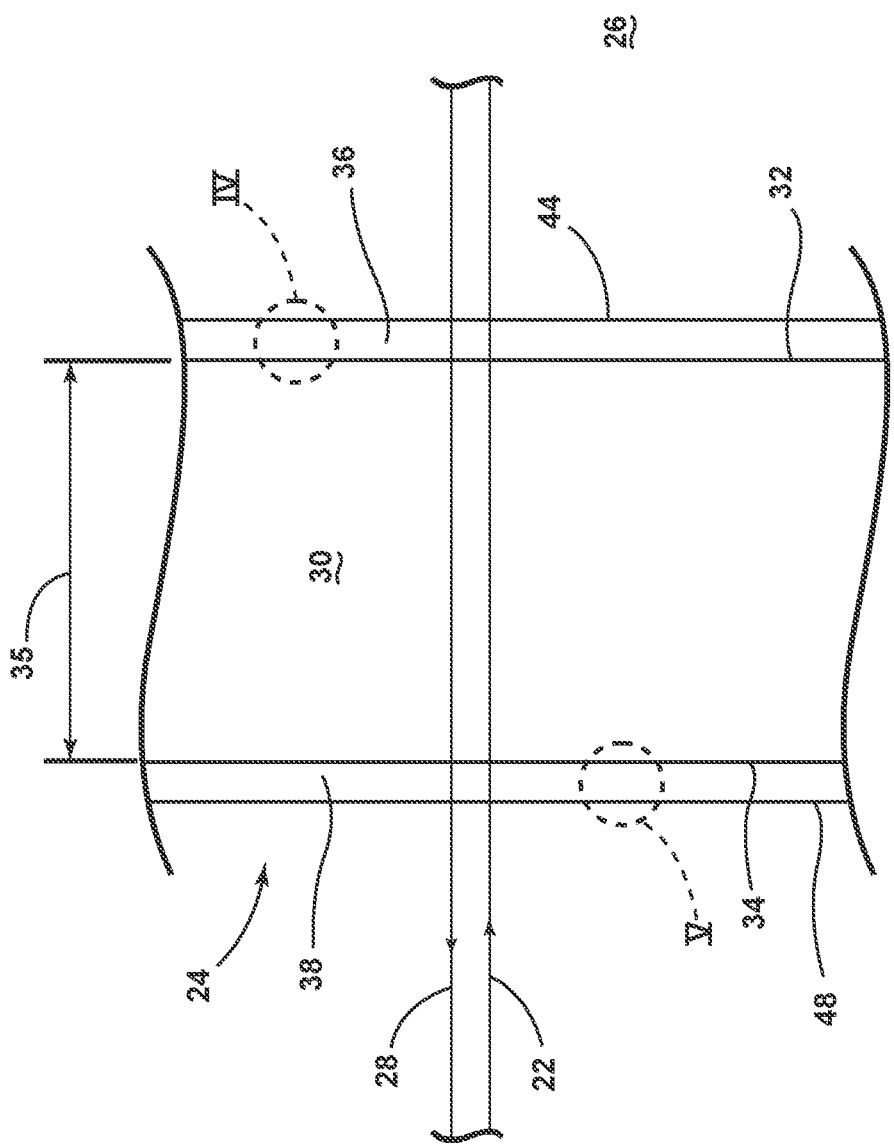
FIG. 3 is a cross-sectional view of the window of FIG. 2 taken at area III of FIG. 2, illustrating the window including a substrate with a layered film over a first surface of the substrate, and a second layered film over a second surface of the substrate.

Referring now to FIG. 3, the window 24 for each of the one or more LIDAR systems 12 includes a substrate 30. The substrate 30 includes a first surface 32 and a second surface 34. The first surface 32 and the second surface 34 are the primary surfaces of the substrate 30. The first surface 32 is closest to the external environment 26. The second surface 34 is closest to the electromagnetic radiation emitter and sensor 18. The emitted radiation 22 encounters the second surface 34 before the first surface 32. The reflected radiation 28 encounters the first surface 32 before the second surface 34. The substrate 30 further includes a layered film 36 disposed on the first surface 32 of the substrate 30, and, in some embodiments, a second layered film 38 is disposed on the second surface 34 of the substrate 30. It should be understood that the window 24 as described herein is not limited to vehicular applications, and can be used for whatever application the window 24 would be useful to provide improved impact and optical performance, as described further herein.

As used herein, the term "dispose" includes coating, depositing and/or forming a material onto a surface using any known method in the art. The disposed material may constitute a layer, as defined herein. The phrase "disposed on" includes the instance of forming a material onto a surface such that the material is in direct contact with the surface and also includes the instance where the material is formed on a surface, with one or more intervening material(s) is between the disposed material and the surface. The intervening material(s) may constitute a layer, as defined herein.

The substrate 30 can be a glass substrate. The glass substrate can have a composition of soda lime glass, alkali aluminosilicate glass, alkali containing borosilicate glass, and alkali aluminoborosilicate glass, although other glass compositions are contemplated. Such glass compositions are capable of being chemically strengthened by an ion-exchange process. In some variants, the composition may be free of lithium ions.

An alkali aluminosilicate glass composition suitable for the substrate 30 comprises alumina, at least one alkali metal and, in some embodiments, greater than 50 mol. % Sift, in other embodiments at least 58 mol. % Sift, and in still other embodiments at least 60 mol. % $SiO_2$, wherein the ratio $(Al_2O_3+B_2O_3)/\Sigma_{modifiers}$ (i.e., sum of modifiers) is greater than 1, wherein the ratio of the components are expressed in mol. % and the modifiers are alkali metal oxides. This composition, in particular embodiments, comprises: 58-72 mol. % $SiO_2$; 9-17 mol. % $Al_2O_3$; 2-12 mol. % $B_2O_3$; 8-16 mol. % $Na_2O$; and 0-4 mol. % $K_2$, wherein the ratio $(Al_2O_3+B_2O_3)/\Sigma_{modifiers}$ (i.e., sum of modifiers) is greater than 1.

Another suitable alkali aluminosilicate glass composition for the substrate 30 comprises: 64-68 mol. % $SiO_2$; 12-16 mol. % $Na_2O$; 8-12 mol. % $Al_2O_3$; 0-3 mol. % $B_2O_3$; 2-5 mol. % $K_2O$; 4-6 mol. % MgO; and 0-5 mol. % CaO, wherein: 66 mol. % $\leq SiO_2+B_2O_3+CaO \leq 69$ mol. %; $Na_2O+K_2O+B_2O_3+MgO+CaO+SrO>10$ mol. %; 5 mol. % $\leq MgO+CaO+SrO \leq 8$ mol. %; $(Na_2O+B_2O_3)-Al_2O_3 \leq 2$ mol. %; 2 mol. % $\leq Na_2O-Al_2O_3 \leq 6$ mol. %; and 4 mol. % $\leq (Na_2O+K_2O)-Al_2O_3 \leq 10$ mol. %.

Another suitable alkali aluminosilicate glass composition for the substrate 30 comprises: 2 mol. % or more of $Al_2O_3$ and/or $ZrO_2$, or 4 mol. % or more of $Al_2O_3$ and/or $ZrO_2$.

One example glass composition comprises $SiO_2$, $B_2O_3$, and $Na_2O$, where $(SiO_2+B_2O_3) \geq 66$ mol. %, and $Na_2O_9$ mol. %. In an embodiment, the composition includes at least 6 wt. % aluminum oxide. In a further embodiment, the composition of one or more alkaline earth oxides, such as a content of alkaline earth oxides, is at least 5 wt. %. Suitable compositions, in some embodiments, further comprise at least one of $K_2O$, MgO, and CaO. In a particular embodiment, the composition of the substrate 30 comprises 61-75 mol. % $SiO_2$; 7-15 mol. % $Al_2O_3$; 0-12 mol. % $B_2O_3$; 9-21 mol. % $Na_2O$; 0-4 mol. % $K_2O$; 0-7 mol. % MgO; and 0-3 mol. % CaO.

A further example composition suitable for the substrate 30 comprises: 60-70 mol. % $SiO_2$; 6-14 mol. % $Al_2O_3$; 0-15 mol. % $B_2O_3$; 0-15 mol. % $Li_2O$; 0-20 mol. % $Na_2O$; 0-10 mol. % $K_2O$; 0-8 mol. % MgO; 0-10 mol. % CaO; 0-5 mol. % $ZrO_2$; 0-1 mol. % $SnO_2$; 0-1 mol. % $CeO_2$; less than 50 ppm $As_2O_3$; and less than 50 ppm $Sb_2O_3$; where 12 mol. % $\leq (Li_2O+Na_2O+K_2O) \leq 20$ mol. % and 0 mol. % $\leq (MgO+CaO) \leq 10$ mol. %.

A still further example glass composition suitable for the substrate 30 comprises: 63.5-66.5 mol. % $SiO_2$; 8-12 mol. % $Al_2O_3$; 0-3 mol. % $B_2O_3$; 0-5 mol. % $Li_2O$; 8-18 mol. % $Na_2O$; 0-5 mol. % $K_2O$; 1-7 mol. % MgO; 0-2.5 mol. % CaO; 0-3 mol. % $ZrO_2$; 0.05-0.25 mol. % $SnO_2$; 0.05-0.5 mol. % $CeO_2$; less than 50 ppm $As_2O_3$; and less than 50 ppm $Sb_2O_3$; where 14 mol. % $\leq (Li_2O+Na_2O+K_2O) \leq 18$ mol. % and 2 mol. % $\leq (MgO+CaO) \leq 7$ mol. %.

The substrate 30 may be substantially planar or sheet-like, although other embodiments may utilize a curved or otherwise shaped or sculpted substrate. The length and width of the substrate 30 can vary according to the dimensions required for the window 24. The substrate 30 can be formed using various methods, such as float glass processes and down-draw processes such as fusion draw and slot draw. The substrate 30 can be used in a non-strengthened state. A commercially available example of a suitable non-strengthened substrate 30 for the window 24 is Corning® glass code 2320, which is a sodium aluminosilicate glass substrate.

The glass forming the substrate 30 can be modified to have a region contiguous with the first surface 32 and/or a region contiguous with the second surface 34 to be under compressive stress ("CS"). In such a circumstance, the region(s) under compressive stress extends from the first surface 32 and/or the second surface 34 to a depth(s) of compression. This generation of compressive stress further creates a central region that is under a tensile stress, having a maximum value at the center of the central region, referred to as central tension or center tension (CT). The central region extends between the depths of compression, and is under tensile stress. The tensile stress of the central region balances or counteracts the compressive stresses of the regions under compressive stress. As used herein, the terms "depth of compression" and "DOC" refer to the depth at which the stress within the substrate 30 changes from compressive to tensile stress. At the depth of compression, the stress crosses from a positive (compressive) stress to a negative (tensile) stress and thus has a value of zero. The depth of compression protects the substrate 30 from the propagation of flaws introduced by sharp impact to the first and/or second surfaces 32, 34 of the substrate 30, while the compressive stress minimizes the likelihood of a flaw growing and penetrating through the depths of compression. In embodiments, the depths of compression are each at least 20 µm. In embodiments, the absolute value of the maximum compressive stress CS within the regions is at least 200 MPa, at least about 400 MPa, at least 600 MPa, or up to about 1000 MPa.

Two methods for extracting detailed and precise stress profiles (stress as a function of depth) for a substrate 30 with regions under compressive stress are disclosed in U.S. Pat. No. 9,140,543, entitled "Systems and Methods for Measuring the Stress Profile of Ion-Exchanged Glass," filed by Douglas Clippinger Allan et al. on May 3, 2012, and claiming priority to U.S. Provisional Patent Application No. 61/489,800, having the same title, and filed on May 25, 2011, the contents of which are incorporated herein by reference in their entirety.

In embodiments, generating the region(s) of the substrate 30 under compressive stress includes subjecting the substrate 30 to an ion-exchange chemical tempering process (chemical tempering is often referred to as "chemical strengthening"). In the ion-exchange chemical tempering process, ions at or near the first and second surfaces 32, 34 of the substrate 30 are replaced by—or exchanged with— larger ions usually having the same valence or oxidation state. In those embodiments in which the substrate 30 comprises, consists essentially of, or consists of an alkali aluminosilicate glass, an alkali borosilicate glass, an alkali aluminoborosilicate glass, or an alkali silicate glass, ions in the surface layer of the glass and the larger ions are monovalent alkali metal cations, such as Na (when Li+is present in the glass), $K^+$, $Rb^+$, and $Cs^+$. Alternatively, monovalent cations in, at, or near the first and second surfaces 32, 34 may be replaced with monovalent cations other than alkali metal cations, such as $Ag_+$, or the like.

In embodiments, the ion-exchange process is carried out by immersing the substrate 30 in a molten salt bath containing the larger ions to be exchanged with the smaller ions in the substrate 30. It will be appreciated by those skilled in the art that parameters for the ion-exchange process, including, but not limited to, bath composition and temperature, immersion time, the number of immersions of the glass in a salt bath (or baths), use of multiple salt baths, and additional steps such as annealing, washing and the like, are generally determined by the composition of the substrate 30 and the desired depths of compression and compressive stress of the substrate 30 that result from the strengthening operation. By way of example, ion-exchange of alkali metal-containing glass substrates may be achieved by immersion in at least one molten bath containing a salt such as, but not limited to, nitrates, sulfates, and chlorides of the larger alkali metal ion. In embodiments, the molten salt bath comprises potassium nitrate (0-100 wt %), sodium nitrate (0-100 wt %), and lithium nitrate (0-12 wt %), the combined potassium nitrate and sodium nitrate having a weight percentage within the range of 88 wt % to 100 wt %. In embodiments, the temperature of the molten salt bath typically is in a range from about 350° C. up to about 500° C., while immersion times range from about 15 minutes up to about 40 hours, including from about 20 minutes to about 10 hours. However, temperatures and immersion times different from those described above may also be used. The substrate 30 may be acid polished or otherwise treated to remove or reduce the effect of surface flaws.

The substrate 30 has a thickness 35 defined as the shortest straight-line distance between the first surface 32 and the second surface 34. In embodiments, the thickness 35 of the substrate 30 is between about 100 µm and about 5 mm. The substrate 30, according to one or more embodiments, can have a physical thickness 35 ranging from about 100 µm to about 500 µm (e.g., 100, 200, 300, 400, or 500 µm). In other embodiments, the thickness 35 ranges from about 500 µm to about 1000 µm (e.g., 500, 600, 700, 800, 900, or 1000 µm). The thickness 35 may be greater than about 1 mm (e.g., about 2, 3, 4, or 5 mm). In one or more specific embodiments, the thickness 35 is 2 mm or less or less than 1 mm. A commercially available composition suitable for the substrate 30 that has been subjected to ion-exchange is Gorilla® Glass, Corning® code #5318 having a CS of about 850 MPa, and a DOC of about 40 microns, and a thickness 35 of 1.0 millimeter (mm). Another commercially available example of a suitable strengthened (through ion-exchange) substrate 30 for the window 24 is Corning® glass code 2320, which is a sodium aluminosilicate glass substrate.

Instead of glass, or in addition to glass, the substrate 30 can include or be a visible light absorbing, IR-transmitting material layer. Examples of such materials include infrared transmitting, visible absorbing acrylic sheets, such as those commercially available from ePlastics under the trade names Plexiglas® IR acrylic 3143 and CYRO's ACRYLITE® IR acrylic 1146. Plexiglas® IR acrylic 3143 has a transmissivity of about 0% (at least less than 10%, or less than 1%) for electromagnetic radiation having wavelengths of about 700 nm or shorter, but a transmissivity of about 90% (above 85%) for wavelengths within the range of 800 nm to about 1100 nm (including 905 nm).

In one or more embodiments, the substrate 30 exhibits a refractive index in the range from about 1.45 to about 1.55. As used herein "refractive index" refers to the refractive index of the material (here, the substrate 30) for electromagnetic radiation having a wavelength of 1550 nm. Here, "refractive index" and "index of refraction" are used synonymously.

Figure 4:
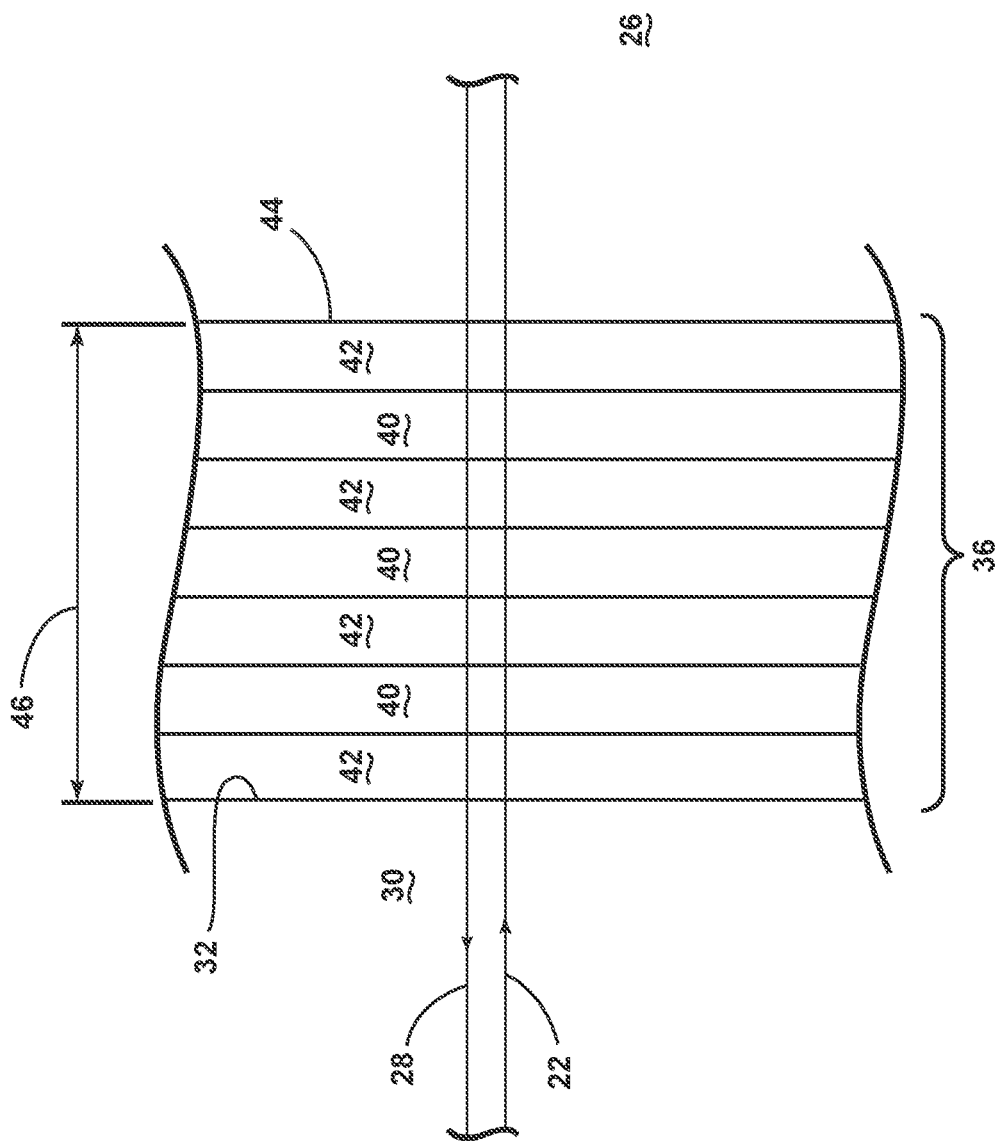
FIG. 4 is a cross-sectional view of the window of FIG. 3 taken at area IV of FIG. 3, illustrating the layered film including alternating layers of one or more higher refractive index materials and one or more lower refractive index materials with a layer of the one or more lower refractive index materials providing a terminal surface closest to the external environment.
Figure 5:
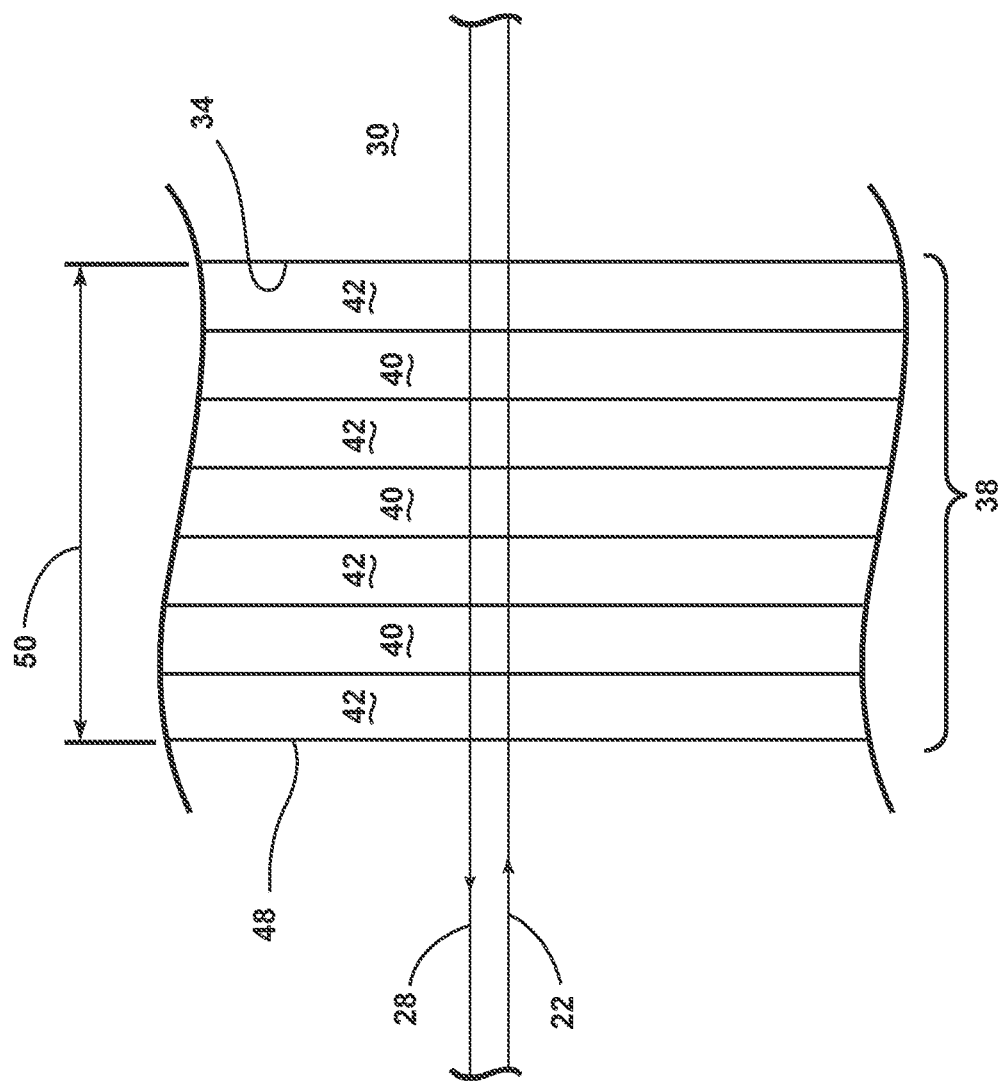
FIG. 5 is a cross-sectional view of the window of FIG. 3 taken at area V of FIG. 3, illustrating the second layered film including alternating layers of one or more higher refractive index materials and one or more lower refractive index materials with a layer of the one or more lower refractive index materials providing a terminal surface closest to the electromagnetic radiation emitter and sensor.

Referring now to FIGS. 4 and 5, the layered film 36, and the second layered film 38 if utilized, includes a quantity of alternating layers of one or more higher refractive index materials 40 and one or more lower refractive index materials 42. As used herein, the terms "higher refractive index" and "lower refractive index" refer to the values of the refractive index relative to each other, with the refractive index/indices of the one or more higher refractive index materials 40 being greater than the refractive index/indices of the one or more lower refractive index materials 42. In embodiments, the one or more higher refractive index materials 40 have a refractive index from about 1.7 to about 4.0. In embodiments, the one or more lower refractive index materials 42 have a refractive index from about 1.3 to about 1.6. In other embodiments, the one or more lower refractive index materials 42 have a refractive index from about 1.3 to about 1.7, while the one or more higher refractive index materials 40 have a refractive index from about 1.9 to about 3.8. The difference in the refractive index of any of the one or more higher refractive index materials 40 and any of the one or more lower refractive index materials 42 may be about 0.1 or greater, 0.2 or greater, 0.3 or greater, 0.4 or greater, 0.5 or greater, 0.6 or greater, 0.7 or greater, 0.8 or greater, 0.9 or greater, 1.0 or greater, 1.5 or greater, 2.0 or greater, 2.1 or greater, 2.2 or greater, or even 2.3 or greater. Because of the difference in the refractive indices of the one or more higher refractive index materials 40 and the one or more lower refractive index materials 42, manipulation of the quantity (number) of alternating layers and their thicknesses can cause selective transmission of electromagnetic radiation within a range of wavelengths through the window 24 and, separately, selective reflectance of electromagnetic radiation within a range of wavelengths off of the layered film 36. The layered film 36 (and the second layered film 38, if utilized) is thus a thin-film optical filter having predetermined optical properties configured as a function of the quantity, thicknesses, and materials chosen as the one or more higher refractive index materials 40 and the one or more lower refractive index materials 42.

Some examples of suitable materials for use as the one or more lower refractive index materials 42 include $SiO_2$, $Al_2O_3$, $GeO_2$, $SiO$, $AlO_xN_y$, $SiO_xN_y$, $Si_uAl_vO_xN_y$, $MgO$, $MgAl_2O_4$, $MgF_2$, $BaF_2$, $CaF_2$, $DyF_3$, $YbF_3$, $YF_3$, and $CeF_3$. The nitrogen content of the materials for use as the one or more lower refractive index materials 42 may be minimized (e.g., in materials such as $AlO_xN_y$, $SiO_xN_y$, and $Si_uAl_vO_xN_y$).

Some examples of suitable materials for use as the one or more higher refractive index materials 40 include amorphous silicon (a-Si), $SiN_x$, $SiN_x{:}H_y$, $AlN_x$, $Si_uAl_vO_xN_y$, $Ta_2O_5$, $Nb_2O_5$, $AlN$, $Si_3N_4$, $AlO_xN_y$, $SiO_xN_y$, $HfO_2$, $TiO_2$, $ZrO_2$, $Y_2O_3$, $Al_2O_3$, $MoO_3$, and diamond-like carbon. The oxygen content of the materials for the higher refractive index material 40 may be minimized, especially in $SiN_x$ or $AlN_x$ materials. $AlO_xN_y$ materials may be considered to be oxygen-doped $AlN_x$, that is they may have an $AlN_x$ crystal structure (e.g., wurtzite) and need not have an AlON crystal structure. Exemplary preferred $AlO_xN_y$ materials for use as the one or more higher refractive index materials 40 may comprise from about 0 atom % to about 20 atom % oxygen, or from about 5 atom % to about 15 atom % oxygen, while including 30 atom % to about 50 atom % nitrogen. Exemplary preferred $Si_uAl_vO_xN_y$ for use as the one or more higher refractive index materials 40 may comprise from about 10 atom % to about 30 atom % or from about 15 atom % to about 25 atom % silicon, from about 20 atom % to about 40 atom % or from about 25 atom % to about 35 atom % aluminum, from about 0 atom % to about 20 atom % or from about 1 atom % to about 20 atom % oxygen, and from about 30 atom % to about 50 atom % nitrogen. The foregoing materials may be hydrogenated up to about 30% by weight. Because the refractive indices of the one or more higher refractive index materials 40 and the one or more lower refractive index materials 42 are relative to each other, the same material (such as $Al_2O_3$) can be appropriate for the one or more higher refractive index materials 40 depending on the refractive index of the material(s) chosen for the one or more lower refractive index materials 42, and can alternatively be appropriate for the one or more lower refractive index materials 42 depending on the refractive index of the material(s) chosen for the one or more higher refractive index material 40.

In embodiments, the one or more lower refractive index materials 42 of the layered film 36 consists of layers of $SiO_2$, and the one or more higher refractive index materials 40 of the layered film 36 consists of layers of $Si_3N_4$. In embodiments, the window 24 does not utilize the second layered film 38, and the one or more lower refractive index materials 42 of the layered film 36 consists of layers of $SiO_2$, and the one or more higher refractive index materials 40 of the layered film 36 consists of layers of $Si_3N_4$. In embodiments, the one or more lower refractive index materials 42 of the layered film 36 consists of layers of $SiO_2$, and the one or more higher refractive index materials 40 of the layered film 36 consists of layers of $Si_3N_4$, while the one or more lower refractive index materials 42 of the second layered film 38 consists of layers of $SiO_2$, and the one or more higher refractive index materials 40 of the second layered film 38 consists of layers of $Si_3N_4$. In embodiments, the one or more lower refractive index materials 42 of the layered film 36 consists of layers of $SiO_2$, and the one or more higher refractive index materials 40 of the layered film 36 consists of layers of $Si_3N_4$, while the one or more lower refractive index materials 42 of the second layered film 38 consists of layers of $SiO_2$ and the one or more higher refractive index materials 40 of the second layered film 38 consists of layers of amorphous silicon (a-Si). In embodiments, the one or more lower refractive index materials 42 of the layered film 36 consists of layers of $SiO_2$, and the one or more higher refractive index materials 40 of the layered film 36 consists of layers of $Si_3N_4$, while the one or more lower refractive index materials 42 of the second layered film 38 consists of layers of $SiO_2$ and the one or more higher refractive index materials 40 of the second layered film 38 consists of layers of amorphous silicon (a-Si) and layers of $Si_3N_4$.

The quantity of alternating layers of the higher refractive index material 40 and the lower refractive index material 42 in either the layered film 36 or the second layered film 38 is not particularly limited. In embodiments, the number of alternating layers within the layered film 36 is 7 or more, or 9 or more. In embodiments, the quantity of alternating layers within the second layered film 38 is 9 or more, 17 or more, 19 or more, or 81 or more. In embodiments, the quantity of alternating layers in the layered film 36 and the second layered film 38 collectively forming the window 24, not including the substrate 30, is 9 or more, 16 or more, 24 or more, 26 or more, or even 88 or more. In general, the greater the quantity of layers within the layered film 36 (and the second layered film 38, if utilized), the more narrowly the transmittance and reflectance properties of the window 24 are tailored to one or more specific wavelengths or wavelength ranges. Each of the alternating layers of the layered film 36 (and the second layered film 38, if utilized) has a thickness.

The reflected radiation 28 first encounters a terminal surface 44 of the layered film 36 upon interacting with the window 24, and the terminal surface 44 may be open to the external environment 26. In an embodiment, a layer of the one or more lower refractive index materials 42 provides the terminal surface 44 to more closely match the refractive index of the air in the external environment 26 and thus reduce reflection of incident electromagnetic radiation (whether the reflected radiation 28 or otherwise) off of the terminal surface 44. The layer of the one or more lower refractive index materials 42 that provides the terminal surface 44 is the layer of the layered film 36 that is farthest from the substrate 30. Similarly, in an embodiment, when the one or more lower refractive index materials 42 is $SiO_2$, a layer of $SiO_2$, as the one or more lower refractive index materials 42, is disposed directly onto the first surface 32 of the substrate 30, which will typically comprise a large mole percentage of $SiO_2$. Without being bound by theory, it is thought that commonality of Sift in both the substrate 30 and the adjacent layer of the one or more lower refractive index materials 42 allows for increased bonding strength.

The emitted radiation 22 first encounters a terminal surface 48 of the second layered film 38 upon interacting with the window 24. In an embodiment, a layer of the one or more lower refractive materials 42 provides the terminal surface 48 to more closely match the refractive index of the air within the enclosure 20 and thus reduce reflection of the incident emitted radiation 22 off of the terminal surface 48. The layer of the one or more lower refractive index materials 42 that provides the terminal surface 48 is the layer of the second layered film 38 that is farthest from the substrate 30. Similarly, in an embodiment, when the one or more lower refractive index materials 42 is Sift, a layer of Sift, as the one or more lower refractive index materials 42, is disposed directly onto the second surface 34 of the substrate 30.

Materials that have a relatively high refractive index can simultaneously have a relatively high hardness that provides scratch and impact resistance. An example material that has both high hardness and can be the higher refractive index material 40 is $Si_3N_4$. Other example materials that have both high hardness and can be the higher refractive index material 40 are $SiN_x$, $SiN_x:H_y$, and $SiO_xN_y$. The thickness of the higher refractive index material 40, whether at the second layer of the layered film 36 or otherwise, can be maximized to increase the scratch and/or damage resistance of the window 24. The thickness and location within the layered film 36 of the maximized thickness layer of the higher refractive index material 40 can be optimized to provide the desired level of hardness and scratch resistance to the layered film 36 and thus the window 24 as a whole. Different applications of the window 24 could lead to different desired thicknesses for the maximized thickness layer of the higher refractive index material 40 serving as the layer providing the hardness and scratch resistance to the window 24. For example, a window 24 protecting a LIDAR system 12 on a vehicle 10 may require a different thickness for the maximized thickness layer of the higher refractive index material 40 than a window 24 protecting a LIDAR system 12 at an office building. In embodiments, the maximized thickness layer of the higher refractive index material 40 serving as the layer providing the hardness and scratch resistance to the window 24 has a thickness between 500 nm and 50000 nm, such as between 500 nm and 10000 nm, such as between 2000 nm to 5000 nm. In embodiments, the thickness of this maximized-thickness higher refractive index material 40 has a thickness that is 65% or more, or 85% or more, or 86% or more, of the thickness of the layered film 36. In general, the maximized thickness layer of the higher refractive index material 40 serving as the layer providing the hardness and scratch resistance to the window 24 will be part of the layered film 36 facing the external environment 26 rather the second layered film 38 protected by the enclosure 20, although that may not always be so.

As will be detailed further below, the quantity, thicknesses, and materials of the remaining layers of the layered film 36 and the second layered film 38 (if utilized) can be configured to provide the window 24 with the desired optical properties (transmittance and reflectance of desired wavelengths) almost regardless of the thickness chosen for the maximized thickness layer of the higher refractive index material 40 serving as the layer providing the hardness and scratch resistance to the window 24. This insensitivity of the optical properties of the window 24 as a whole to the thickness of the maximized thickness layer of the higher refractive index material 40 serving as the layer providing the hardness and scratch resistance to the window 24 when materials having relatively low or negligible optical absorption of electromagnetic radiation of the target wavelength or wavelength range (i.e., 905 nm and/or 1550 nm) are used as the maximized thickness layer. For example, $Si_3N_4$ only negligibly absorbs electromagnetic radiation in the 700 nm to 2000 nm wavelength range.

This general insensitivity allows the maximized-thickness layer of the higher refractive index material 40 in the layered film 36 to have a thickness predetermined to provide specified hardness or scratch resistance requirements. For example, the layered film 36 for the window 24 utilized at the roof 14 of the vehicle 10 may have different hardness and scratch resistance requirements than the layered film 36 for the window 24 utilized at the forward portion 16 of the vehicle 10, and thus a different thickness for the maximized-thickness layer of the higher refractive index material 40. This can be achieved without significant altering of the transmittance and reflectance properties of the layered film 36 as a whole.

The hardness of the layered film 36, and thus the window 24, with the maximized thickness layer of the higher refractive index material 40 can be quantified. In some embodiments, the maximum hardness of the window 24, measured at the layered film 36 with the maximized thickness layer of the higher refractive index material 40, as measured by the Berkovich Indenter Hardness Test, may be about 8 GPa or greater, about 10 GPa or greater, about 12 GPa or greater, about 14 GPa or greater, about 15 GPa or greater, about 16 GPa or greater, or about 18 GPa or greater at one or more indentation depths from 50 nm to 1000 nm (measured from the terminal surface 44), and even from 2000 nm to 5000 nm. As used herein, the "Berkovich Indenter Hardness Test" includes measuring the hardness of a material on a surface thereof by indenting the surface with a diamond Berkovich indenter. The Berkovich Indenter Hardness Test includes indenting the terminal surface 44 of the layered film 36 with the diamond Berkovich indenter to form an indent to an indentation depth in the range from about 50 nm to about 1000 nm (or the entire thickness of the layered film 36, whichever is less) and measuring the maximum hardness from this indentation along the entire indentation depth range or a segment of this indentation depth range (e.g., in the range from about 100 nm to about 600 nm), generally using the methods set forth in Oliver, W. C.; Pharr, G. M. *An improved technique for determining hardness and elastic modulus using load and displacement sensing indentation experiments*. J. Mater. Res., Vol. 7, No. 6, 1992, 1564-1583; and Oliver, W. C.; Pharr, G. M. *Measurement of Hardness and Elastic Modulus by Instrument Indentation: Advances in Understanding and Refinements to Methodology*. J. Mater. Res., Vol. 19, No. 1, 2004, 3-20. As used herein, hardness refers to a maximum hardness, and not an average hardness. These levels of hardness improve the resistance of the window 24 to impact damage from sand, small stones, debris, and other objects encountered while the LIDAR system 12 is used for its intended purpose, such as with the vehicle 10. Accordingly, these levels of hardness reduce or prevent the optical scattering and reduced performance of the LIDAR system 12 that the impact damage would otherwise cause.

In an embodiment, the layer of the one or more lower refractive index materials 42 providing the terminal surface 44 has a thickness that is less than 20%, or even less than 10% of the 1550 nm wavelength of electromagnetic radiation at issue. In embodiments, the thickness of the layer providing the terminal surface 44 is between 150 nm and 310 nm. Minimizing the thickness of that layer providing the terminal surface 44 enhances the scratch and/or damage resistance provided by the maximized thickness layer of the one or more higher refractive index materials 40 provided directly under the layer of the one or more lower refractive index materials 42 providing the terminal surface 44. As mentioned, in embodiments, the maximized thickness layer of the one or more higher refractive index materials 40 imparting the hardness to the window 24 is the second layer of the layered film 36 from the external environment 26, that is adjacent to the layer of the one or more lower refractive index materials 42 providing the terminal surface 44 of the window 24.

The layered film 36 has a thickness 46, and the second layered film 38, if utilized, has a thickness 50. The thickness 46 of the layered film 36, assumed to include the maximized thickness layer of the one or more higher refractive index materials 40, may be about 1 μm or greater while still providing the transmittance and reflectance properties described herein. In embodiments, the thickness 46 is in the range of 1 μm to just over 50 μm, including from about 1 μm to about 10 μm, and from about 2800 nm to about 5900 nm. The lower bound of about 1 μm is approximately the minimum thickness 46 that still provides hardness and scratch resistance to the window 24. The higher bound of thickness 46 is limited by cost and time required to dispose the layers of the layered film 36 onto the substrate 30. In addition, the higher bound of the thickness 46 is limited to prevent the layered film 36 from warping the substrate 30, which is dependent upon the thickness of the substrate 30. The thickness 50 of the second layered film 38 can be any thickness deemed necessary to impart the window 24 with the desired transmittance and reflectance properties. In embodiments, the thickness 50 of the second layered film 38 is in the range of about 800 nm to about 7000 nm. If the second layered film 38 includes a maximized thickness layer of the one or more higher refractive index materials 40 to impart hardness and impact resistance, then the thickness 50 of the second layered film 38 can be thicker, as described in connection with the layered film 36 above.

While solving the problem discussed above in the background through imparting hardness, impact, and scratch resistance to the window 24 via the maximized thickness of a higher refractive index material 40, the quantity, thicknesses, and materials of the layers of the layered film 36 (and second layered film 38, if utilized) are configured to also maximize transmittance of the reflected radiation 28 through the window 24 having a wavelength of 1550 nm through the window 24. In embodiments, the quantity, thicknesses, and materials of the layers of the layered film 36 (and second layered film 38, if utilized) are configured to also maximize transmittance electromagnetic radiation having wavelengths within the range of 1500 nm-1600 nm through the window 24. In embodiments, the quantity, thicknesses, and materials of the layers of the layered film 36 (and second layered film 38, if utilized) are configured so that the window 24 has an average percentage transmittance of greater than 75%, greater than 80%, greater than 90%, greater than 92%, greater than 94%, greater than 95%, greater than 98%, greater than 98.5%, greater than 99%, or even greater than 99.5% of electromagnetic radiation having a wavelength of 1550 nm at normal or near normal incidence. In embodiments, the quantity, thicknesses, and materials of the layers of the layered film 36 (and second layered film 38, if utilized) are configured so that the window 24 has an average percentage transmittance of greater than 75%, greater than 80%, greater than 90%, greater than 92%, greater than 94%, greater than 95%, greater than 98%, greater than 98.5%, greater than 99%, or even greater than 99.5% of electromagnetic radiation having any wavelength within the range of 1500 nm to 1600 nm at normal or near normal incidence. In embodiments, the quantity, thicknesses, and materials of the layers of the layered film 36 (and second layered film 38, if utilized) are configured so that the window 24 has an average percentage transmittance of greater than 75%, greater than 80%, greater than 90%, or greater than 92% of electromagnetic radiation having wavelengths of 905 nm and 1550 nm at normal or near normal incidence. In embodiments, the quantity, thicknesses, and materials of the layers of the layered film 36 (and second layered film 38, if utilized) are configured so that the window 24 has an average percentage transmittance of greater than 75%, greater than 80%, or greater than 85%, of electromagnetic radiation having any wavelength within the range of 880 nm to 1580 nm, or 850 nm to 1800 nm, at normal or near normal incidence. The term "transmittance" refers to the percentage of incident optical power within a given wavelength range transmitted through a material (e.g., the window 24, the substrate 30, the layered film 36, the second layered film 38 or portions thereof).

In embodiments, the quantity, thicknesses, and materials of the layers of the layered film 36 (and second layered film 38, if utilized) are configured to also minimize reflectance of the reflected radiation 28 off of the window 24 having a wavelength of 1550 nm through the window 24. In embodiments, the quantity, thicknesses, and materials of the layers of the layered film 36 (and second layered film 38, if utilized) are configured to also minimize reflectance of electromagnetic radiation having wavelengths within the range of 1500 nm-1600 nm off of the window 24. In embodiments, the quantity, thicknesses, and materials of the layers of the layered film 36 (and second layered film 38, if utilized) are configured so that the window 24 has an average percentage reflectance of less than 10%, less than 5%, less than 3%, less than 2%, less than 1%, less than 0.8%, less than 0.5%, or even less than 0.3% of electromagnetic radiation having a wavelength of 1550 nm at any angle of incidence within the ranges of 0° to 8°, 0 to 15°, 0 to 25°, or even 0° to 50°. In embodiments, the quantity, thicknesses, and materials of the layers of the layered film 36 (and second layered film 38, if utilized) are configured so that the window 24 has an average reflectance of less than 10%, less than 5%, less than 3%, less than 2%, less than 1%, less than 0.8%, less than 0.5%, or even less than 0.3% of electromagnetic radiation having any wavelength within the range of 1500 nm to 1600 nm at any angle of incidence within the ranges of 0° to 8°, 0 to 15°, 0 to 25°, or even 0° to 50°. In embodiments, the quantity, thicknesses, and materials of the layers of the layered film 36 (and second layered film 38, if utilized) are configured so that the window 24 has an average reflectance of less than 10%, or less than 5%, of electromagnetic radiation having wavelengths of 905 nm and 1550 nm at any angle of incidence within the ranges of 0° to 8°, 0 to 15°, 0 to 25°. The term "reflectance" is similarly defined as the percentage of incident optical power within a given wavelength range that is reflected from a material (e.g., the window 24, the substrate 30, the layered film 36, or portions thereof).

In embodiments, the quantity, thicknesses, and materials of the layers of the layered film 36 (and second layered film 38, if utilized) are additionally configured to: (a) minimize transmittance through the window 24 of; (b) maximize reflectance off of the window 24 of; and/or (c) absorb electromagnetic radiation having wavelengths within the ultraviolet range and the visible spectrum, such as wavelengths within or throughout the ranges of 300 nm to 600 nm, 300 nm to 650 nm, and 300 nm to 700 nm. In embodiments, the quantity, thicknesses, and materials of the layers of the layered film 36 (and second layered film 38, if utilized) are additionally configured to: (a) minimize transmittance through the window 24 of; (b) maximize reflectance off of the window 24 of; and/or (c) absorb electromagnetic radiation having wavelengths within the ultraviolet range, the visible spectrum, and portions of the infrared range shorter than 1500 nm or shorter than 850 nm, such as wavelengths within the ranges of 300 nm to 850 nm, 300 nm to 900 nm, or 300 nm to 1500 nm. In embodiments, the quantity, thicknesses, and materials of the layers of the layered film 36 (and the second layered film 38, if utilized) are additionally configured so that the window 24 has an average percentage transmittance of less than 10%, less than 5%, less than 3%, less than 2%, less than 1%, less than 0.8%, less than 0.5%, less than 0.2%, or even less than 0.15% of electromagnetic radiation having a wavelength within the ranges of 300 nm to 600 nm, 300 nm to 650 nm, 300 nm to 700 nm, or 300 nm to 950 nm, at normal or near normal incidence. In embodiments, the quantity, thicknesses, and materials of the layers of the layered film 36 (and the second layered film 38, if utilized) are additionally configured so that the window 24 has an average percentage reflectance of more than 80%, or more than 90%, more than 95%, or even more than 97%, over any incident angle within the range of 0° to 8°, 0° to 15°, or 0° to 25° for electromagnetic radiation having any wavelength within the ranges of 300 nm to 600 nm, 300 nm to 650 nm, 300 nm to 700 nm, 300 nm to 950 nm, 400 nm to 700 nm, 500 nm to 700 nm, or 550 nm to 700 nm. These embodiments prevent or lessen transmittance of temperature increasing sunlight through the window 24 to the enclosure 20 of the LIDAR system 12, which improves performance of the LIDAR system 12. In addition, these embodiments prevent or lessen transmittance of the electromagnetic radiation of wavelengths unnecessary to the operation of the LIDAR system 12, such as wavelengths outside of the range of 1450 nm to 1550 nm (or 850 nm to 950 nm, and 1450 nm and 1550 nm), which reduces noise interfering with the electromagnetic radiation emitter and sensor 18 and thus improves performance of the LIDAR system 12.

As mentioned above, the inventors have discovered that amorphous silicon (a-Si) is an especially suitable material for use as the one or more higher refractive index materials 40. In addition to having a relatively high refractive index (approximately 3.77 at 1550 nm), amorphous silicon (a-Si) has a relatively high optical absorption in the ultraviolet range and visible light range, but tolerable optical absorption in the range of 900-1800 nm. More complete refractive index and optical absorption data as a function of wavelength is provided below. The thicknesses and quantity of layers of amorphous silicon (a-Si), along with the other layers of the layered film 36 and second layered film 38 (if utilized) can thus provide a window 24 with low percentage transmittance of electromagnetic radiation in the ultraviolet range and visible light range (due in part to the optical absorbance of the amorphous silicon at those wavelength ranges) but high percentage transmittance in the desired portions of the infrared range. The examples below and other embodiments not utilizing amorphous silicon (a-Si) or some other material with similar optical absorbance properties may utilize primarily optical interference to provide the window 24 with the desired optical properties (e.g., low transmittance and/or high reflectance in the range of 300 nm-700 nm but high transmittance and low reflectance at 1550 nm or some range including 1550 nm). The examples below and other embodiments that do utilize amorphous silicon (a-Si) or some other material with similar optical absorbance properties utilize optical absorbance and optical interference to provide the window 24 with the desired optical properties. Thus, embodiments utilizing amorphous silicon (a-Si) or some other material with similar optical absorbance properties can provide the window 24 with the desired optical properties with less layers in the layered film 36 and second layered film 38 than embodiments not utilizing amorphous silicon (a-Si) or some other material with similar optical absorbance properties. In embodiments, the second layered film 38 includes one or more layers of amorphous silicon (a-Si) as one of the one or more higher refractive index materials 40 while the layered film 36 does not.

In embodiments, the window 24 additionally includes organic dyes to decrease percentage transmittance of wavelengths within the visible light region (such as from 450 nm to 650 nm, or from 380 nm to 700 nm) to less than 5%, or less than 3%, or even less than 1%. Examples of organic dyes that absorb wavelengths within the visible region but transmit at 905 nm and 1550 nm include those available from Adam Gates & Company under the trade names 800 nm Long Pass and AG-300-800 nm Ink. However, use of amorphous silicon (a-Si) or some other material with similar optical absorbance properties as one of the one or more higher refractive index materials 40 in the layered film 36 and/or second layered film 38 can obviate use of organic dyes. Further, layers of amorphous silicon (a-Si) can be directly integrated into the layered film 36 and/or second layered film 38 using the same sputtering process as the other layers of the layered film 36 and/or second layered film 38, and thus provide for simpler fabrication of the window 24 than integrating organic dyes into the window 24.

The layers of the layered film 36 and the second layered film 38 (i.e., layers of the higher refractive index material 40 and the lower refractive index material 42) may be formed by any known method in the art, including discrete deposition or continuous deposition processes. In one or more embodiments, the layer may be formed using only continuous deposition processes, or, alternatively, only discrete deposition processes.

EXAMPLES

The following examples are all modeled examples using computer facilitated modeling to demonstrate how the quantity, thicknesses, and materials of the layers of the layered film 36 (and the second layered film 38, if utilized) can be configured so that the window 24 has a desired average percentage transmittance and average percentage reflectance as a function of the wavelength and angle of incidence of the incident electromagnetic radiation.

The refractive indices (n) and optical absorbance (k), as a function of wavelength, of each of the alternating layers of the higher refractive index material 40 and the lower refractive index material 42 of the layered film 36, as well as the substrate 30, were measured using spectroscopic ellipsometry. The refractive indices and optical absorbance for $Si_3N_4$, $SiO_2$, amorphous silicon (a-Si), and an aluminosilicate glass substrate (Corning code 2320) are provided in the Table A below. Those materials are utilized in the following examples as the higher refractive index materials 40, the lower refractive index materials 42, and the substrate 30.

TABLE A

| $Si_3N_4$ | | | $SiO_2$ | | |
|---|---|---|---|---|---|
| Wavelength (nm) | n | k | Wavelength (nm) | n | k |
| 250.24 | 2.27933 | 0.04165 | 250.8 | 1.52322 | 0 |
| 299.48 | 2.16414 | 0.00982 | 300.0 | 1.50437 | 0 |
| 350.31 | 2.09838 | 0.00191 | 350.8 | 1.49329 | 0 |
| 399.52 | 2.06302 | 7.50E−04 | 400.1 | 1.48656 | 0 |
| 450.3 | 2.03995 | 2.60E−04 | 450.9 | 1.48188 | 0 |

TABLE A-continued

| | | | | | |
|---|---|---|---|---|---|
| 499.45 | 2.02476 | 9.00E−05 | 500.1 | 1.47866 | 0 |
| 550.14 | 2.01353 | 3.00E−05 | 550.8 | 1.47621 | 0 |
| 600.76 | 2.00518 | 1.00E−05 | 599.9 | 1.47439 | 0 |
| 649.74 | 1.99893 | 1.00E−05 | 650.6 | 1.47291 | 0 |
| 700.22 | 1.9938 | 0 | 699.5 | 1.47175 | 0 |
| 750.6 | 1.98964 | 0 | 750.0 | 1.47076 | 0 |
| 849.48 | 1.98334 | 0 | 850.6 | 1.46922 | 0 |
| 949.45 | 1.97858 | 0 | 950.7 | 1.46804 | 0 |
| 1049.51 | 1.97478 | 0 | 1050.4 | 1.46708 | 0 |
| 1151.64 | 1.97153 | 0 | 1151.2 | 1.46625 | 0 |
| 1250.69 | 1.96876 | 0 | 1249.2 | 1.46552 | 0 |
| 1350.06 | 1.96622 | 0 | 1351.2 | 1.46481 | 0 |
| 1449.74 | 1.96381 | 0 | 1450.4 | 1.46414 | 0 |
| 1549.74 | 1.96148 | 0 | 1550.2 | 1.46349 | 0 |
| 1650.05 | 1.95918 | 0 | 1650.6 | 1.46283 | 0 |

| a-Si | | | Aluminosilicate glass (Corning Code 2320) | | |
|---|---|---|---|---|---|
| Wavelength (nm) | n | k | Wavelength (nm) | n | k |
| 250.4 | 1.80645 | 3.17399 | 250.5 | 1.56816 | 0.00013 |
| 299.6 | 2.89900 | 3.47705 | 299.6 | 1.54275 | 0.00001 |
| 350.3 | 4.03546 | 3.11774 | 350.3 | 1.52817 | 0 |
| 399.4 | 4.66221 | 2.36042 | 399.5 | 1.51945 | 0 |
| 450.1 | 4.84265 | 1.58664 | 450.2 | 1.51346 | 0 |
| 500.8 | 4.83545 | 1.06829 | 500.9 | 1.50926 | 0 |
| 549.8 | 4.70476 | 0.73415 | 549.9 | 1.50628 | 0 |
| 600.4 | 4.66145 | 0.49587 | 600.5 | 1.50395 | 0 |
| 650.9 | 4.54077 | 0.32436 | 651.0 | 1.50213 | 0 |
| 699.7 | 4.41165 | 0.20913 | 699.8 | 1.50072 | 0 |
| 750.0 | 4.28595 | 0.13688 | 750.1 | 1.49952 | 0 |
| 850.1 | 4.10088 | 0.06027 | 850.2 | 1.49769 | 0 |
| 949.6 | 3.97966 | 0.03514 | 949.7 | 1.49633 | 0 |
| 1049.5 | 3.91473 | 0.02295 | 1049.7 | 1.49525 | 0 |
| 1151.0 | 3.86758 | 0.02042 | 1151.1 | 1.49434 | 0 |
| 1249.6 | 3.82875 | 0.01678 | 1249.7 | 1.49357 | 0 |
| 1352.2 | 3.80389 | 0.01574 | 1352.3 | 1.49284 | 0 |
| 1451.9 | 3.78466 | 0.01327 | 1452.1 | 1.49218 | 0 |
| 1548.8 | 3.77155 | 0.00921 | 1549.0 | 1.49157 | 0 |
| 1649.6 | 3.76195 | 0.00425 | 1649.8 | 1.49095 | 0 |

The refractive indices thus measured were then used to calculate transmission and reflectance spectra. The modeled examples use a single refractive index value in their descriptive tables for convenience, which corresponds to a point selected from the refractive index dispersion curves at about 1550 nm wavelength.

Example 1—The window 24 of Example 1 included a layered film 36 over a first surface 32 of a substrate 30 of an aluminosilicate glass (Corning code 2320). The layered film 36 included nine (9) alternating layers of $SiO_2$ as the lower refractive index material 42 and $Si_3N_4$ as the higher refractive index material 40. The thicknesses of the layers of the layered film 36 are configured as set forth in Table 1 below to provide the percentage transmittance and percentage reflectance as set forth in FIGS. 6A-6D.

TABLE 1

Example 1 Layer Design

| Layer | Material | Refractive Index @1550 nm | Physical Thickness (nm) |
|---|---|---|---|
| Medium | Air | 1 | |
| 1 | $SiO_2$ | 1.4635 | 302.0 |
| 2 | $Si_3N_4$ | 1.9615 | 245.3 |
| 3 | $SiO_2$ | 1.4635 | 26.8 |
| 4 | $Si_3N_4$ | 1.9615 | 2000.0 |
| 5 | $SiO_2$ | 1.4635 | 46.5 |
| 6 | $Si_3N_4$ | 1.9615 | 115.3 |
| 7 | $SiO_2$ | 1.4635 | 140.4 |
| 8 | $Si_3N_4$ | 1.9615 | 40.4 |

TABLE 1-continued

Example 1 Layer Design

| Layer | Material | Refractive Index @1550 nm | Physical Thickness (nm) |
|---|---|---|---|
| 9 | $SiO_2$ | 1.4635 | 25.0 |
| Substrate 30 | Aluminosilicate glass (2320) | 1.4916 | 1000000 |
| Medium | Air | 1 | |

Figure 6A:
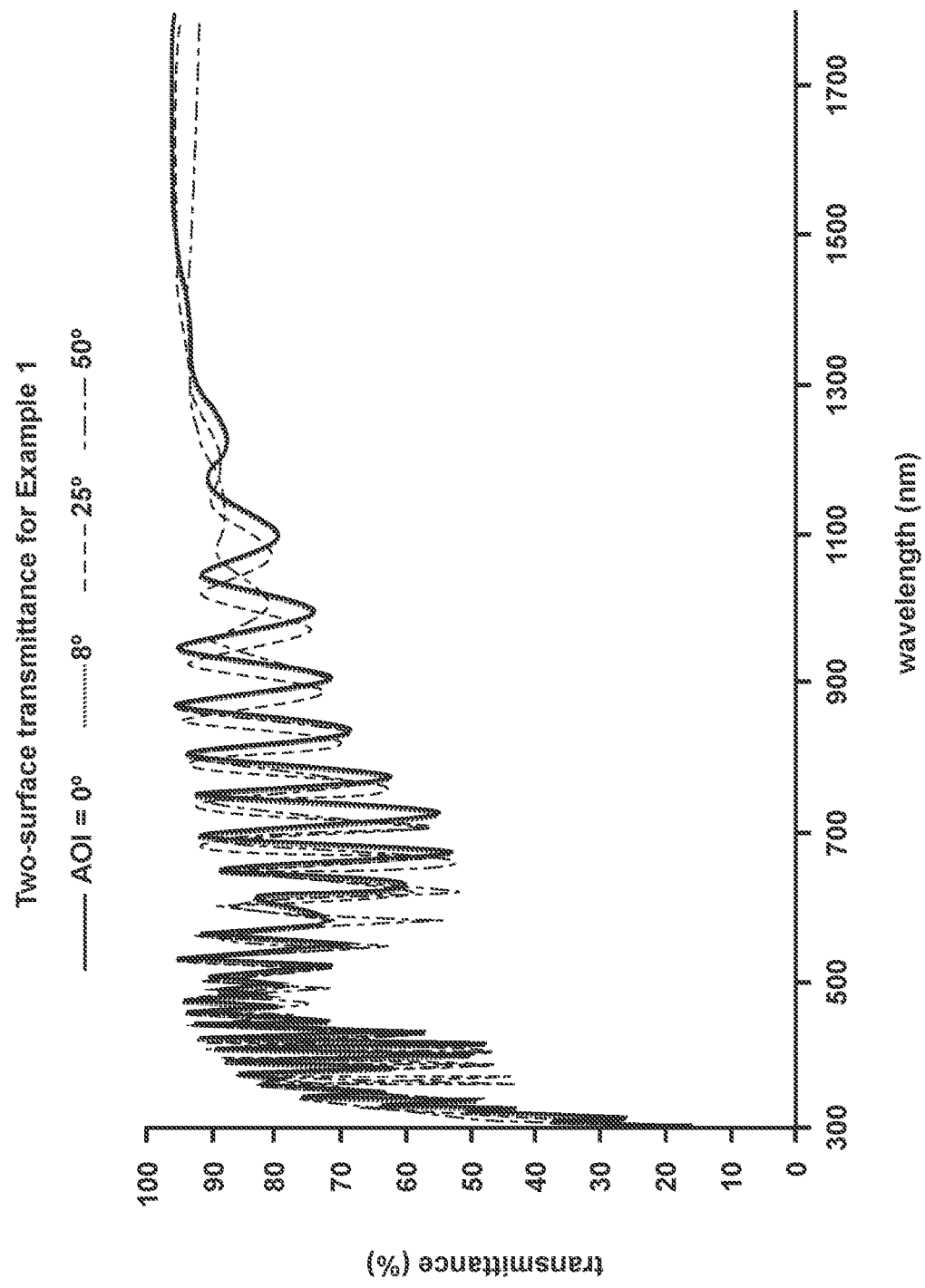
FIGS. 6A and 6B are graphs pertaining to an example window, specifically Example 1, illustrating percentage transmittance of electromagnetic radiation as a function of wavelength and angle of incidence of the electromagnetic radiation through the window.
Figure 6B:
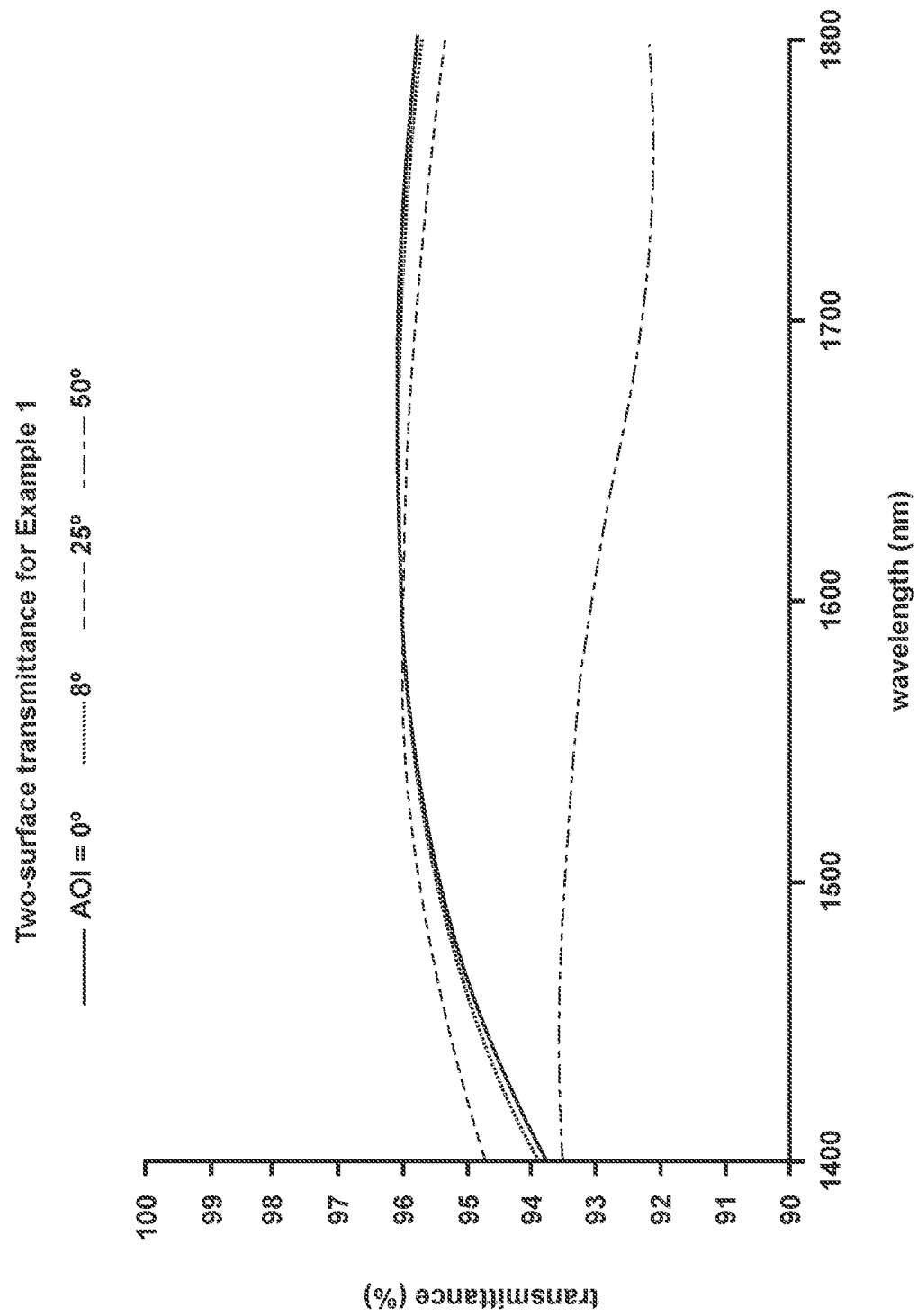

As revealed in FIG. 6A, the quantity, thicknesses, and materials of the layered film 36 have been configured so that the window 24 of Example 1 has a percentage transmittance of above 90 percent for all angles of incidence up to 50° for the approximate wavelength range of 1300 nm to 1800 nm, and above 70 percent for all angles of incidence up to 50° for the approximate wavelength range of 850 nm to 1800 nm. The percentage transmittance oscillates widely as a function of wavelength for wavelengths within the approximate range of 300 nm to 850 nm. As revealed in FIG. 6B, the quantity, thicknesses, and materials of the layered film 36 have been configured so that the window 24 of Example 1 has a percentage transmittance of above 95.5 percent for the wavelength of 1550 nm for all angles of incidence up to 25°, and above 95 percent for the wavelength range of 1500 nm to 1800 nm for all angles of incidence up to 25°. Note that only the first surface 32 of the substrate 30 has the layered film 36. The window 24 does not include a second layered film 38 over the second surface 34 of the substrate 30. The uncoated second surface 34 has a percentage reflectance of about 4 percent, and thus the highest possible percentage transmittance through the window 24 is approximately 96 percent.

Figure 6C:
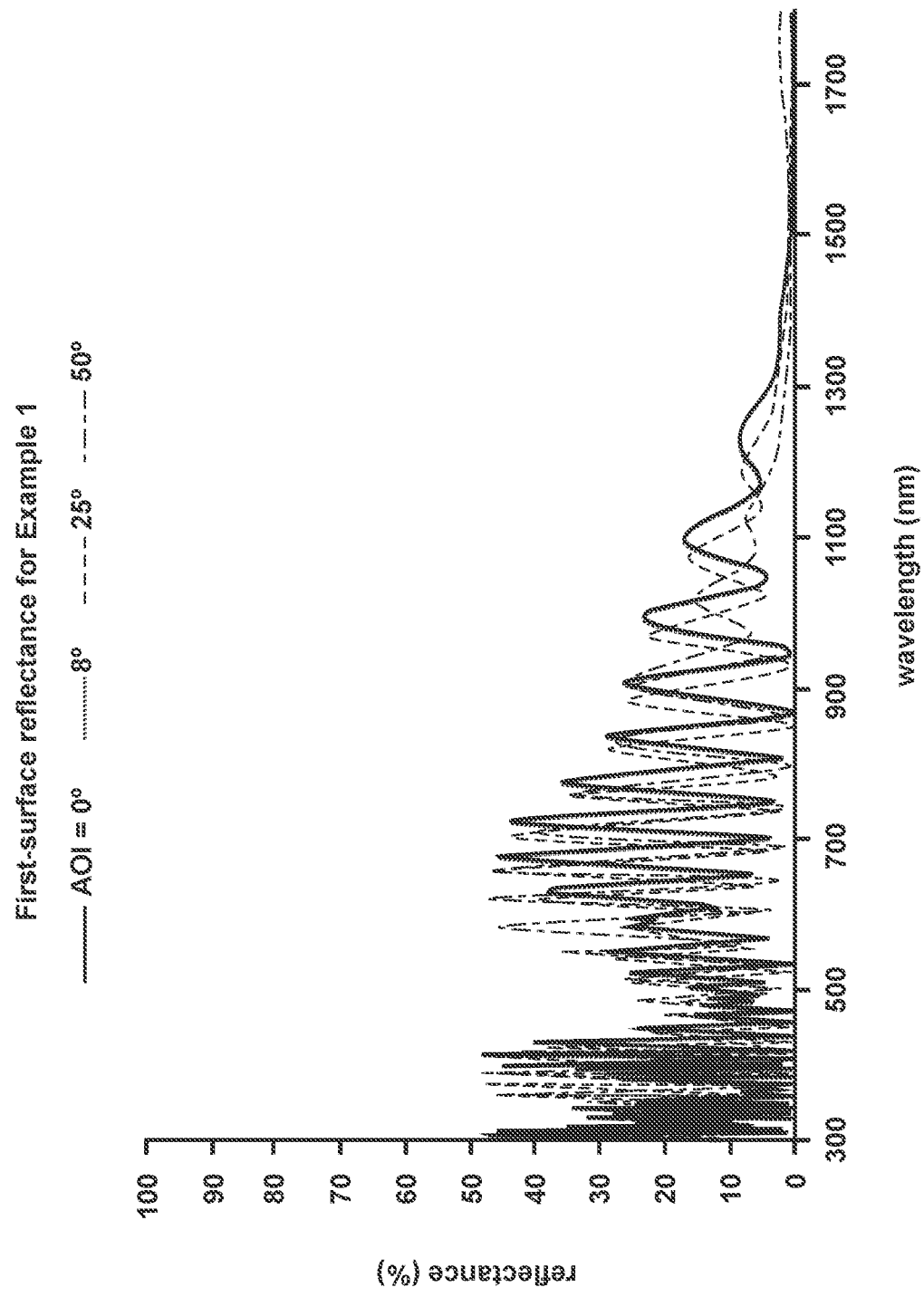
FIGS. 6C and 6D are graphs pertaining to Example 1, illustrating percentage reflectance of electromagnetic radiation as a function of wavelength and angle of incidence of the electromagnetic radiation off of the window.
Figure 6D:
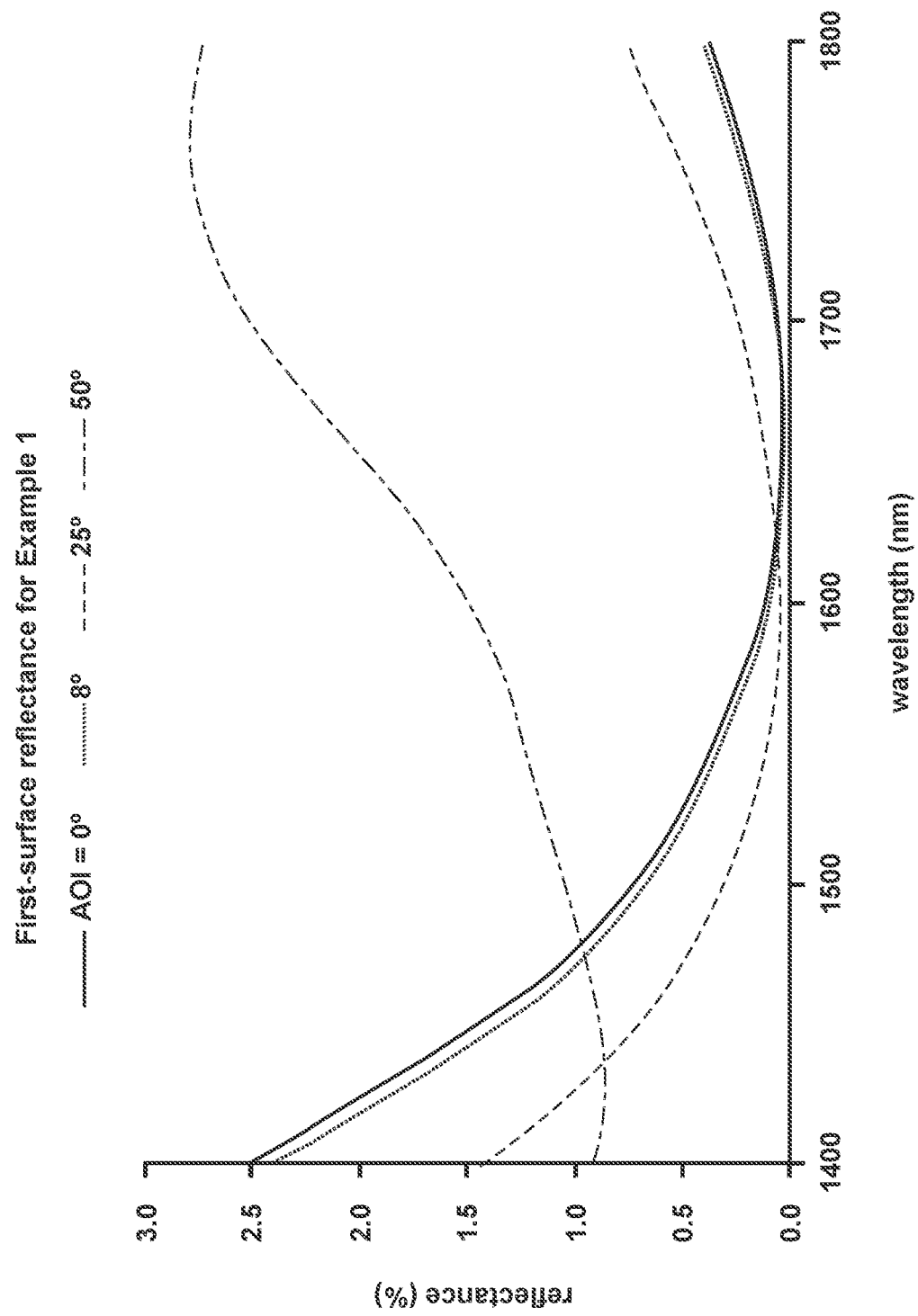

As revealed in FIG. 6C, the quantity, thicknesses, and materials of the layered film 36 have been configured so that the window 24 of Example 1 has a percentage reflectance off of the terminal surface 44 of the layered film 36 of under 10 percent for all angles of incidence up to 50° for the approximate wavelength range of 1150 nm to 1800 nm. The percentage reflectance oscillates widely as a function of wavelength for wavelengths within the approximate range of 300 nm to 850 nm. As revealed in FIG. 6D, the quantity, thicknesses, and materials of the layered film 36 have been configured so that the window 24 of Example 1 has a percentage reflectance off of the terminal surface 44 of the layered film 36 of under 1.25 percent for all angles of incidence up to 50° for the wavelength of 1550 nm, and under 0.75 percent for all angles of incidence up to 25° for the approximate wavelength range of 1500 nm to 1800 nm.

Example 2—The window 24 of Example 2 included a layered film 36 over a first surface 32 of a substrate 30 of an aluminosilicate glass (Corning code 2320), and a second layered film 38 over a second surface 34 of the substrate 30. The layered film 36 included seven (7) alternating layers of $SiO_2$ as the lower refractive index material 42 and $Si_3N_4$ as the higher refractive index material 40. The second layered film 38 included eighty-one (81) alternating layers of $SiO_2$ as the lower refractive index material 42 and $Si_3N_4$ as the higher refractive index material 40. The thicknesses of the layers of the layered film 36 and the second layered film 38 are configured as set forth in Table 2 below to provide the percentage transmittance and percentage reflectance as set forth in FIGS. 7A-7E. The maximized thickness layer of the high hardness material $Si_3N_4$ (5000 nm) as the higher refractive index material 40 is the second layer of the layered film 36 and adjacent the outermost layer of the layered film 36 providing the terminal surface 44 of the window 24. Because both the first surface 32 and second surface 34 of the substrate 30 are covered by the layered film 36 and the second layered film 38 respectively, the percentage reflectance values provided are for reflection from both sides of the entire window 24, and the percentage transmittance values provided are for transmittance through the entire window 24 (as they are for Examples 3-5 as well).

TABLE 2

Example 2 Layer Design

| Layer | Material | Refractive Index @1550 nm | Physical Thickness (nm) |
|---|---|---|---|
| Medium | Air | 1 | |
| 1 | $SiO_2$ | 1.4635 | 264.7 |
| 2 | $Si_3N_4$ | 1.9615 | 5000.0 |
| 3 | $SiO_2$ | 1.4635 | 40.2 |
| 4 | $Si_3N_4$ | 1.9615 | 67.7 |
| 5 | $SiO_2$ | 1.4635 | 97.6 |
| 6 | $Si_3N_4$ | 1.9615 | 29.4 |
| 7 | $SiO_2$ | 1.4635 | 360.1 |
| Substrate | Aluminosilicate glass (2320) | 1.4916 | 1000000.0 |
| 8 | $SiO_2$ | 1.4635 | 70.5 |
| 9 | $Si_3N_4$ | 1.9615 | 39.0 |
| 10 | $SiO_2$ | 1.4635 | 83.7 |
| 11 | $Si_3N_4$ | 1.9615 | 46.9 |
| 12 | $SiO_2$ | 1.4635 | 78.3 |
| 13 | $Si_3N_4$ | 1.9615 | 47.4 |
| 14 | $SiO_2$ | 1.4635 | 77.7 |
| 15 | $Si_3N_4$ | 1.9615 | 47.5 |
| 16 | $SiO_2$ | 1.4635 | 74.1 |
| 17 | $Si_3N_4$ | 1.9615 | 47.1 |
| 18 | $SiO_2$ | 1.4635 | 74.2 |
| 19 | $Si_3N_4$ | 1.9615 | 48.1 |
| 20 | $SiO_2$ | 1.4635 | 73.1 |
| 21 | $Si_3N_4$ | 1.9615 | 48.4 |
| 22 | $SiO_2$ | 1.4635 | 74.8 |
| 23 | $Si_3N_4$ | 1.9615 | 50.0 |
| 24 | $SiO_2$ | 1.4635 | 71.9 |
| 25 | $Si_3N_4$ | 1.9615 | 50.3 |
| 26 | $SiO_2$ | 1.4635 | 75.2 |
| 27 | $Si_3N_4$ | 1.9615 | 50.9 |
| 28 | $SiO_2$ | 1.4635 | 73.5 |
| 29 | $Si_3N_4$ | 1.9615 | 53.8 |
| 30 | $SiO_2$ | 1.4635 | 81.4 |
| 31 | $Si_3N_4$ | 1.9615 | 60.0 |
| 32 | $SiO_2$ | 1.4635 | 94.9 |
| 33 | $Si_3N_4$ | 1.9615 | 64.7 |
| 34 | $SiO_2$ | 1.4635 | 86.2 |
| 35 | $Si_3N_4$ | 1.9615 | 57.0 |
| 36 | $SiO_2$ | 1.4635 | 74.9 |
| 37 | $Si_3N_4$ | 1.9615 | 59.1 |
| 38 | $SiO_2$ | 1.4635 | 98.2 |
| 39 | $Si_3N_4$ | 1.9615 | 65.7 |
| 40 | $SiO_2$ | 1.4635 | 79.7 |
| 41 | $Si_3N_4$ | 1.9615 | 56.0 |
| 42 | $SiO_2$ | 1.4635 | 82.0 |
| 43 | $Si_3N_4$ | 1.9615 | 62.8 |
| 44 | $SiO_2$ | 1.4635 | 95.6 |
| 45 | $Si_3N_4$ | 1.9615 | 61.0 |
| 46 | $SiO_2$ | 1.4635 | 82.2 |
| 47 | $Si_3N_4$ | 1.9615 | 61.2 |
| 48 | $SiO_2$ | 1.4635 | 83.1 |
| 49 | $Si_3N_4$ | 1.9615 | 56.0 |
| 50 | $SiO_2$ | 1.4635 | 147.0 |
| 51 | $Si_3N_4$ | 1.9615 | 61.4 |
| 52 | $SiO_2$ | 1.4635 | 85.9 |
| 53 | $Si_3N_4$ | 1.9615 | 90.8 |
| 54 | $SiO_2$ | 1.4635 | 91.7 |
| 55 | $Si_3N_4$ | 1.9615 | 56.9 |
| 56 | $SiO_2$ | 1.4635 | 103.1 |
| 57 | $Si_3N_4$ | 1.9615 | 85.1 |
| 58 | $SiO_2$ | 1.4635 | 90.8 |
| 59 | $Si_3N_4$ | 1.9615 | 71.1 |
| 60 | $SiO_2$ | 1.4635 | 110.6 |
| 61 | $Si_3N_4$ | 1.9615 | 99.6 |

TABLE 2-continued

Example 2 Layer Design

| Layer | Material | Refractive Index @1550 nm | Physical Thickness (nm) |
|---|---|---|---|
| 62 | $SiO_2$ | 1.4635 | 98.2 |
| 63 | $Si_3N_4$ | 1.9615 | 74.0 |
| 64 | $SiO_2$ | 1.4635 | 87.2 |
| 65 | $Si_3N_4$ | 1.9615 | 60.6 |
| 66 | $SiO_2$ | 1.4635 | 129.9 |
| 67 | $Si_3N_4$ | 1.9615 | 81.0 |
| 68 | $SiO_2$ | 1.4635 | 76.0 |
| 69 | $Si_3N_4$ | 1.9615 | 114.9 |
| 70 | $SiO_2$ | 1.4635 | 79.6 |
| 71 | $Si_3N_4$ | 1.9615 | 120.5 |
| 72 | $SiO_2$ | 1.4635 | 93.7 |
| 73 | $Si_3N_4$ | 1.9615 | 112.7 |
| 74 | $SiO_2$ | 1.4635 | 92.6 |
| 75 | $Si_3N_4$ | 1.9615 | 74.7 |
| 76 | $SiO_2$ | 1.4635 | 120.9 |
| 77 | $Si_3N_4$ | 1.9615 | 111.8 |
| 78 | $SiO_2$ | 1.4635 | 78.2 |
| 79 | $Si_3N_4$ | 1.9615 | 121.3 |
| 80 | $SiO_2$ | 1.4635 | 86.0 |
| 81 | $Si_3N_4$ | 1.9615 | 141.3 |
| 82 | $SiO_2$ | 1.4635 | 82.7 |
| 83 | $Si_3N_4$ | 1.9615 | 66.7 |
| 84 | $SiO_2$ | 1.4635 | 180.0 |
| 85 | $Si_3N_4$ | 1.9615 | 51.6 |
| 86 | $SiO_2$ | 1.4635 | 140.4 |
| 87 | $Si_3N_4$ | 1.9615 | 153.9 |
| 88 | $SiO_2$ | 1.4635 | 146.4 |
| Medium | Air | 1 | |

Figure 7A:
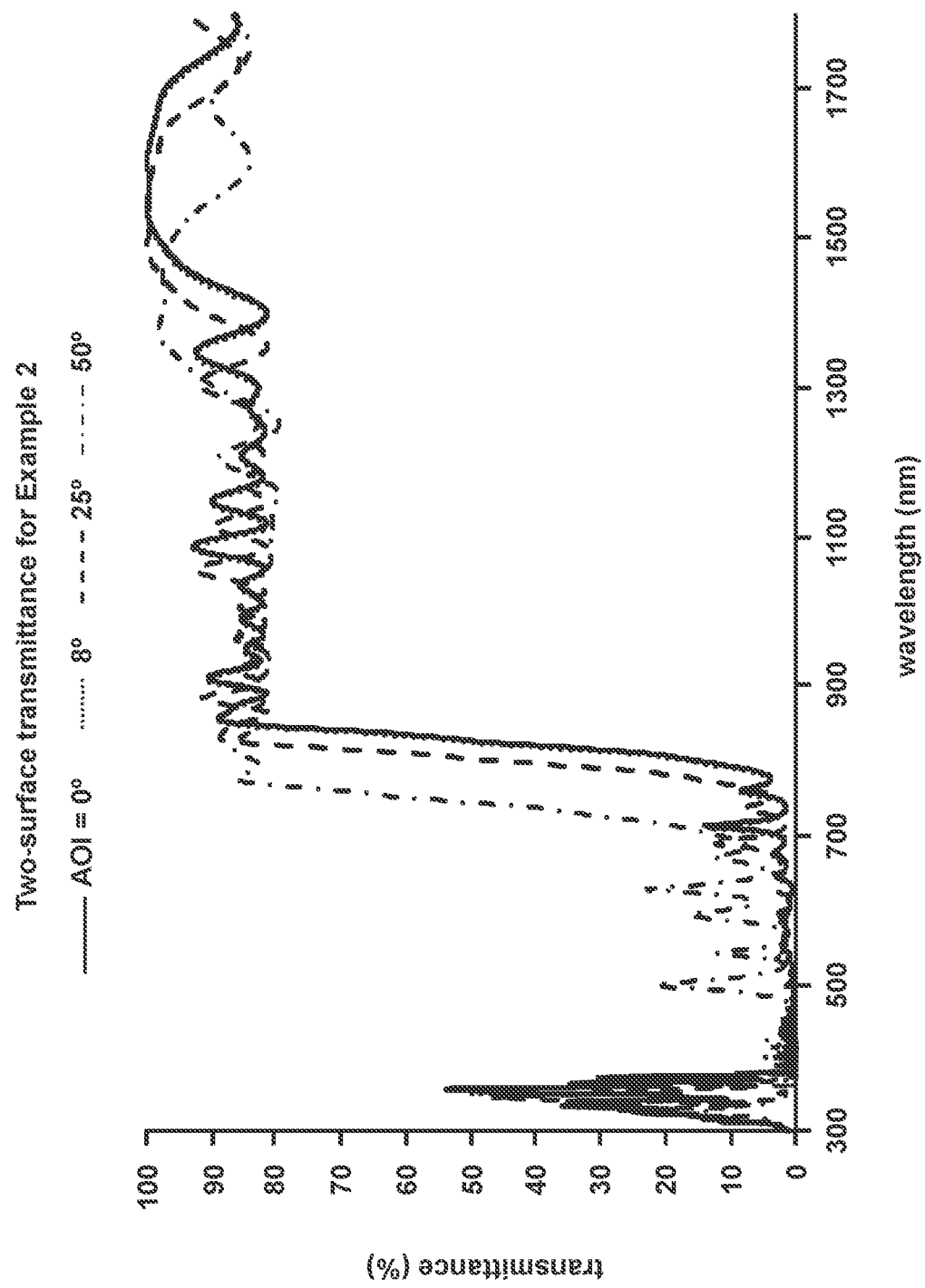
FIGS. 7A-7C are graphs pertaining to an example window, specifically Example 2, illustrating percentage transmittance of electromagnetic radiation as a function of wavelength and angle of incidence of the electromagnetic radiation through the window.
Figure 7B:
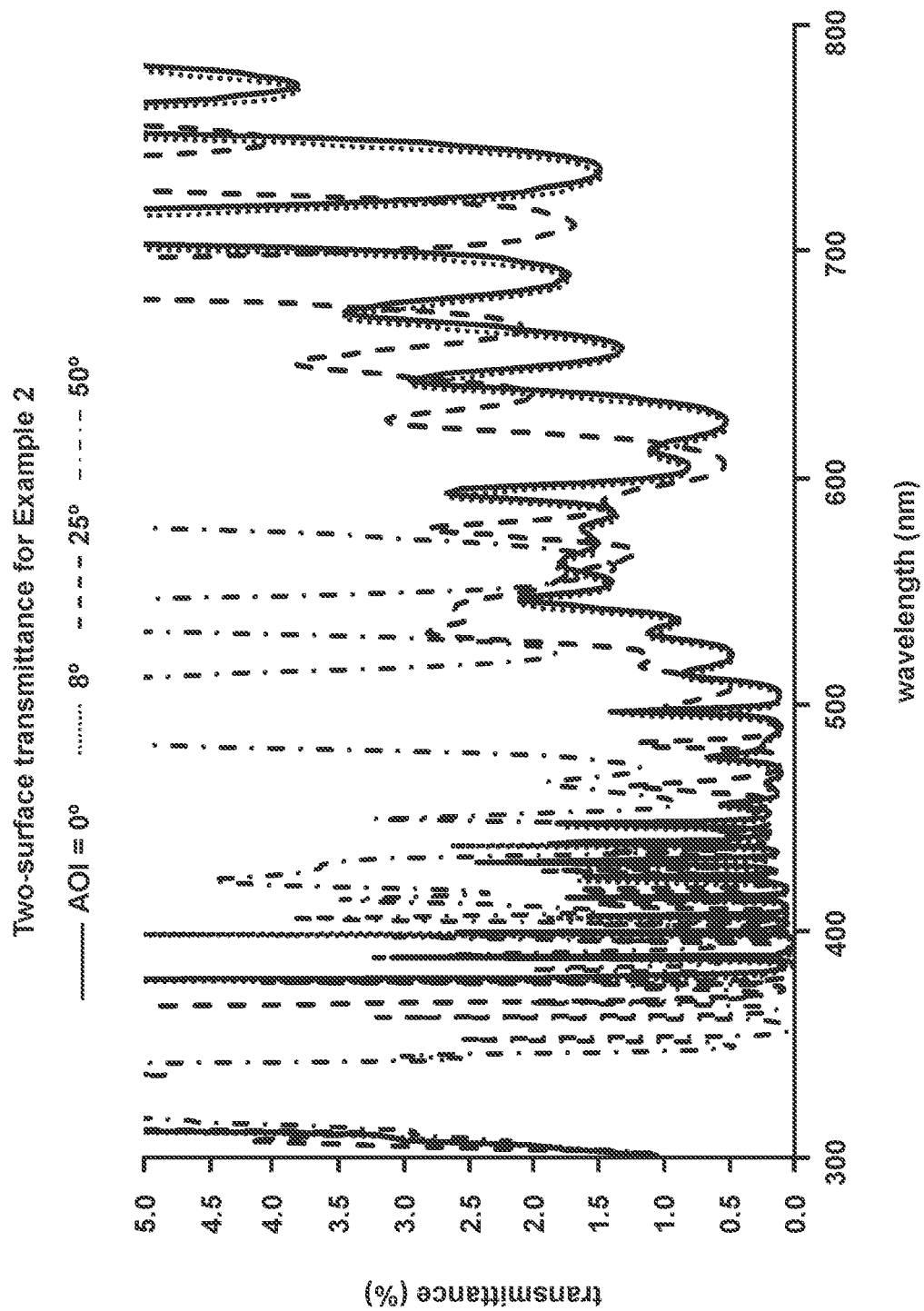
Figure 7C:
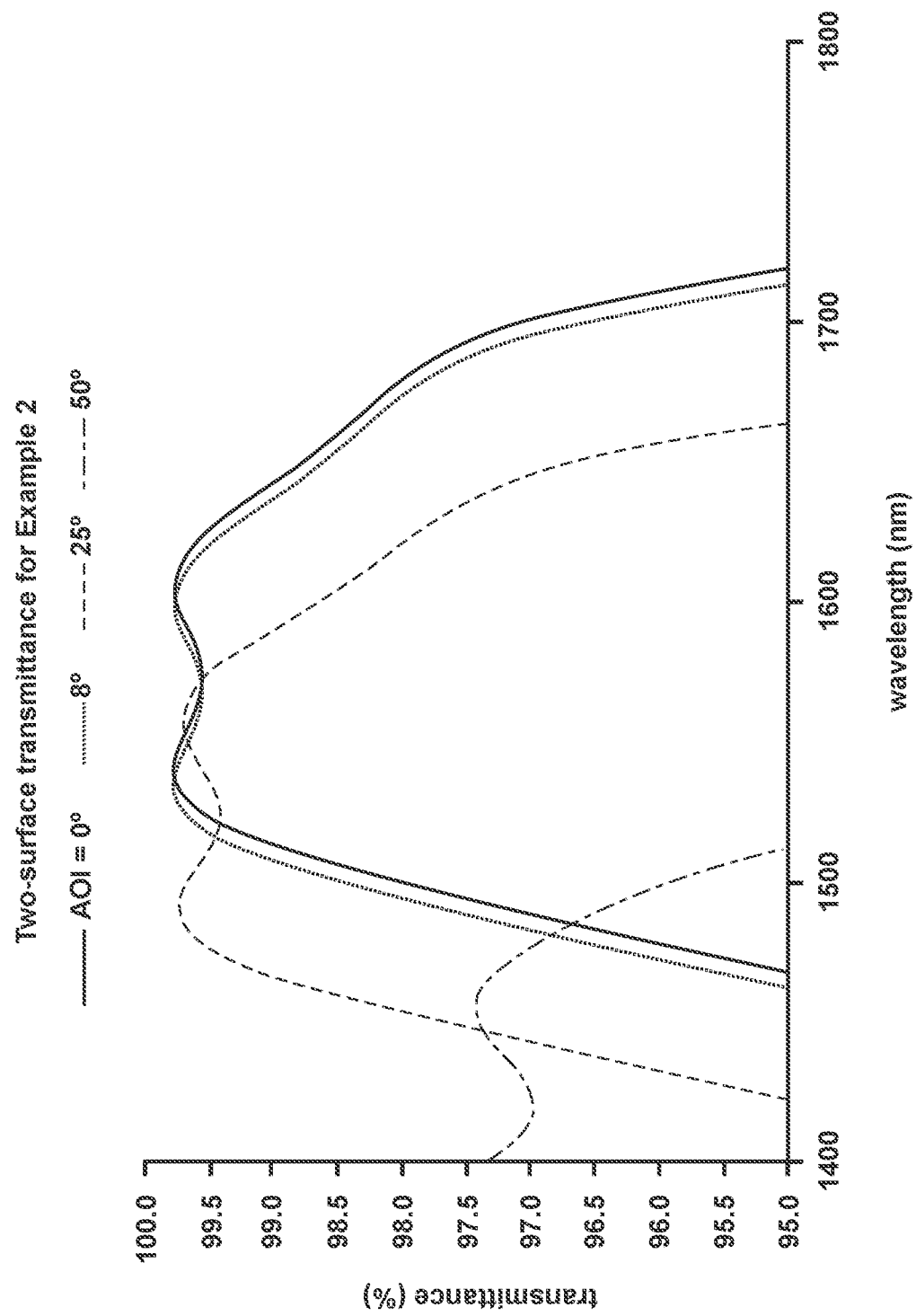

As revealed in FIG. 7A, the quantity, thicknesses, and materials of the layered film 36 and the second layered film 38 have been configured so that the window 24 of Example 2 has a percentage transmittance of above 80 percent for all angles of incidence up to 50° for the approximate wavelength range of 850 nm to 1800 nm, but below about 15 percent for all angles of incidence up to 25° for the approximate wavelength range of 380 nm to 750 nm. As revealed in FIG. 7B, the quantity, thicknesses, and materials of the layered film 36 and the second layered film 38 have been configured so that the window 24 of Example 2 has a percentage transmittance of below 5 percent for the approximate wavelength range of 400 nm to 650 nm for all angles of incidence up to 25°. As revealed in FIG. 7C, the quantity, thicknesses, and materials of the layered film 36 and the second layered film 38 have been configured so that the window 24 of Example 2 has a percentage transmittance of above 99.5 percent for all angles of incidence up to 25° for the wavelength of 1550 nm, and above 98 percent for all angles of incidence up to 8° for the wavelength range of 1500 nm to 1670 nm.

Figure 7D:
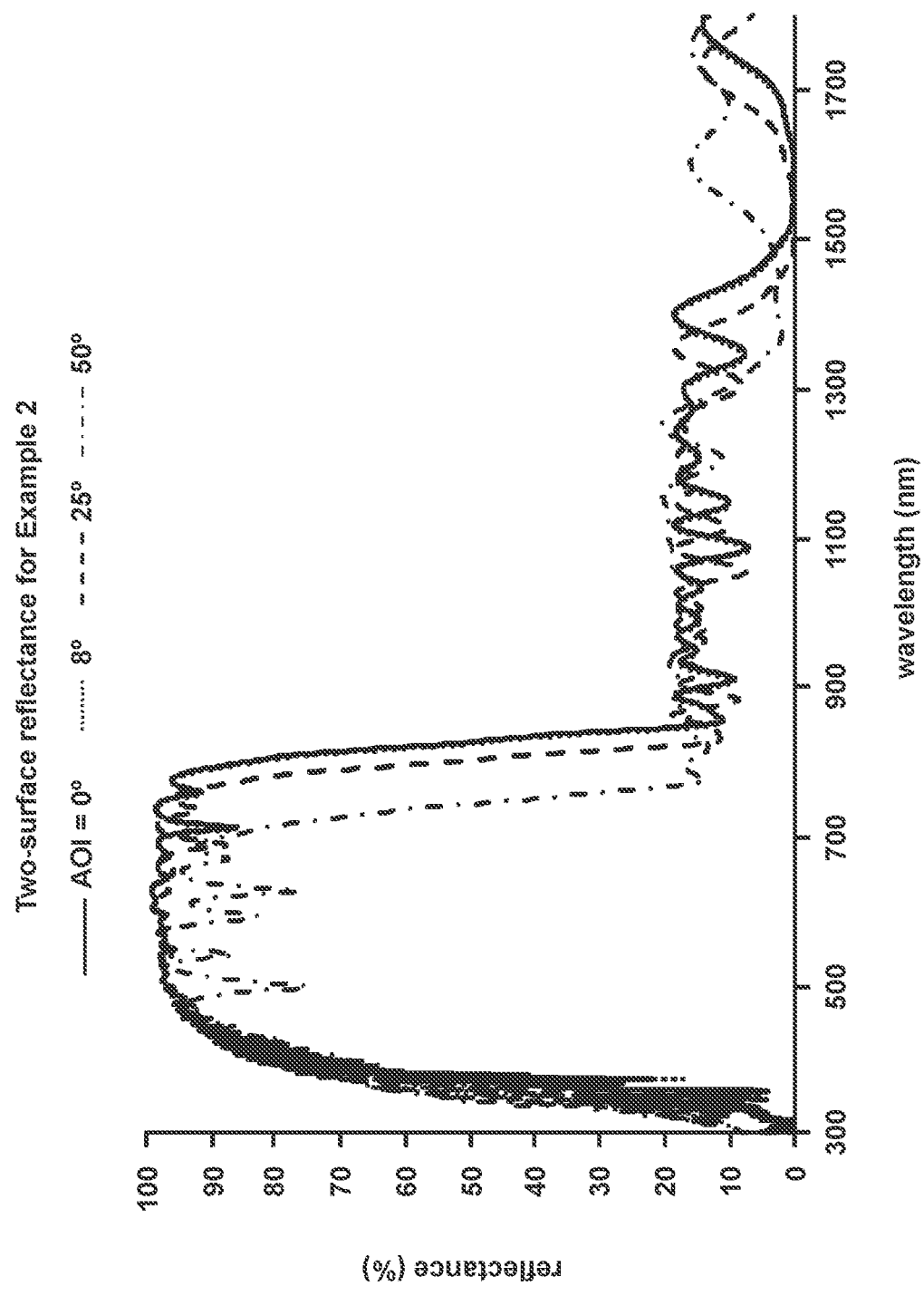
FIGS. 7D and 7E are graphs pertaining to Example 2, illustrating percentage reflectance of electromagnetic radiation as a function of wavelength and angle of incidence of the electromagnetic radiation off of the window.
Figure 7E:
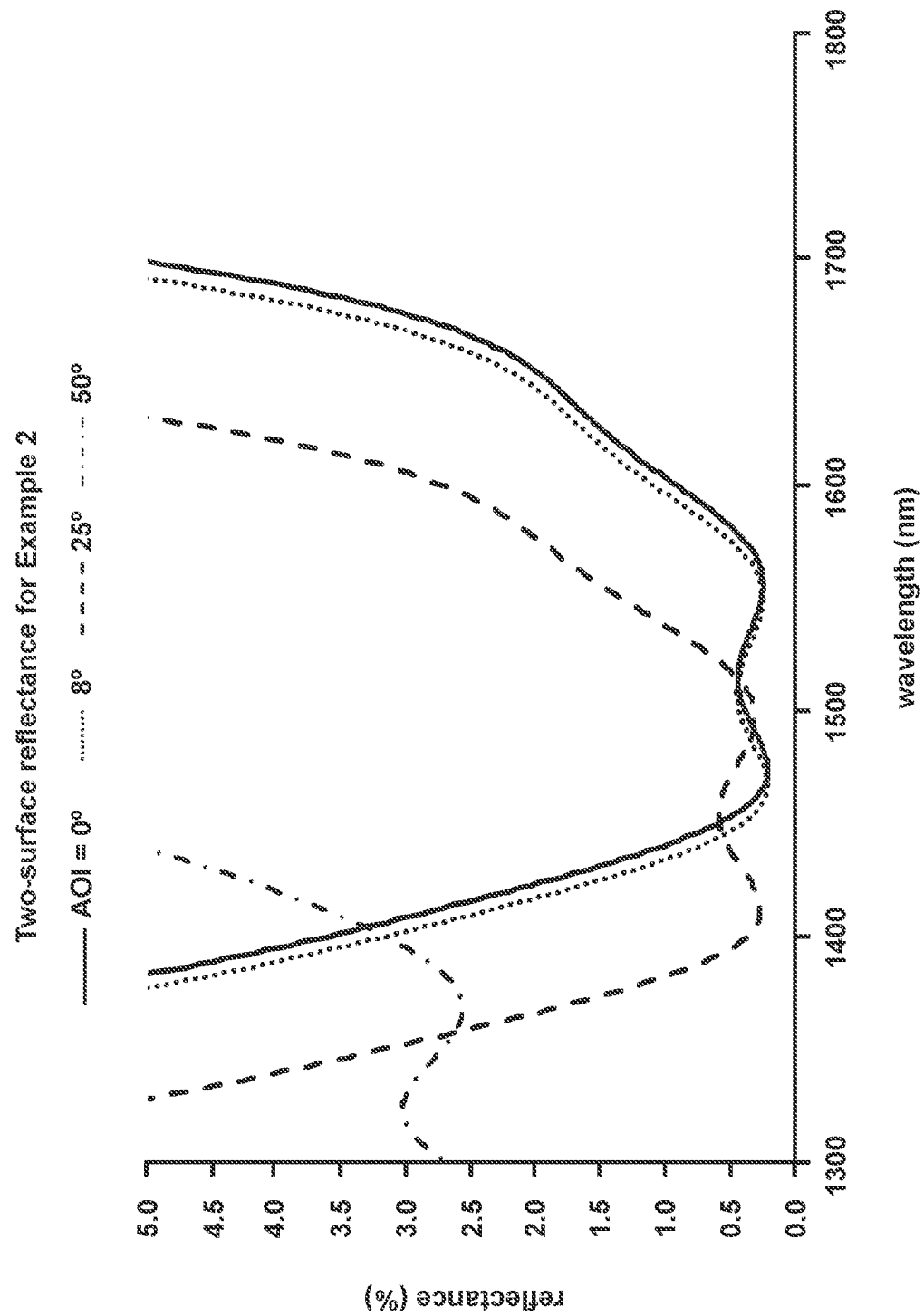

As revealed in FIG. 7D, the quantity, thicknesses, and materials of the layered film 36 and the second layered film 38 have been configured so that the window 24 of Example 2 has a percentage reflectance off the window 24 of: (a) under 20 percent for all angles of incidence up to 50° for the approximate wavelength range of 850 nm to 1800 nm; but (b) above 70 percent for all angles of incidence up to 50° for the approximate wavelength range of 400 nm to 700 nm; and (c) above 90 percent for all angles of incidence up to 25° for the wavelength range of 450 nm to 700 nm. As revealed in FIG. 7E, the quantity, thicknesses, and materials of the layered film 36 and the second layered film 38 have been configured so that the window 24 of Example 2 has a percentage reflectance off of the window 24 of: (a) less than 2 percent for all angles of incidence up to 25° for the wavelength range of 1500 nm to 1600 nm; (b) less than 0.5 percent for all angles of incidence up to 25° for the wavelength of 1550 nm; and (c) less than 10 percent for all angles of incidence up to 50° for the wavelength of 1550 nm.

Example 3—The window 24 of Example 3 included a layered film 36 over a first surface 32 of a substrate 30 of an aluminosilicate glass (Corning code 2320), and a second layered film 38 over a second surface 34 of the substrate. The layered film 36 included seven (7) alternating layers of $SiO_2$ as the lower refractive index material 42 and $Si_3N_4$ as the higher refractive index material 40. The second layered film 38 included nine (9) alternating layers of $SiO_2$ as the lower refractive index material 42 and amorphous silicon (a-Si) as the higher refractive index material 40. Use of ultraviolet range and visible light absorbing amorphous silicon (a-Si) allows for significantly greater suppression of percentage transmittance of those wavelengths through the window 24 with fewer layers in the layered film 36 and the second layered film 38 than without use of amorphous silicon (such as in Example 2). Although amorphous silicon (a-Si) is utilized, the window 24 still has a reasonably high percentage transmittance of the 905 nm and 1550 nm wavelengths relevant to LIDAR systems 12. The thicknesses of the layers of the layered film 36 and the second layered film 38 are configured as set forth in Table 3 below to provide the percentage transmittance and percentage reflectance as set forth in FIGS. 8A-8E. The maximized thickness layer of the high hardness material $Si_3N_4$ (5000 nm) as the higher refractive index material 40 is the second layer of the layered film 36 and adjacent the outermost layer of the layered film 36 providing the terminal surface 44 of the window 24.

TABLE 3

Example 3 Layer Design

| Layer | Material | Refractive Index @1550 nm | Physical Thickness (nm) |
| --- | --- | --- | --- |
| Medium | Air | 1 | |
| 1 | $SiO_2$ | 1.4635 | 264.7 |
| 2 | $Si_3N_4$ | 1.9615 | 5000.0 |
| 3 | $SiO_2$ | 1.4635 | 40.2 |
| 4 | $Si_3N_4$ | 1.9615 | 67.7 |
| 5 | $SiO_2$ | 1.4635 | 97.6 |
| 6 | $Si_3N_4$ | 1.9615 | 29.4 |
| 7 | $SiO_2$ | 1.4635 | 360.1 |
| Substrate | Aluminosilicate glass (2320) | 1.4916 | 1000000.0 |
| 8 | $SiO_2$ | 1.4635 | 117.5 |
| 9 | a-Si | 3.771 | 12.1 |
| 10 | $SiO_2$ | 1.4635 | 130.6 |
| 11 | a-Si | 3.771 | 18.6 |
| 12 | $SiO_2$ | 1.4635 | 107.2 |
| 13 | a-Si | 3.771 | 29.3 |
| 14 | $SiO_2$ | 1.4635 | 107.6 |
| 15 | a-Si | 3.771 | 13.5 |
| 16 | $SiO_2$ | 1.4635 | 277.5 |
| Medium | Air | 1 | |

Figure 8A:
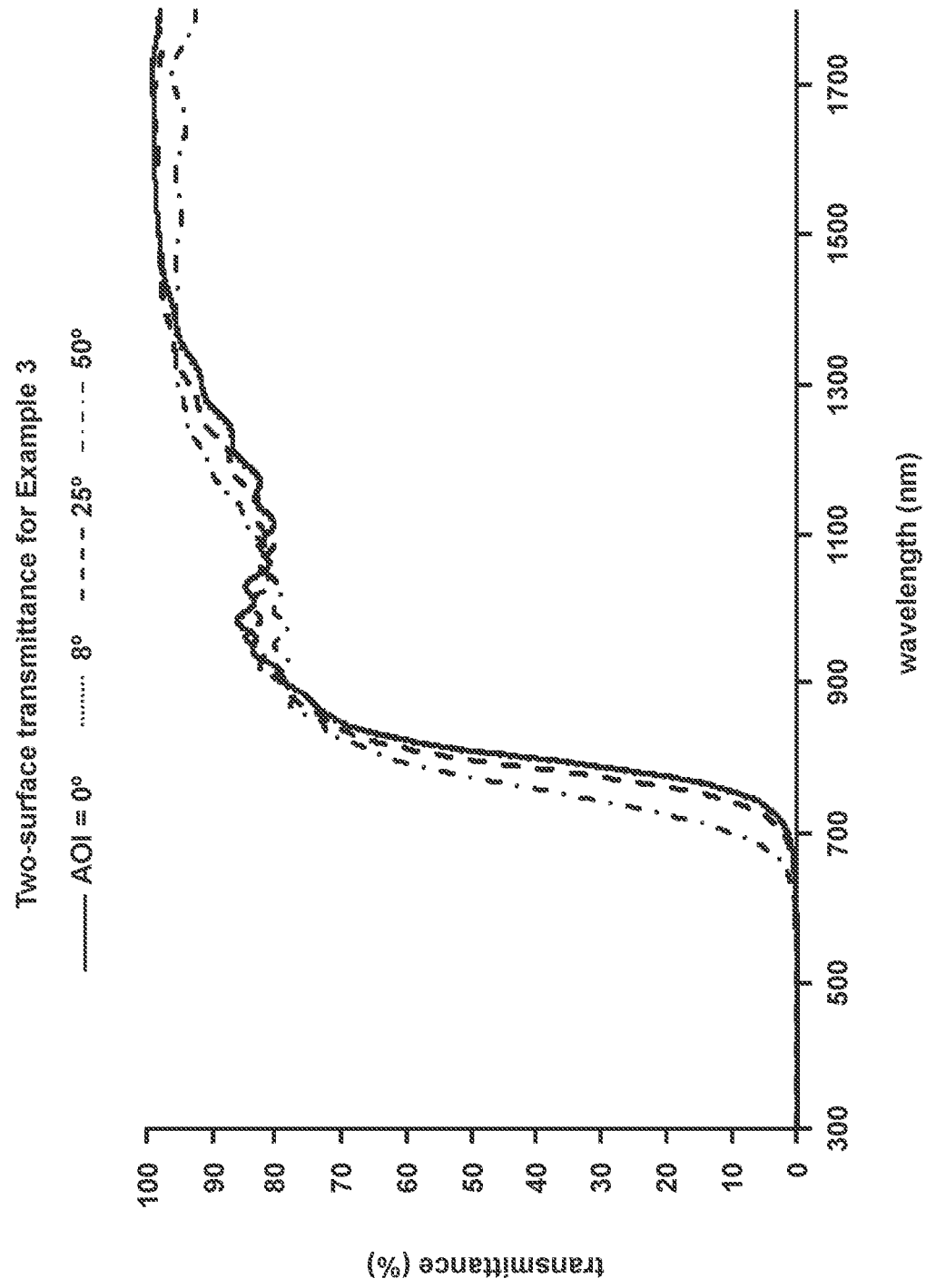
FIGS. 8A-8C are graphs pertaining to an example window, specifically Example 3, illustrating percentage transmittance of electromagnetic radiation as a function of wavelength and angle of incidence of the electromagnetic radiation through the window.
Figure 8B:
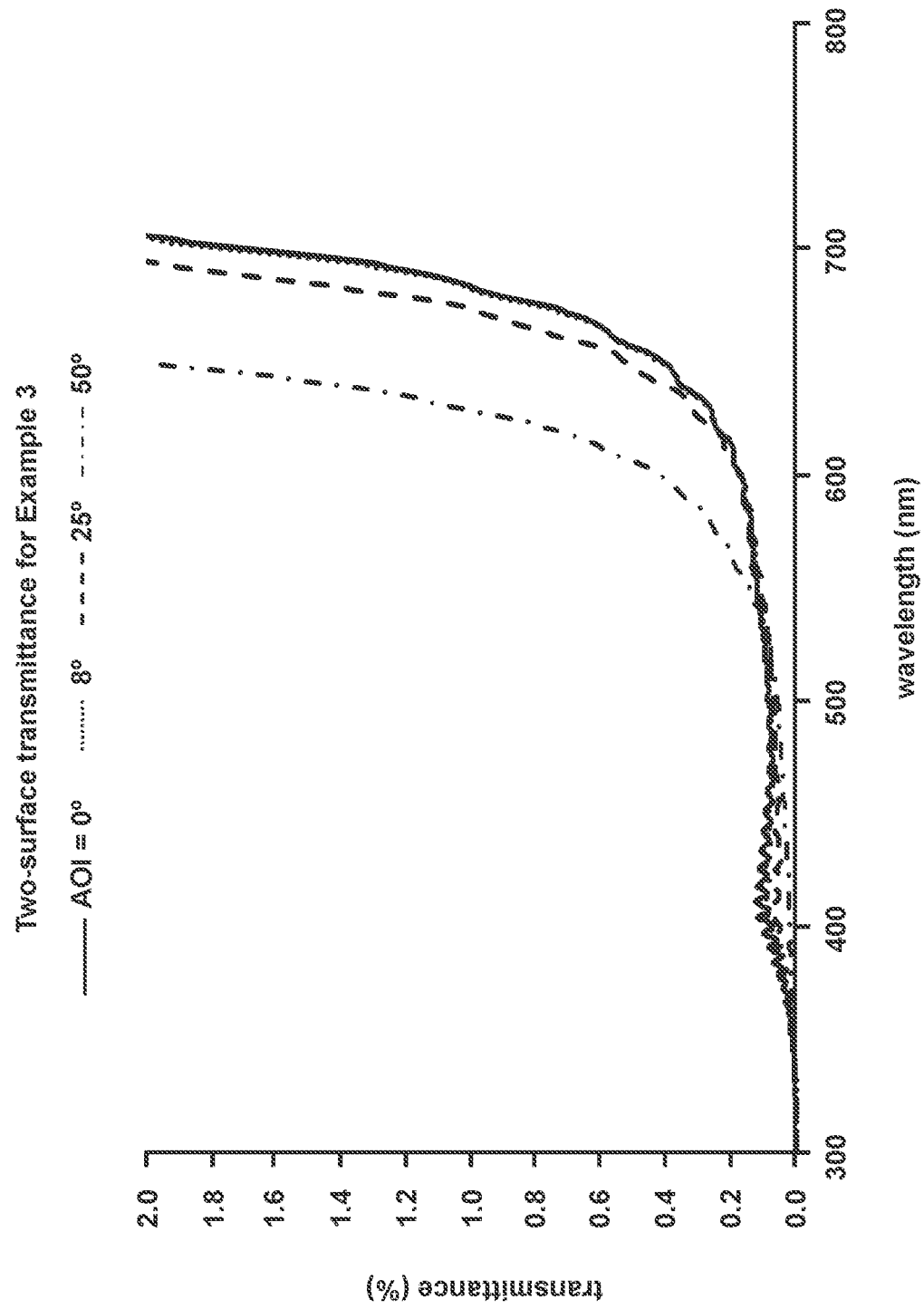
Figure 8C:
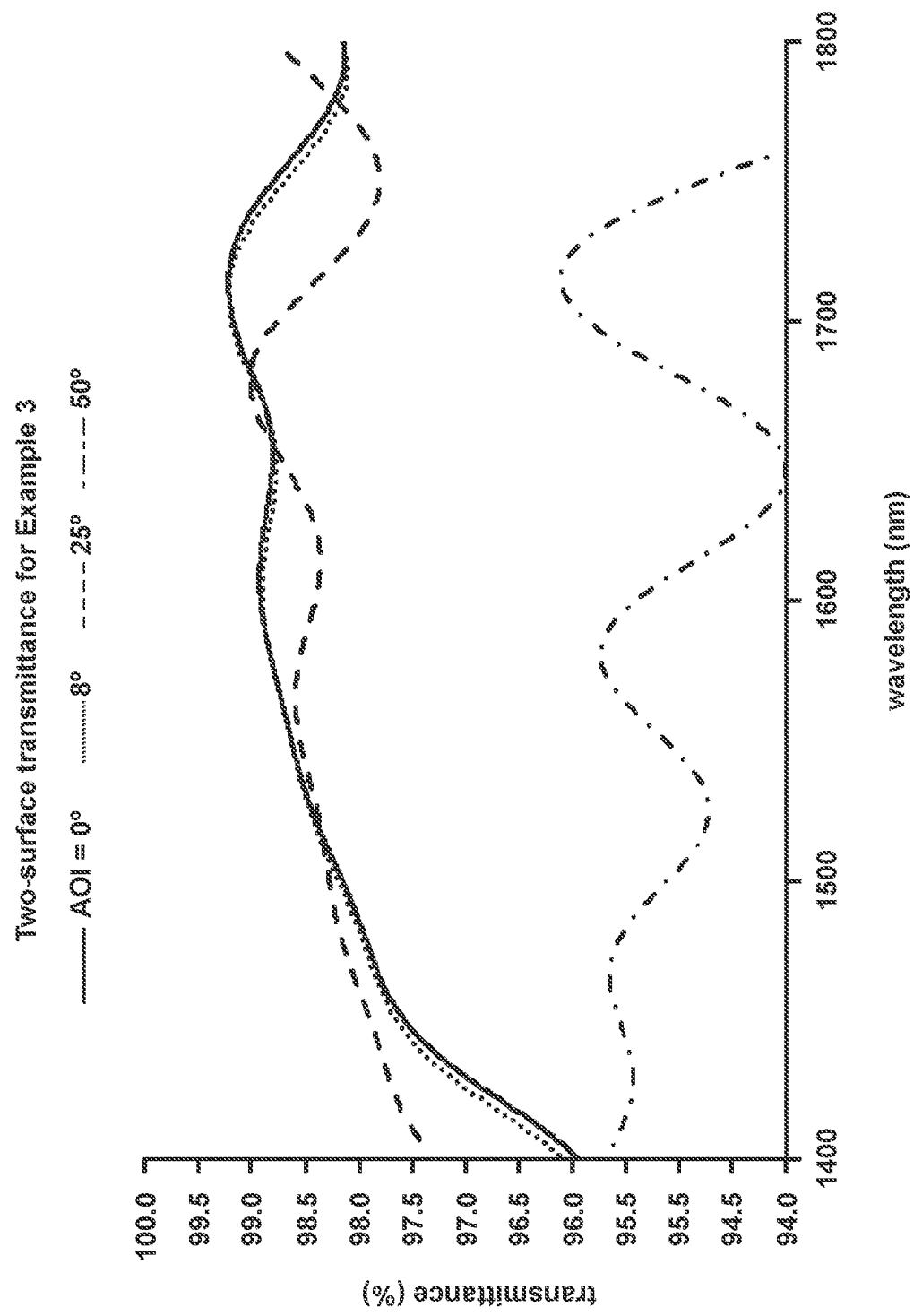

As revealed in FIG. 8A, the quantity, thicknesses, and materials of the layered film 36 and the second layered film 38 have been configured so that the window 24 of Example 3 has a percentage transmittance of: (a) above 75 percent for all angles of incidence up to 50°; (b) above 80 percent for all angles of incidence up to 50° for the approximate wavelength range of 1050 nm to 1800 nm; and (c) above 90 percent for all angles of incidence up to 50° for the approximate wavelength range of 1300 nm to 1800 nm; but (d) below about 10 percent for all angles of incidence up to about 50° for the approximate wavelength range of 300 nm to 700 nm. As revealed in FIG. 8B, the quantity, thicknesses, and materials of the layered film 36 and the second layered film 38 have been configured so that the window 24 of Example 3 has a percentage transmittance of: (a) below 2 percent for the approximate wavelength range of 300 nm to 650 nm for all angles of incidence up to about 50°; (b) below 2 percent for the approximate wavelength range of 300 nm to 700 nm for all angles of incidence up to about 8°; (c) below 0.2 percent for the wavelength range of 300 nm to 600 nm for all angles of incidence up to about 25°; (d) below 0.15 percent for the wavelength range of 300 nm to 575 nm for all angles of incidence up to 25°; and (e) below 2 percent for the wavelength range of 300 nm to 680 nm for all angles of incidence up to 25°. As revealed in FIG. 8C, the quantity, thicknesses, and materials of the layered film 36 and the second layered film 38 have been configured so that the window 24 of Example 3 has a percentage transmittance of: (a) above 94 percent for all angles of incidence up to 50° for the wavelength of 1550 nm; (b) above 98.5 percent for all angles of incidence up to 25° for the wavelength of 1550 nm; (c) above 94.5 percent for all angles of incidence up to 50° for the wavelength range of 1500 nm to 1600 nm; and (d) above 98 percent for all angles of incidence up to 25° for the wavelength range of 1500 nm to 1600 nm.

Figure 8D:
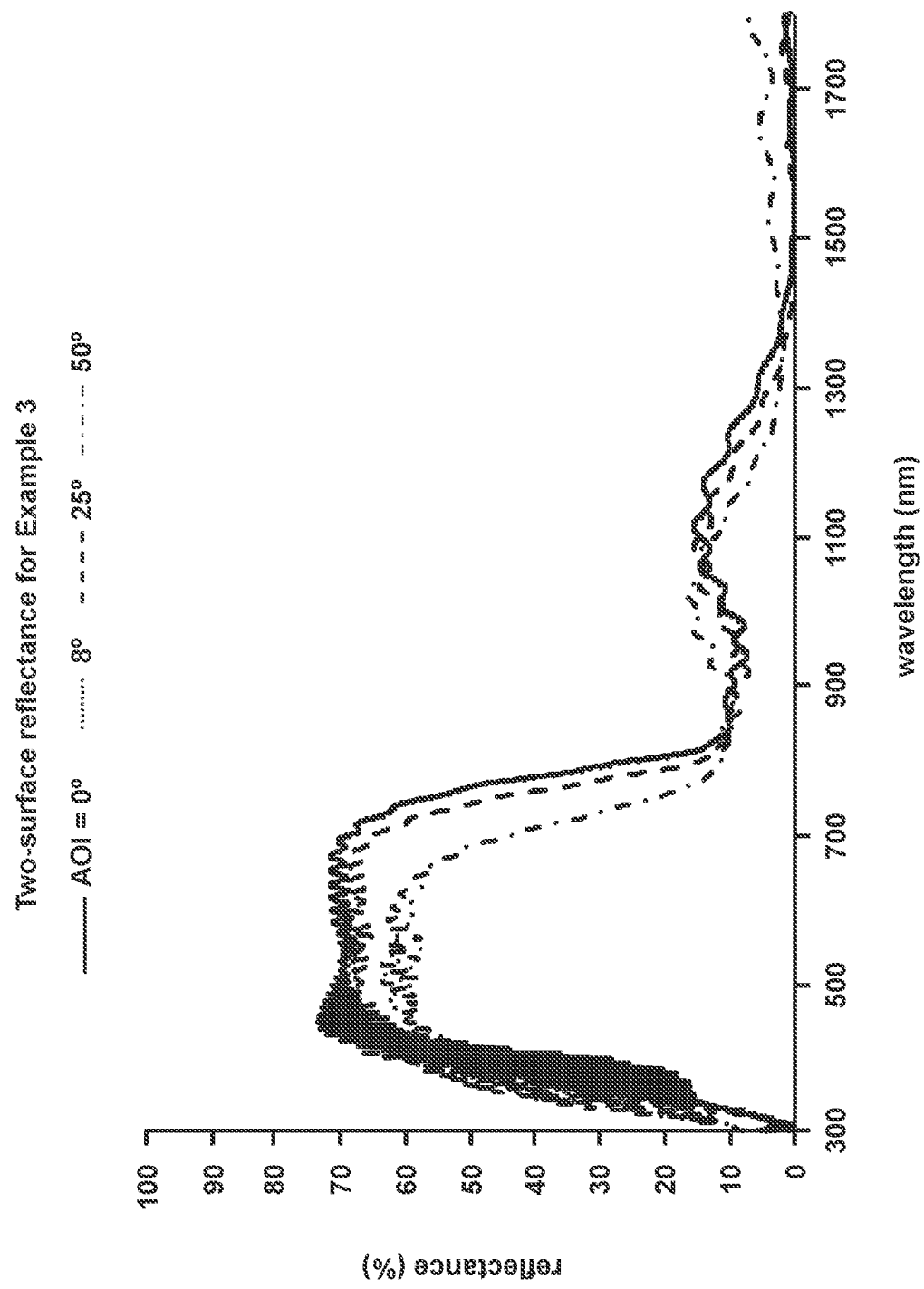
FIGS. 8D and 8E are graphs pertaining to Example 3, illustrating percentage reflectance of electromagnetic radiation as a function of wavelength and angle of incidence of the electromagnetic radiation off of the window.
Figure 8E:
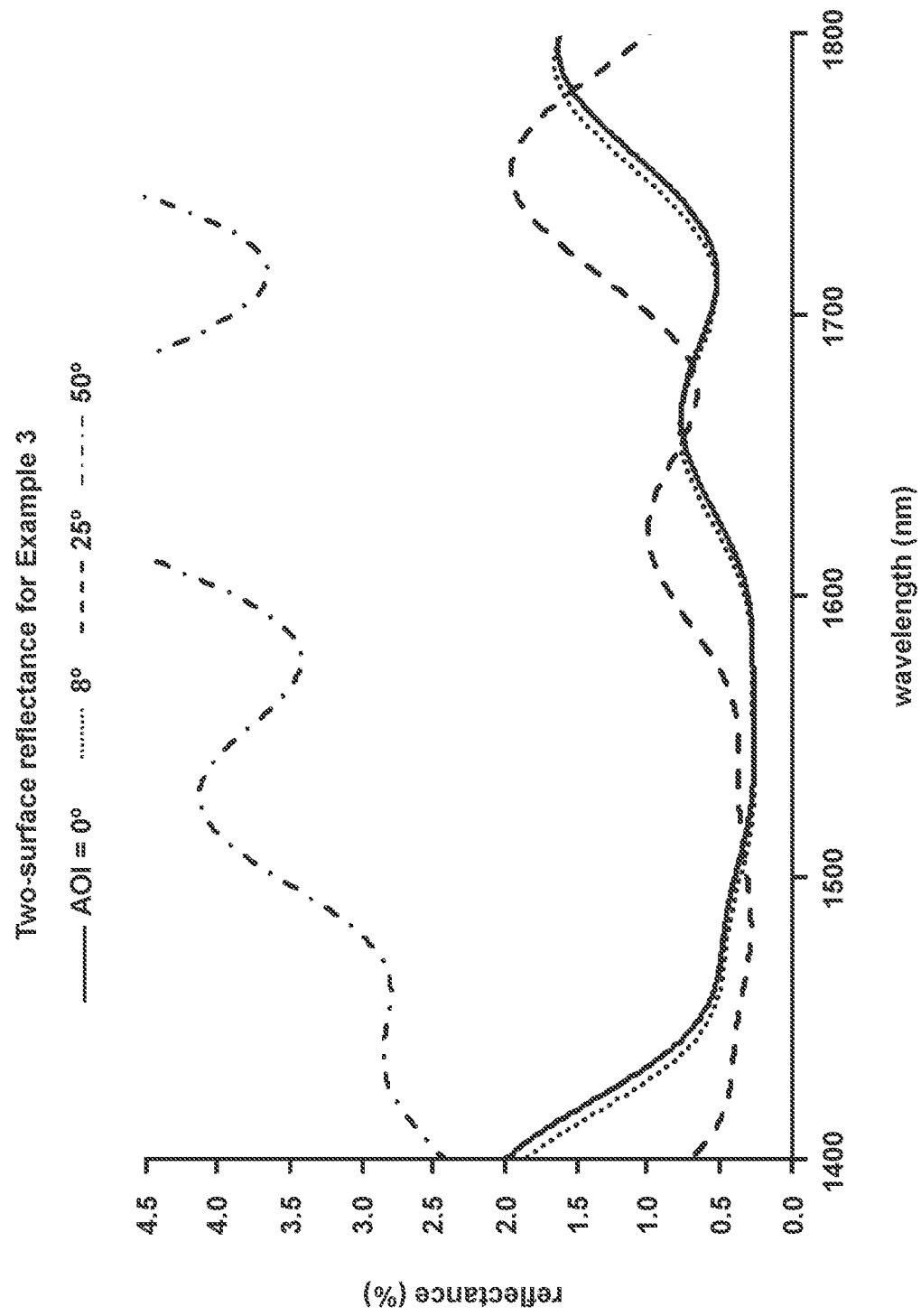

As revealed in FIG. 8D, the quantity, thicknesses, and materials of the layered film 36 and the second layered film 38 have been configured so that the window 24 of Example 3 has a percentage reflectance off the window 24 of: (a) under 20 percent for all angles of incidence up to 50° for the approximate wavelength range of 800 nm to 1800 nm; and (b) under 10 percent for all angles of incidence up to 50° for the approximate wavelength range of 1250 nm to 1800 nm; but (b) above 50 percent for all angles of incidence up to 50° for the approximate wavelength range of 450 nm to 6500 nm; and (c) above about 65 percent for all angles of incidence up to 8° for the wavelength range of about 450 nm to about 700 nm. As revealed in FIG. 8E, the quantity, thicknesses, and materials of the layered film 36 and the second layered film 38 have been configured so that the window 24 of Example 3 has a percentage reflectance off of the window 24 of: (a) less than 1 percent for all angles of incidence up to 25° for the wavelength range of 1500 nm to 1600 nm; (b) less than 0.5 percent for all angles of incidence up to 25° for the wavelength of 1550 nm; and (c) less than 4.5 percent for all angles of incidence up to 50° for the wavelength of 1550 nm.

Example 3A—The window 24 of Example 3A included a layered film 36 over a first surface 32 of a substrate 30 of an aluminosilicate glass (Corning code 2320), and a second layered film 38 over a second surface 34 of the substrate. The layered film 36 included seven (7) alternating layers of $SiO_2$ as the lower refractive index material 42 and $Si_3N_4$ as the higher refractive index material 40. The second layered film 38 included nine (9) alternating layers of $SiO_2$ as the lower refractive index material 42 and amorphous silicon (a-Si) as the higher refractive index material 40. The thicknesses of the layers of the layered film 36 and the second layered film 38 are configured as set forth in Table 3A below to provide the percentage transmittance and percentage reflectance as set forth in FIGS. 9A-9B. The window 24 of Example 3A is thus identical to the window 24 of Example 3 except that the maximized thickness layer of the high hardness material $Si_3N_4$ as the higher refractive index material 40 is 2000 nm thick instead of 5000 nm thick as in Example 3. This layer is still the second layer of the layered film 36 and adjacent the outermost layer of the layered film 36 providing the terminal surface 44 of the window 24.

Examples 3 and 3A illustrate the design flexibility (varying thicknesses of the maximized thickness layer of the higher refractive index material 40 while still reaching transmittance and reflectance criteria) that can be achieved depending on mechanical performance and cost targets for particular applications.

TABLE 3A

Example 3A Layer Design

| Layer | Material | Refractive Index @1550 nm | Physical Thickness (nm) |
|---|---|---|---|
| Medium | Air | 1 | |
| 1 | $SiO_2$ | 1.4635 | 264.7 |
| 2 | $Si_3N_4$ | 1.9615 | 2000.0 |
| 3 | $SiO_2$ | 1.4635 | 40.2 |
| 4 | $Si_3N_4$ | 1.9615 | 67.7 |
| 5 | $SiO_2$ | 1.4635 | 97.6 |
| 6 | $Si_3N_4$ | 1.9615 | 29.4 |
| 7 | $SiO_2$ | 1.4635 | 360.1 |
| Substrate | Aluminosilicate glass (2320) | 1.4916 | 1000000.0 |
| 8 | $SiO_2$ | 1.4635 | 117.5 |
| 9 | a-Si | 3.771 | 12.1 |
| 10 | $SiO_2$ | 1.4635 | 130.6 |
| 11 | a-Si | 3.771 | 18.6 |
| 12 | $SiO_2$ | 1.4635 | 107.2 |
| 13 | a-Si | 3.771 | 29.3 |
| 14 | $SiO_2$ | 1.4635 | 107.6 |
| 15 | a-Si | 3.771 | 13.5 |
| 16 | $SiO_2$ | 1.4635 | 277.5 |
| Medium | Air | 1 | |

Figure 9A:
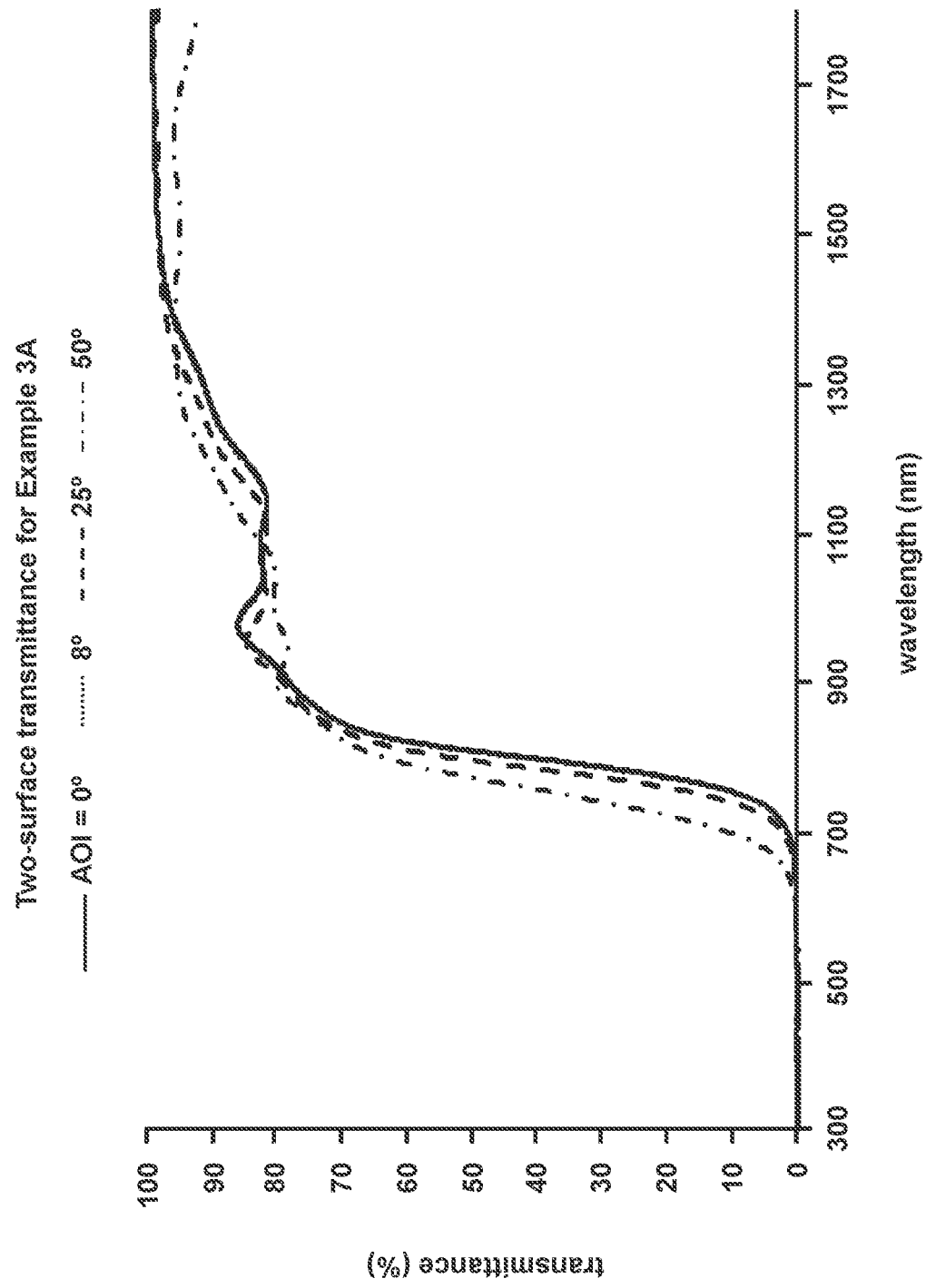
FIG. 9A is a graph pertaining to an example window, specifically Example 3A, illustrating percentage transmittance of electromagnetic radiation as a function of wavelength and angle of incidence of the electromagnetic radiation through the window.

As revealed in FIG. 9A, the quantity, thicknesses, and materials of the layered film 36 and the second layered film 38 have been configured so that the window 24 of Example 3A has a percentage transmittance of: (a) above 80 percent for all angles of incidence up to 50° for the approximate wavelength range of about 1000 nm to 1800 nm; and (b) above 90 percent for all angles of incidence up to 50° for the approximate wavelength range of 1300 nm to 1800 nm; but (c) below about 10 percent for all angles of incidence up to about 50° for the approximate wavelength range of 300 nm to about 700 nm.

Figure 9B:
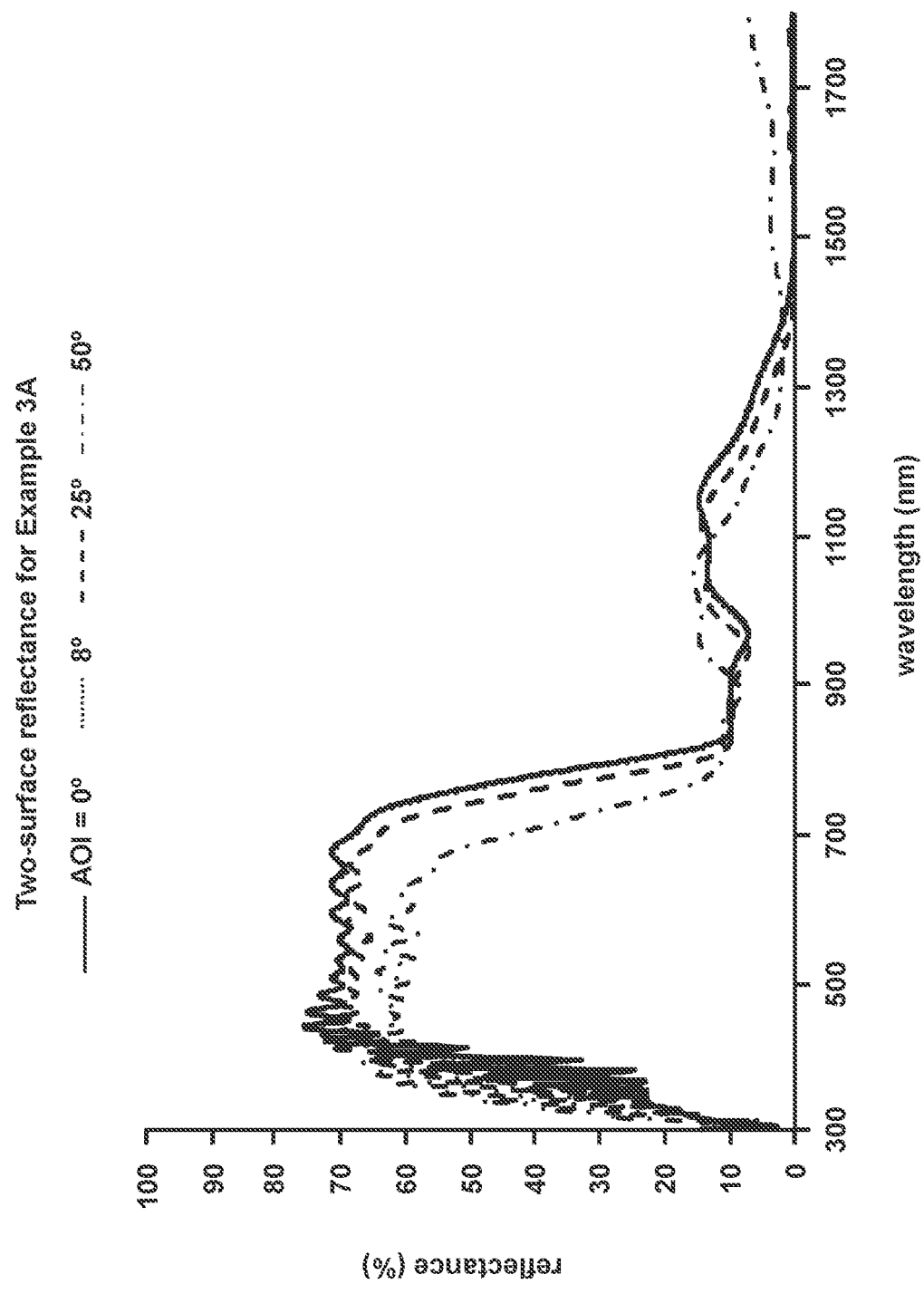
FIG. 9B is a graph pertaining to Example 3A, illustrating percentage reflectance of electromagnetic radiation as a function of wavelength and angle of incidence of the electromagnetic radiation off of the window.

As revealed in FIG. 9B, the quantity, thicknesses, and materials of the layered film 36 and the second layered film 38 have been configured so that the window 24 of Example 3A has a percentage reflectance off the window 24 of: (a) under 20 percent for all angles of incidence up to 50° for the approximate wavelength range of 800 nm to 1800 nm; and (b) under 10 percent for all angles of incidence up to 50° for the approximate wavelength range of 1250 nm to 1800 nm; but (b) above 50 percent for all angles of incidence up to 50° for the approximate wavelength range of 450 nm to 650 nm; and (c) above about 65 percent for all angles of incidence up to 8° for the wavelength range of about 450 nm to about 675 nm.

Example 4—The window 24 of Example 4 included a layered film 36 over a first surface 32 of a substrate 30 of an aluminosilicate glass (Corning code 2320), and a second layered film 38 over a second surface 34 of the substrate. The layered film 36 included seven (7) alternating layers of $SiO_2$ as the lower refractive index material 42 and $Si_3N_4$ as the higher refractive index material 40. The second layered film 38 included nineteen (19) alternating layers of $SiO_2$ as the lower refractive index material 42, and either amorphous silicon (a-Si) or $Si_3N_4$ as the higher refractive index material 40. Use of ultraviolet range and visible light absorbing amorphous silicon (a-Si) and $Si_3N_4$ as the higher refractive index materials 40 simultaneously combines reflectance and absorbance to create ultra-low percentage transmittance in the ultraviolet range and the visible light range while having high percentage transmittance at 1550 nm. The thicknesses of the layers of the layered film 36 and the second layered film 38 are configured as set forth in Table 4 below to provide the percentage transmittance and percentage reflectance as set forth in FIGS. 10A-10E. The maximized thickness layer of the high hardness material $Si_3N_4$ (5000 nm) as the higher refractive index material 40 is the second layer of the layered film 36 and adjacent the outermost layer of the layered film 36 providing the terminal surface 44 of the window 24.

TABLE 4

Example 4 Layer Design

| Layer | Material | Refractive Index @1550 nm | Physical Thickness (nm) |
|---|---|---|---|
| Medium | Air | 1 | |
| 1 | $SiO_2$ | 1.4635 | 264.7 |
| 2 | $Si_3N_4$ | 1.9615 | 5000.0 |
| 3 | $SiO_2$ | 1.4635 | 40.2 |
| 4 | $Si_3N_4$ | 1.9615 | 67.7 |
| 5 | $SiO_2$ | 1.4635 | 97.6 |
| 6 | $Si_3N_4$ | 1.9615 | 29.4 |
| 7 | $SiO_2$ | 1.4635 | 360.1 |
| Substrate | Aluminosilicate glass (2320) | 1.4916 | 1000000.0 |
| 8 | $SiO_2$ | 1.4635 | 118.0 |
| 9 | a-Si | 3.771 | 10.6 |
| 10 | $SiO_2$ | 1.4635 | 128.6 |
| 11 | a-Si | 3.771 | 21.7 |
| 12 | $SiO_2$ | 1.4635 | 104.8 |
| 13 | a-Si | 3.771 | 34.2 |
| 14 | $SiO_2$ | 1.4635 | 111.2 |
| 15 | a-Si | 3.771 | 27.6 |
| 16 | $SiO_2$ | 1.4635 | 125.6 |
| 17 | $Si_3N_4$ | 1.9615 | 129.2 |
| 18 | $SiO_2$ | 1.4635 | 193.5 |
| 19 | $Si_3N_4$ | 1.9615 | 123.1 |
| 20 | $SiO_2$ | 1.4635 | 156.8 |
| 21 | $Si_3N_4$ | 1.9615 | 85.1 |
| 22 | $SiO_2$ | 1.4635 | 188.3 |
| 23 | $Si_3N_4$ | 1.9615 | 108.1 |
| 24 | $SiO_2$ | 1.4635 | 158.0 |
| 25 | $Si_3N_4$ | 1.9615 | 137.6 |
| 26 | $SiO_2$ | 1.4635 | 366.4 |
| Medium | Air | 1 | |

Figure 10A:
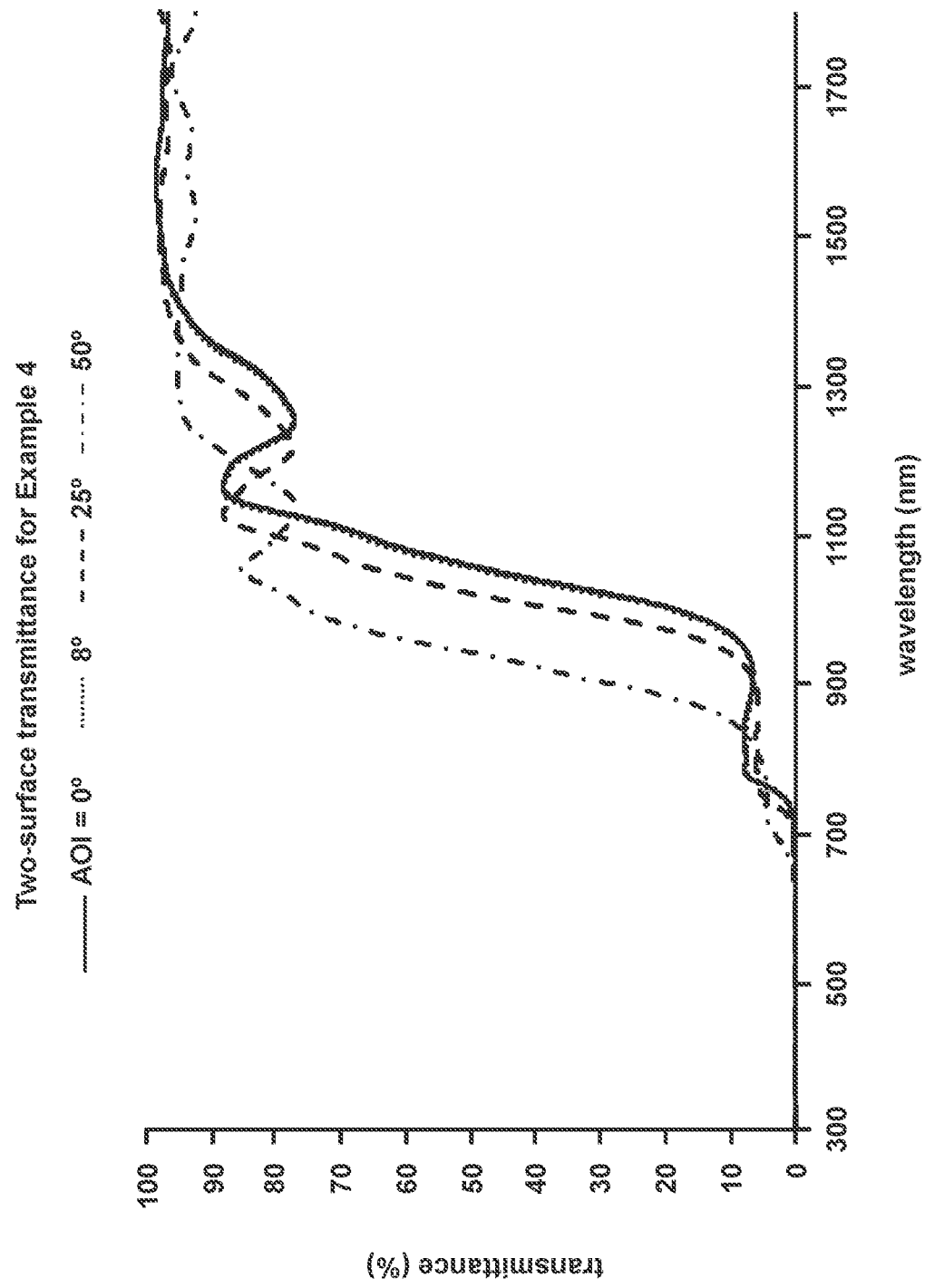
FIGS. 10A-10C are graphs pertaining to an example window, specifically Example 4, illustrating percentage transmittance of electromagnetic radiation as a function of wavelength and angle of incidence of the electromagnetic radiation through the window.
Figure 10B:
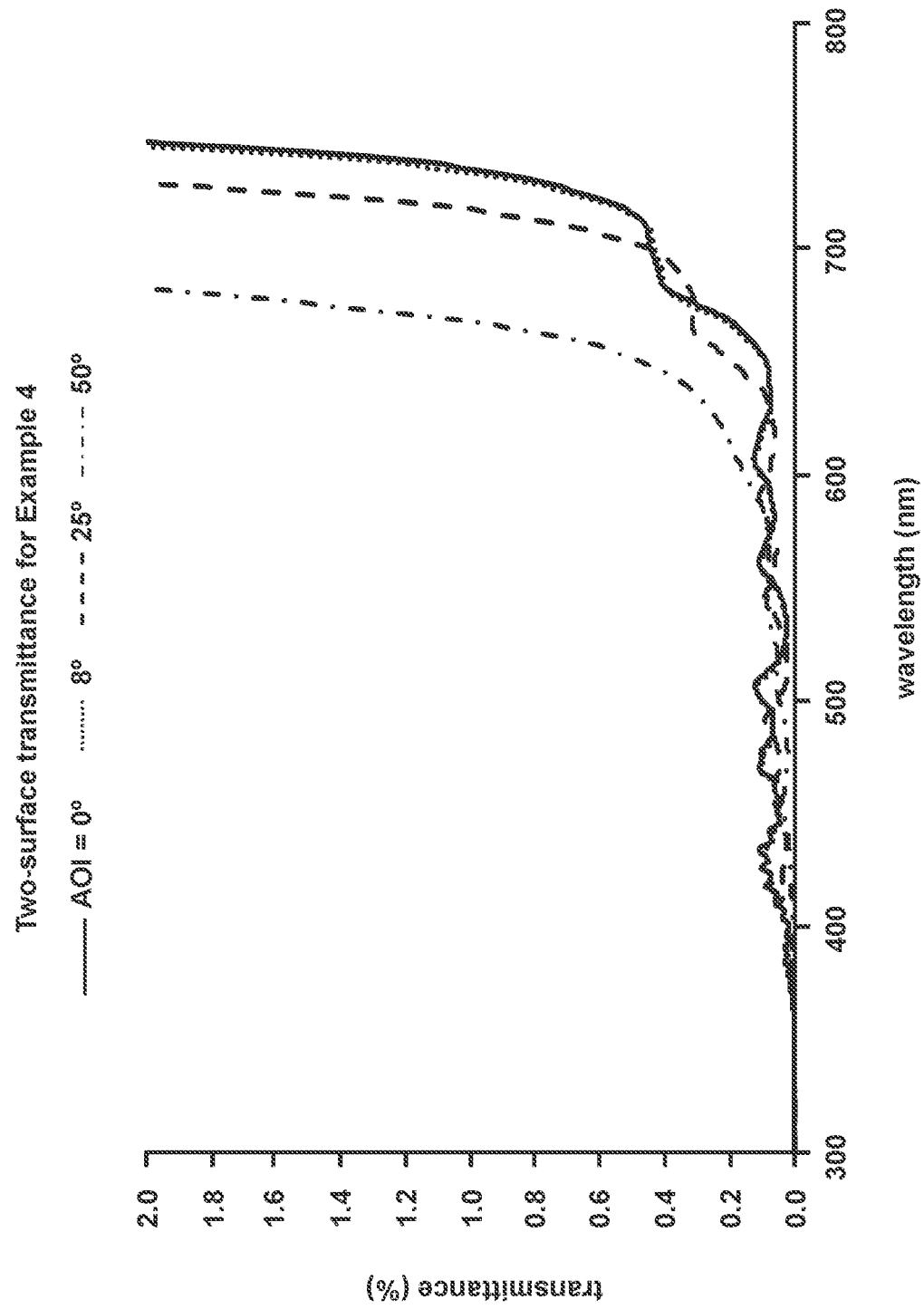
Figure 10C:
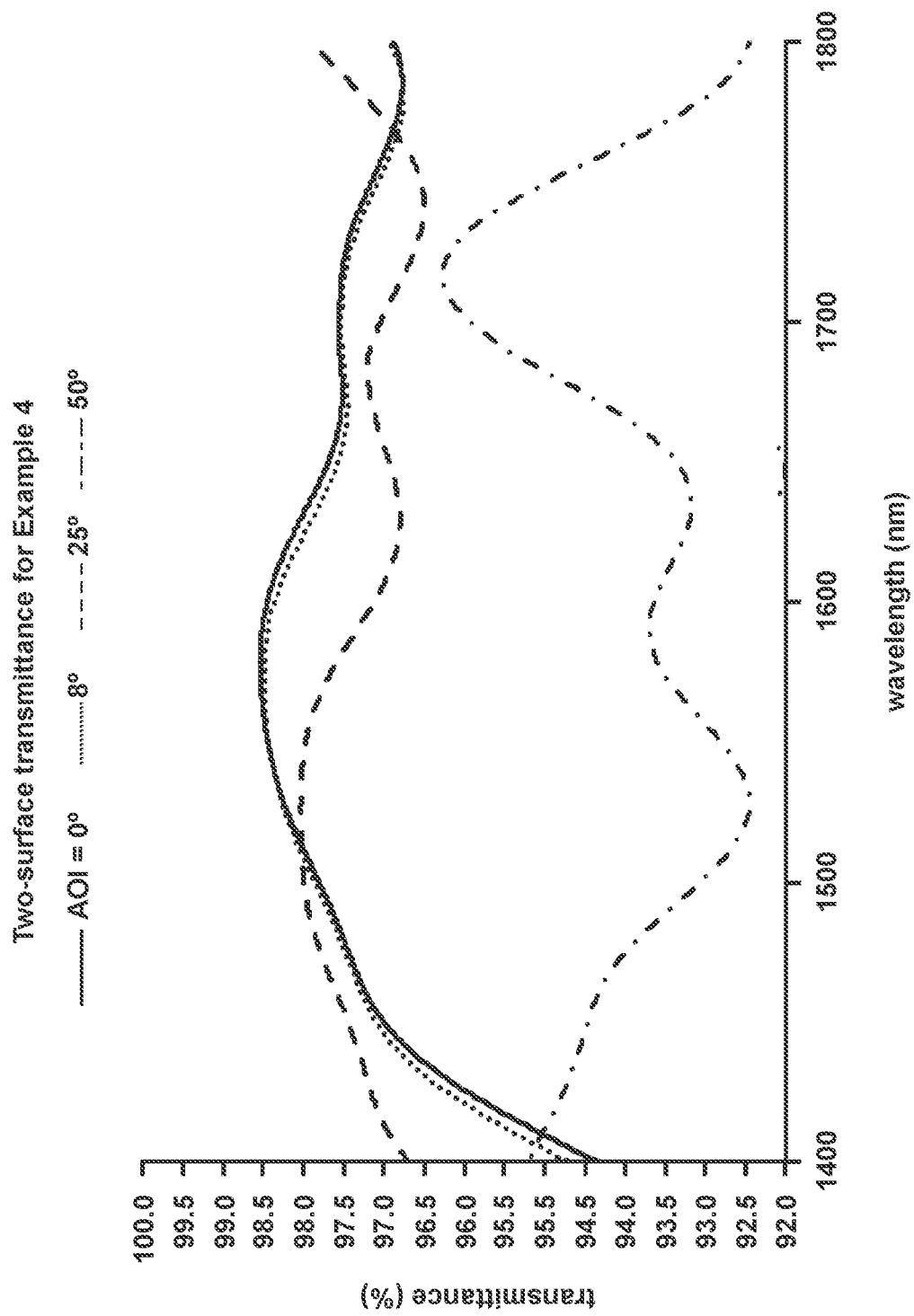

As revealed in FIG. 10A, the quantity, thicknesses, and materials of the layered film 36 and the second layered film 38 have been configured so that the window 24 of Example 4 has a percentage transmittance of: (a) above 90 percent for all angles of incidence up to 50° for the wavelength range of 1400 nm to 1800 nm; but (b) less than 10 percent for all angles of incidence up to 8° for the wavelength range of 300 nm to 950 nm. As revealed in FIG. 10B, the quantity, thicknesses, and materials of the layered film 36 and the second layered film 38 have been configured so that the window 24 of Example 4 has a percentage transmittance of: (a) less than 0.5 percent for all angles of incidence up to 25° for the wavelength range of 300 nm to 700 nm; (b) less than 0.2 percent for all angles of incidence up to 50° for the wavelength range of 300 nm to 600 nm; and (c) less than 0.15 percent for all angles of incidence up to 10° for the wavelength range of 300 nm to 650 nm. As revealed in FIG. 10C, the quantity, thicknesses, and materials of the layered film 36 and the second layered film 38 have been configured so that the window 24 of Example 3 has a percentage transmittance of: (a) greater than 98 percent for all angles of incidence up to 25° for the 1550 nm wavelength;, and (b) greater than 92.5 percent for all angles of incidence up to 50° for the 1550 nm wavelength.

Figure 10D:
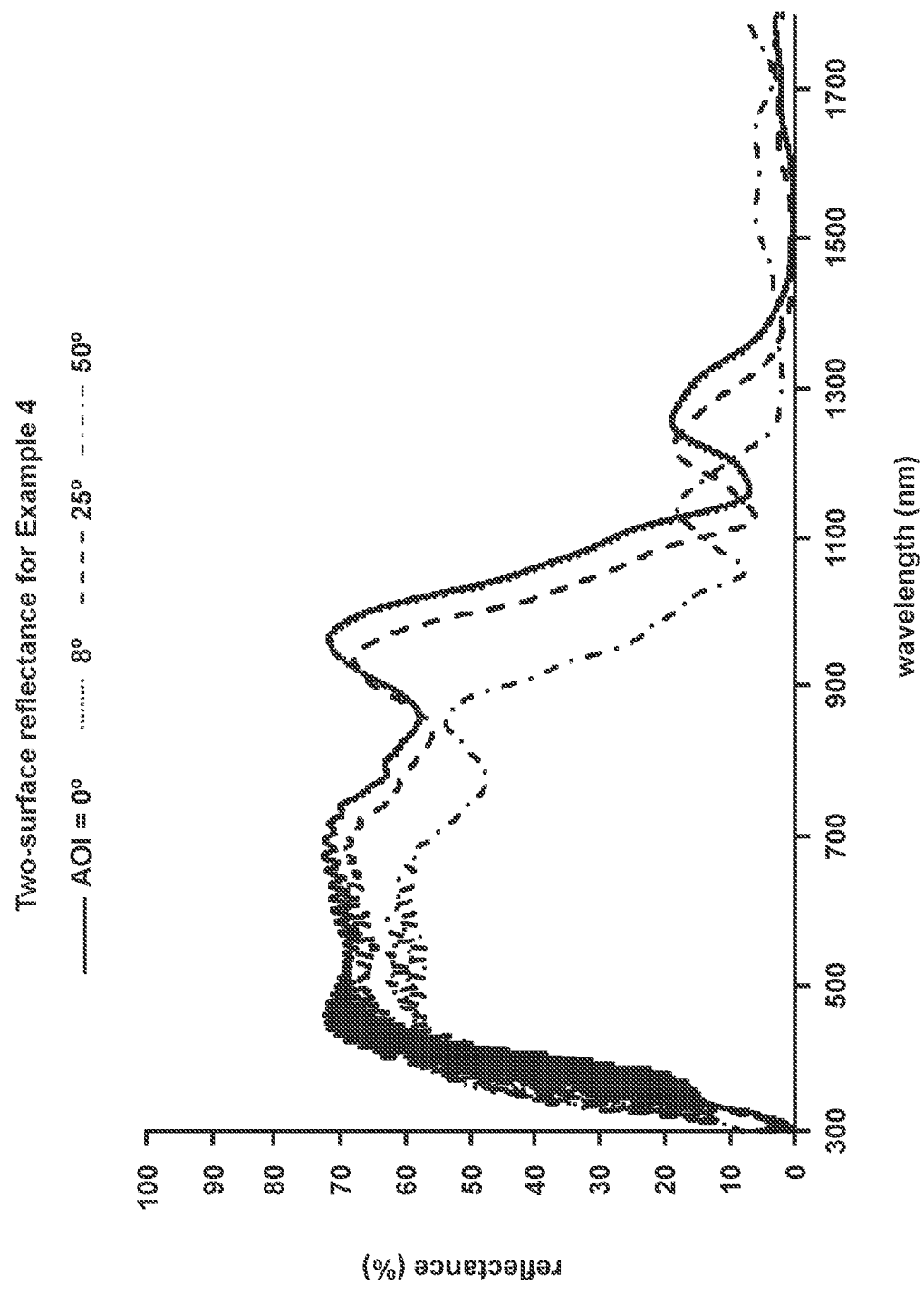
FIGS. 10D and 10E are graphs pertaining to Example 4, illustrating percentage reflectance of electromagnetic radiation as a function of wavelength and angle of incidence of the electromagnetic radiation off of the window.
Figure 10E:
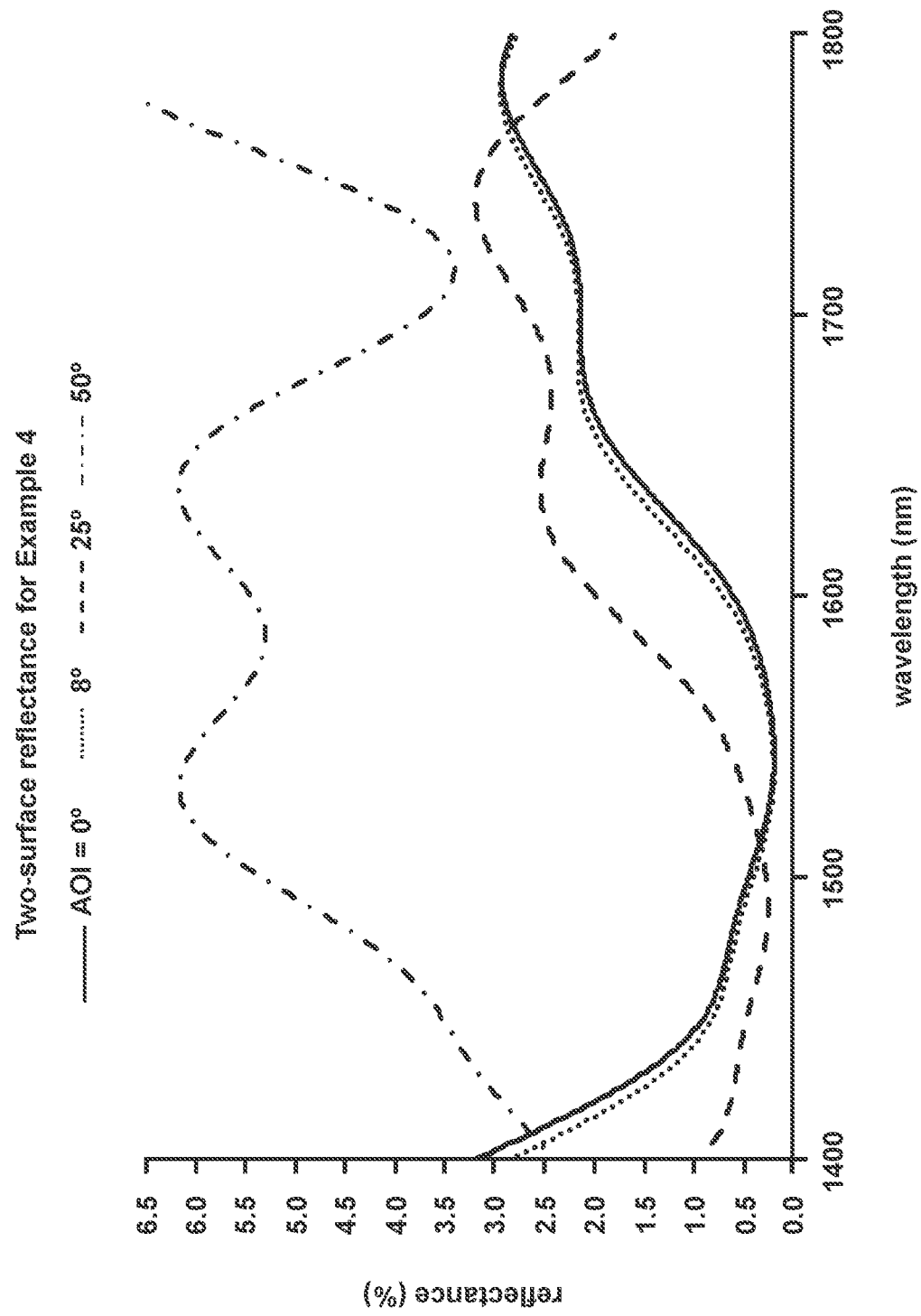

As revealed in FIG. 10D, the quantity, thicknesses, and materials of the layered film 36 and the second layered film 38 have been configured so that the window 24 of Example 4 has a percentage reflectance off the window 24 of below 10 percent for all angles of incidence up to 50° for the wavelength range of 1350 nm to 1800 nm. As revealed in FIG. 10E, the quantity, thicknesses, and materials of the layered film 36 and the second layered film 38 have been configured so that the window 24 of Example 4 has a percentage reflectance off of the window 24 of: (a) less than 0.3 percent for all angles of incidence up to 8° for the 1550 nm wavelength; (b) less than 1 percent for all angles of incidence up to 25° for the 1550 nm wavelength; and (c) less than 6.5 percent for all angles of incidence up to 50° for the 1550 nm wavelength.

Example 5—The window 24 of Example 5 included a layered film 36 over a first surface 32 of a substrate 30 of an aluminosilicate glass (Corning code 2320), and a second layered film 38 over a second surface 34 of the substrate. The layered film 36 included seven (7) alternating layers of $SiO_2$ as the lower refractive index material 42 and $Si_3N_4$ as the higher refractive index material 40. The second layered film 38 included seventeen (17) alternating layers of $SiO_2$ as the lower refractive index material 42, and either amorphous silicon (a-Si) or $Si_3N_4$ as the higher refractive index material 40. Use of ultraviolet range and visible light absorbing amorphous silicon (a-Si) and $Si_3N_4$ as the higher refractive index materials 40 simultaneously combines reflectance and absorbance to create an ultra-low percentage transmittance in the ultraviolet range and the visible light range while having a high percentage transmittance at both 905 nm 1550 nm, as well as low reflectance at the 905 nm wavelength. The thicknesses of the layers of the layered film 36 and the second layered film 38 are configured as set forth in Table 5 below to provide the percentage transmittance and percentage reflectance as set forth in FIGS. 11A-11E. The maximized thickness layer of the high hardness material $Si_3N_4$ (5000 nm) as the higher refractive index material 40 is the second layer of the layered film 36 and adjacent the outermost layer of the layered film 36 providing the terminal surface 44 of the window 24.

TABLE 5

Example 5 Layer Design

| Layer | Material | Refractive Index @1550 nm | Physical Thickness (nm) |
|---|---|---|---|
| Medium | Air | 1 | |
| 1 | $SiO_2$ | 1.4635 | 153.6 |
| 2 | $Si_3N_4$ | 1.9615 | 5000.0 |
| 3 | $SiO_2$ | 1.4635 | 40.2 |
| 4 | $Si_3N_4$ | 1.9615 | 67.7 |
| 5 | $SiO_2$ | 1.4635 | 97.6 |
| 6 | $Si_3N_4$ | 1.9615 | 29.4 |
| 7 | $SiO_2$ | 1.4635 | 360.1 |
| Substrate | Aluminosilicate glass (2320) | 1.4916 | 1000000.0 |
| 8 | $SiO_2$ | 1.4635 | 8.4 |
| 9 | a-Si | 3.771 | 8.1 |
| 10 | $SiO_2$ | 1.4635 | 108.3 |
| 11 | a-Si | 3.771 | 11.8 |
| 12 | $SiO_2$ | 1.4635 | 170.4 |
| 13 | a-Si | 3.771 | 8.7 |
| 14 | $SiO_2$ | 1.4635 | 117.1 |
| 15 | a-Si | 3.771 | 15.0 |
| 16 | $SiO_2$ | 1.4635 | 99.0 |

TABLE 5-continued

Example 5 Layer Design

| Layer | Material | Refractive Index @1550 nm | Physical Thickness (nm) |
|---|---|---|---|
| 17 | $Si_3N_4$ | 1.9615 | 74.4 |
| 18 | $SiO_2$ | 1.4635 | 101.3 |
| 19 | $Si_3N_4$ | 1.9615 | 81.6 |
| 20 | $SiO_2$ | 1.4635 | 143.0 |
| 21 | $Si_3N_4$ | 1.9615 | 67.8 |
| 22 | $SiO_2$ | 1.4635 | 90.2 |
| 23 | $Si_3N_4$ | 1.9615 | 99.1 |
| 24 | $SiO_2$ | 1.4635 | 209.6 |
| Medium | Air | 1 | |

Figure 11A:
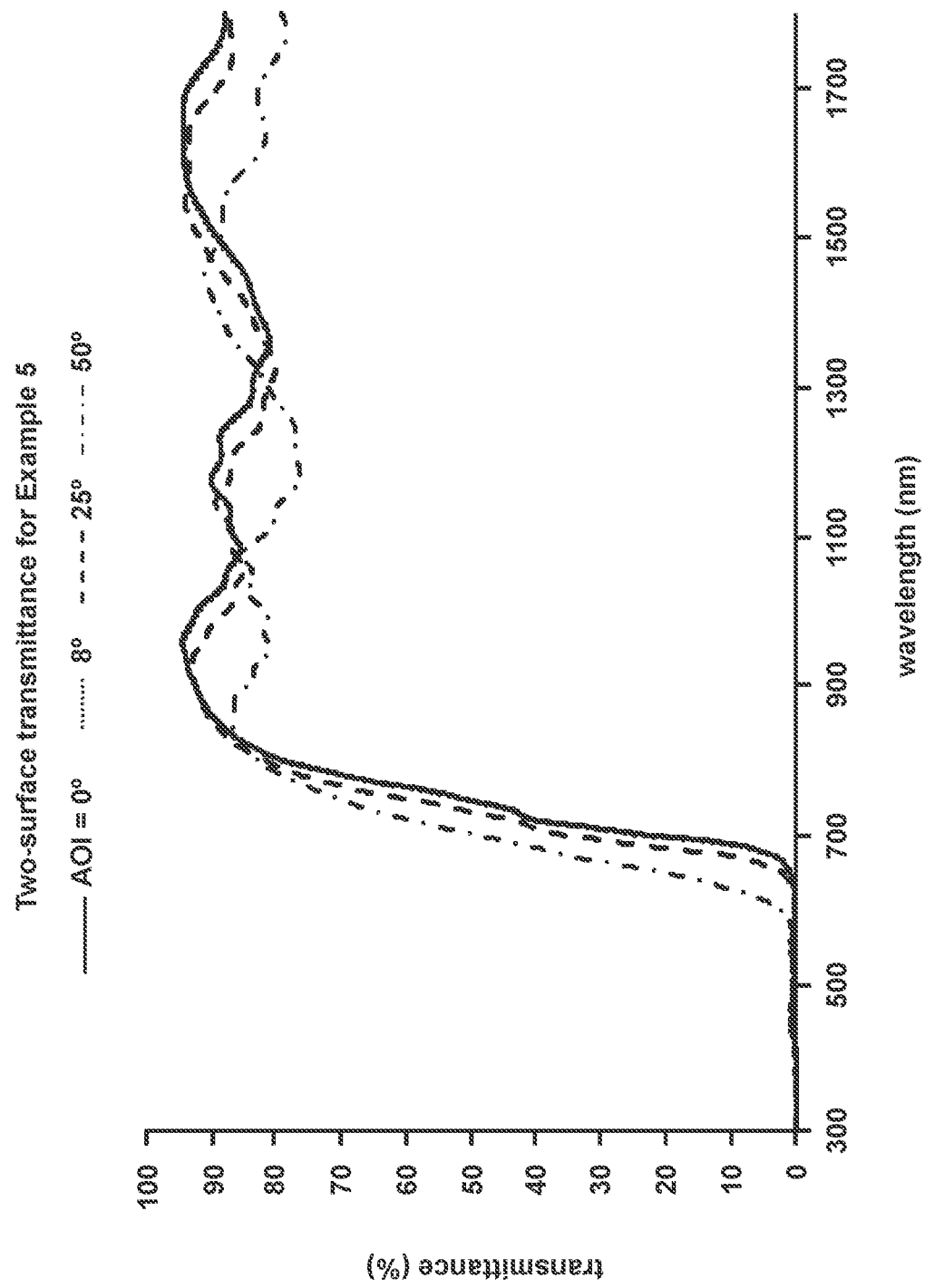
FIGS. 11A-11C are graphs pertaining to an example window, specifically Example 5, illustrating percentage transmittance of electromagnetic radiation as a function of wavelength and angle of incidence of the electromagnetic radiation through the window.
Figure 11B:
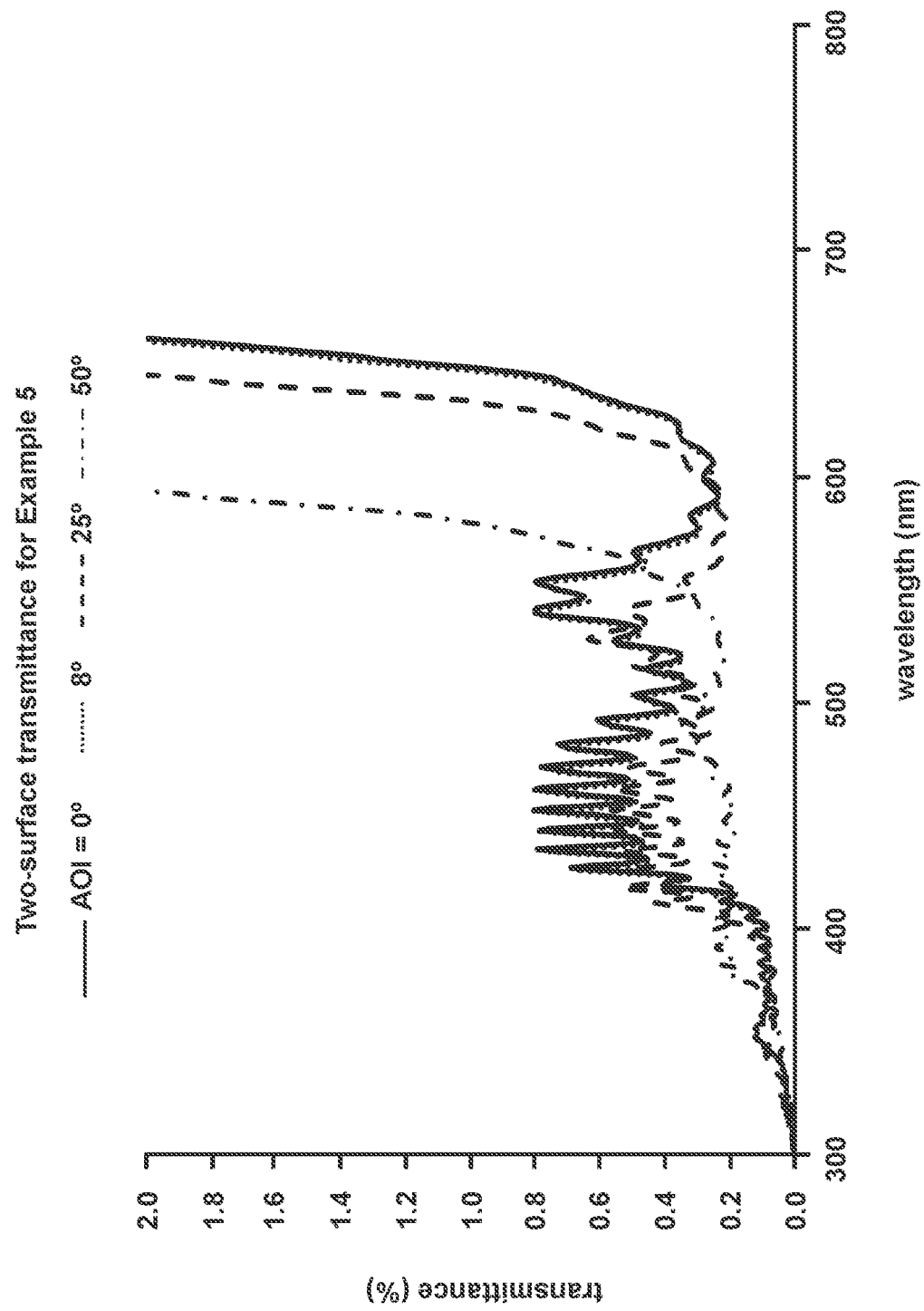
Figure 11C:
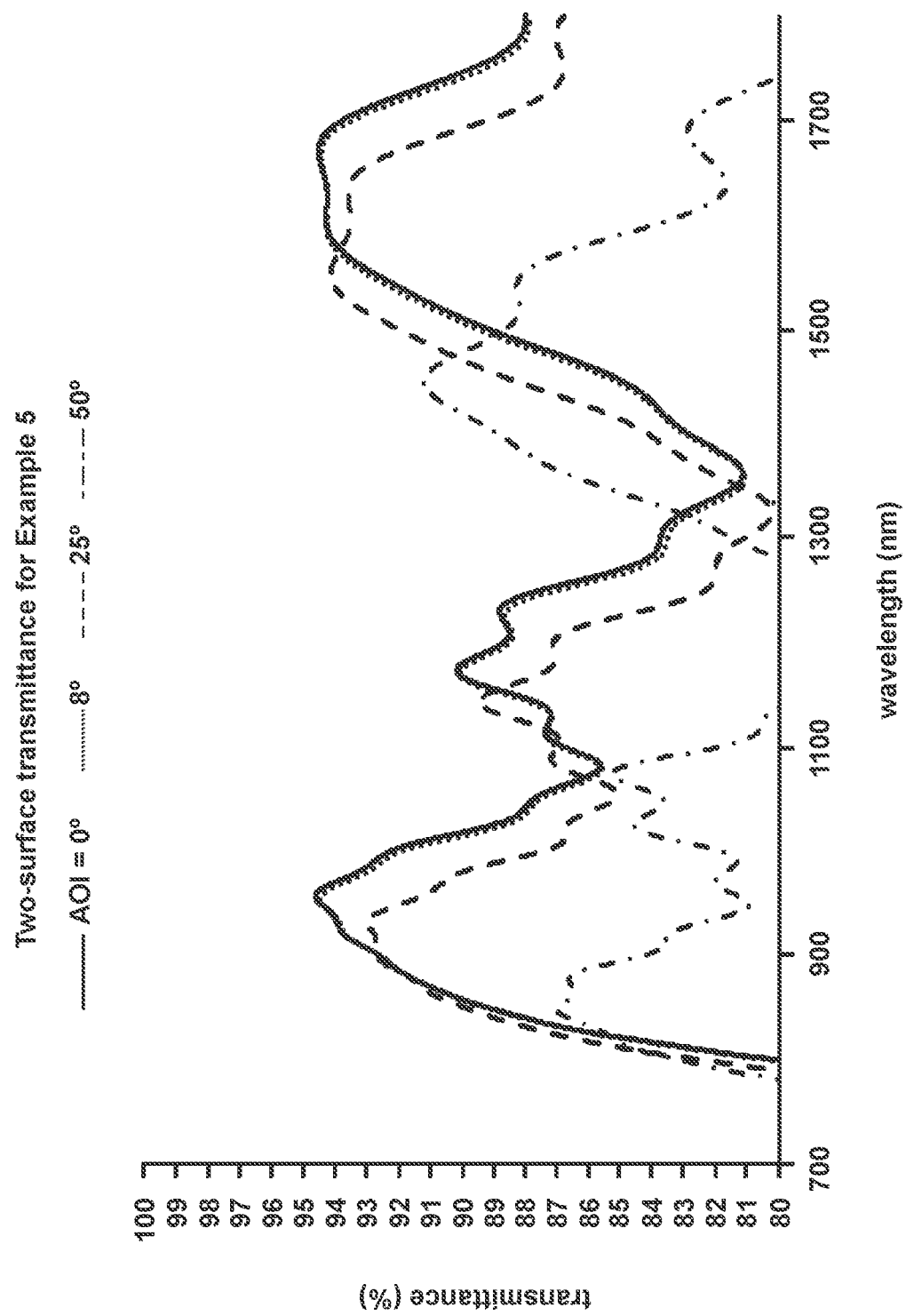

As revealed in FIG. 11A, the quantity, thicknesses, and materials of the layered film 36 and the second layered film 38 have been configured so that the window 24 of Example 5 has a percentage transmittance of: (a) above 75 percent for all angles of incidence up to 50° for the wavelength range of 800 nm to 1800 nm; and (b) below 10 percent for all angles of incidence up to 25° for the wavelength range of 300 nm to 650 nm. As revealed in FIG. 11B, the quantity, thicknesses, and materials of the layered film 36 and the second layered film 38 have been configured so that the window 24 of Example 5 has a percentage transmittance of: (a) less than 0.8 percent for all angles of incidence up to 25° for the wavelength range of 300 nm to 620 nm; and (b) less than 0.8 percent for all angles of incidence up to 50° for the wavelength range of 300 nm to about 575 nm. As revealed in FIG. 11C, the quantity, thicknesses, and materials of the layered film 36 and the second layered film 38 have been configured so that the window 24 of Example 5 has a percentage transmittance of: (a) greater than 88 percent at all angles of incidence up to 25° for the wavelength range of 850 nm to 980 nm; (b) greater than 88 percent at all angles of incidence up to 25° for the wavelength range of 1500 nm to 1700 nm; (c) greater than 90 percent at all angles of incidence up to 25° for the wavelength ranges of 870 nm to 970 nm and 1530 nm to 1680 nm; (d) greater than 92 percent at all angles of incidence up to 25° for the wavelength ranges of 895 nm to 945 nm and 1545 nm to 1650 nm; (e) greater than 83 percent at all angles of incidence up to 50° for the 905 nm wavelength; and (0 greater than 88 percent at all angles of incidence up to 50° for the 1550 nm wavelength.

Figure 11D:
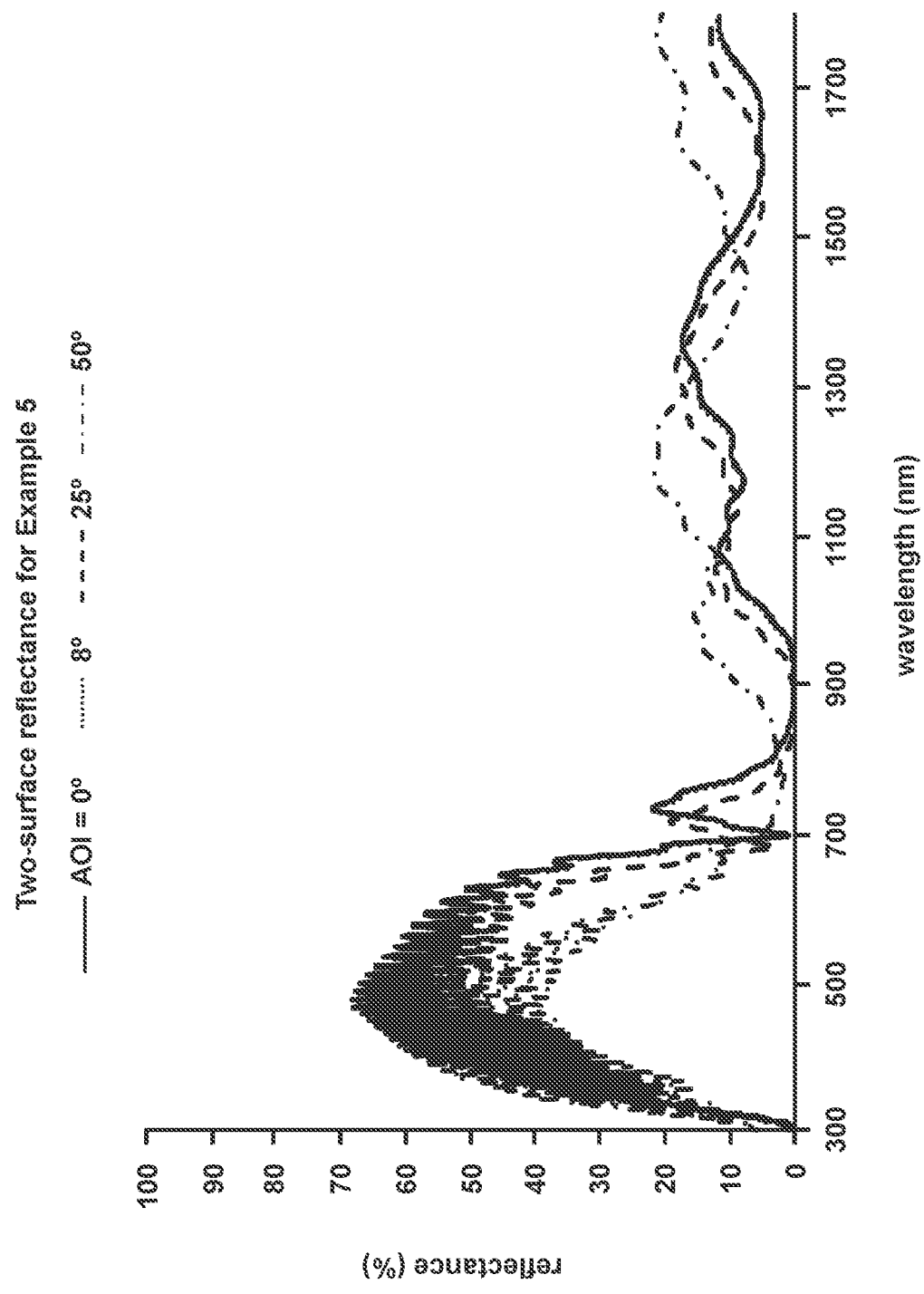
FIGS. 11D and 11E are graphs pertaining to Example 5, illustrating percentage reflectance of electromagnetic radiation as a function of wavelength and angle of incidence of the electromagnetic radiation off of the window.
Figure 11E:
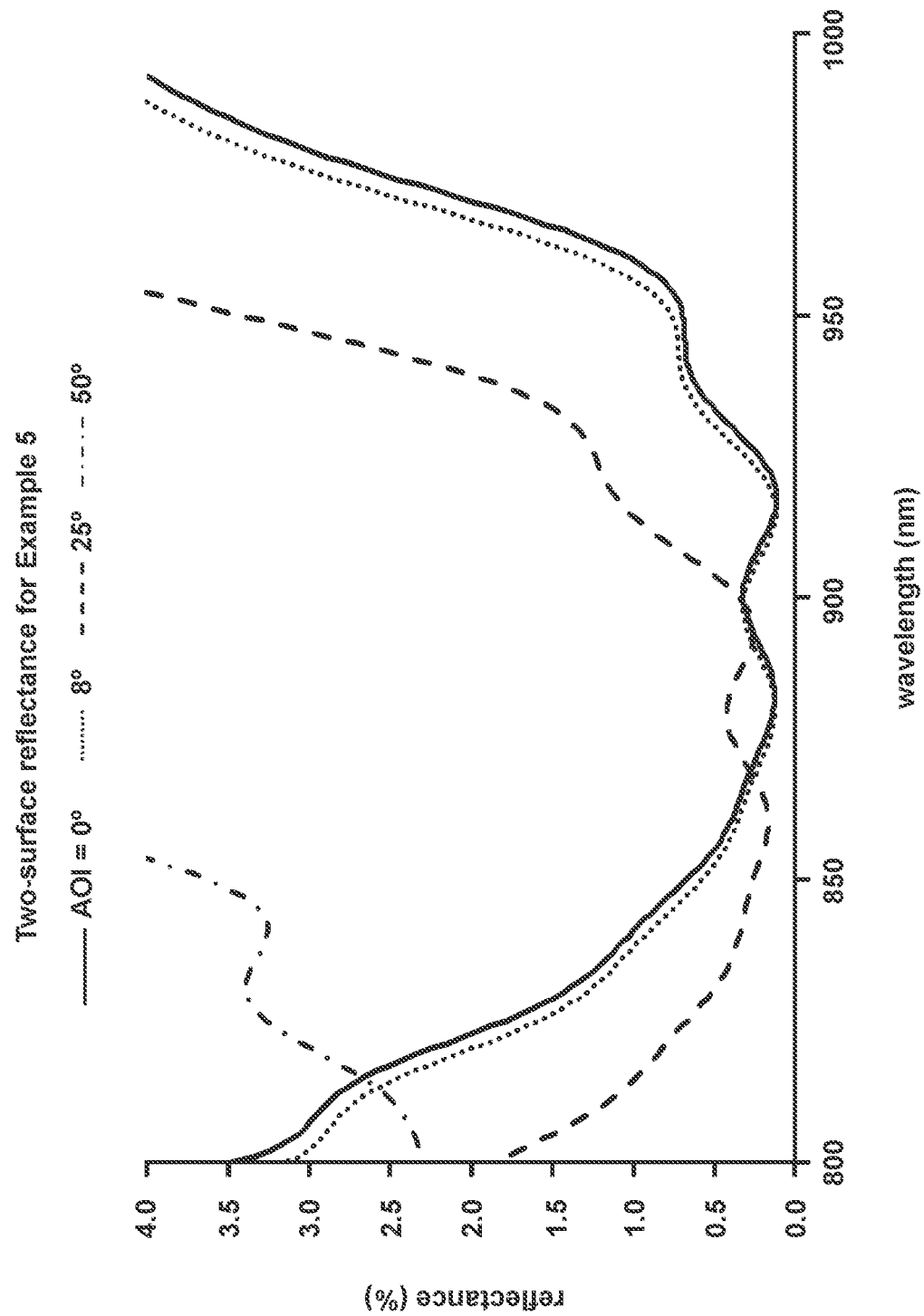

As revealed in FIG. 11D, the quantity, thicknesses, and materials of the layered film 36 and the second layered film 38 have been configured so that the window 24 of Example 5 has a percentage reflectance off the window 24 of: (a) below 25 percent for all angles of incidence up to 50° for the wavelength range of 700 nm to 1800 nm; and (b) below 7 percent for all angles of incidence up to 25° for the 1550 nm wavelength. As revealed in FIG. 11E, the quantity, thicknesses, and materials of the layered film 36 and the second layered film 38 have been configured so that the window 24 of Example 5 has a percentage reflectance off of the window 24 of: (a) less than 1 percent for all angles of incidence up to 8° for the wavelength range of 850 nm to 950 nm; and (b) less than 0.5 percent for all angles of incidence up to 25° for the 905 nm wavelength.

Aspect (1) pertains to a window for a sensing system comprising: a substrate that comprises a refractive index, a first surface, and a second surface, the first surface and the second surface being primary surfaces of the substrate; a layered film disposed on the first surface of the substrate, the layered film comprising alternating layers of one or more higher refractive index materials and one or more lower refractive index materials, each of the one or more higher refractive index materials and the one or more lower refractive index materials having a refractive index, and the refractive index of the one or more higher refractive index materials being greater than the refractive index of the one or more lower refractive index materials; and a maximum hardness, measured at the layered film and by the Berkovich Indenter Hardness Test, of at least 8 GPa, wherein the quantity, the thicknesses, and materials of the alternating layers of the layered film are configured so that the window has: an average percentage transmittance of greater than 75% for electromagnetic radiation having a wavelength of 1550 nm at normal or near normal incidence; and an average percentage reflectance of less than 10% for electromagnetic radiation having a wavelength of 1550 nm at any angle of incidence within the range of 0° to 8°.

Aspect (2) pertains to the window of Aspect (1), wherein the substrate has a region contiguous with the first surface that is under compressive stress, and the absolute value of a maximum of the compressive stress is at least 600 MPa.

Aspect (3) pertains to the window of Aspect (1) or Aspect (2), wherein the substrate is a glass substrate.

Aspect (4) pertains to the window of any one of Aspects (1) through (3), wherein the substrate has a thickness of between about 100 p.m and about 5 mm.

Aspect (5) pertains to the window of any one of Aspects (1) through (4), wherein the refractive index of the substrate for electromagnetic radiation having a wavelength of 1550 nm is from about 1.45 to about 1.55.

Aspect (6) pertains to the window of any one of Aspects (1) through (5), wherein the refractive index of the one or more higher refractive index materials is from about 1.7 to about 4.0, and wherein the refractive index of the one or more lower refractive index materials is from about 1.3 to about 1.6.

Aspect (7) pertains to the window of any one of Aspects (1) through (6), wherein a difference in the refractive index of any of the one or more higher refractive index materials and any of the one or more lower refractive index materials is about 0.5 or greater.

Aspect (8) pertains to the window of any one of Aspects (1) through (7), wherein the one or more lower refractive index materials comprises $SiO_2$, and wherein the one or more higher refractive index materials comprises $Si_3N_4$.

Aspect (9) pertains to the window of any one of Aspects (1) through (8), wherein the layer of the layered film that is farthest from the substrate forms a terminal surface material of the window, the terminal surface material of the window comprising the lower refractive index material, and wherein a layer of the one or more lower refractive index materials is disposed directly onto the first surface of the substrate.

Aspect (10) pertains to the window of any one of Aspects (1) through (9), wherein the maximum hardness, measured at the layered film and by the Berkovich Indenter Hardness Test, is at least 12 GPa.

Aspect (11) pertains to the window of any one of Aspects (1) through (10), wherein one of the layers of the one or more higher refractive index materials has a thickness of between about 500 nm and about 10,000mm.

Aspect (12) pertains to the window of any one of Aspects (1) through (11), wherein at least one layer of the one or more higher refractive index materials is 65% or more of the thickness of the layered film.

Aspect (13) pertains to the window of any one of Aspects (1) through (12), wherein the layer of the layered film that is farthest from the substrate forms a terminal surface material of the window, the terminal surface material of the window comprising the lower refractive index material, and wherein the terminal surface material has a thickness of between about 150 nm and about 310 nm.

Aspect (14) pertains to the window of any one of Aspects (1) through (13), wherein the quantity, the thicknesses, and materials of the alternating layers of the layered film are configured so that the window has: an average percentage transmittance of greater than 75% for electromagnetic radiation having any wavelength within the range of 1500 nm to 1600 nm at normal or near normal incidence; and an average reflectance of less than 10% for electromagnetic radiation having any wavelength within the range of 1500 nm to 1600 nm at any angle of incidence within the range of 0° to 8°.

Aspect (15) pertains to the window of any one of Aspects (1) through (14), wherein the quantity, the thicknesses, and materials of the alternating layers of the layered film are configured so that the window has: an average percentage transmittance of greater than 75% for electromagnetic radiation having wavelengths of 905 nm and 1550 nm at normal or near normal incidence; and an average percentage reflectance of less than 10% for electromagnetic radiation having wavelengths of 905 nm and 1550 nm at any angle of incidence within the range of 0° to 8°.

Aspect (16) pertains to the window of any one of Aspects (1) through (15), wherein the quantity, the thicknesses, and materials of the alternating layers of the layered film are configured so that the window has an average percentage transmittance of greater than 75% for electromagnetic radiation having any wavelength within the range of 880 nm to 1580 nm, or 850 nm to 1800 nm, at normal or near normal incidence.

Aspect (17) pertains to the window of any one of Aspects (1) through (16), wherein the quantity, the thicknesses, and materials of the alternating layers of the layered film are configured so that the window has: an average percentage transmittance of less than 10% for electromagnetic radiation having any wavelength within the range of 300 nm to 600 nm, at normal or near normal incidence; and an average percentage reflectance of more than 80% for electromagnetic radiation having any wavelength within the range of 300 nm to 600 nm, at any angle of incidence within the range of 0° to 8°.

Aspect (18) pertains to the window of any one of Aspects (1) through (17) further comprising: a second layered film disposed on the second surface of the substrate, the second layered film comprising alternating layers of the one or more higher refractive index materials and the one or more lower refractive index materials, each of the one or more higher refractive index materials and the one or more lower refractive index materials having a refractive index, and the refractive index of the one or more higher refractive index materials being greater than the refractive index of the one or more lower refractive index materials, wherein, the quantity, the thicknesses, and materials of the alternating layers of the layered film and the second layered film are configured so that the window has an average percentage transmittance of greater than 75% for electromagnetic radiation having a wavelength of 1550 nm at normal or near normal incidence.

Aspect (19) pertains to the window of Aspect (18), wherein a difference in the refractive index of any of the one or more higher refractive index materials of the second layered film and any of the one or more lower refractive index materials of the second layered film is about 2.0 or greater.

Aspect (20) pertains to the window of Aspect (18) or (Aspect (19), wherein the one or more lower refractive index materials of the second layered film comprises $SiO_2$, and wherein the one or more higher refractive index materials of the second layered film comprises amorphous silicon.

Aspect (21) pertains to the window of any one of Aspects (18) through (20), wherein the one or more lower refractive index materials of the layered film comprises $SiO_2$, wherein the one or more higher refractive index materials of the layered film comprises $Si_3N_4$, wherein the one or more lower refractive index materials of the second layered film comprises $SiO_2$, and wherein the one or more higher refractive index materials of the second layered film comprises amorphous silicon.

Aspect (22) pertains to the window of any one of Aspects (18) through (20), wherein the one or more lower refractive index materials of the layered film comprises $SiO_2$, wherein, the one or more higher refractive index materials of the layered film comprises $Si_3N_4$, wherein, the one or more lower refractive index materials of the second layered film comprises $SiO_2$, and wherein, the one or more higher refractive index materials of the second layered film comprises amorphous silicon and $Si_3N_4$.

Aspect (23) pertains to a LIDAR system comprising: an electromagnetic radiation emitter and sensor that emits electromagnetic radiation having a wavelength of 1550 nm; and a window in the path of the electromagnetic radiation, the window comprising: a substrate that comprises a refractive index, a first surface, and a second surface, the first surface and the second surface being primary surfaces of the substrate; a layered film disposed on the first surface of the substrate, the layered film comprising alternating layers of one or more higher refractive index materials and one or more lower refractive index materials, each of the one or more higher refractive index materials and the one or more lower refractive index materials having a refractive index, and the refractive index of the one or more higher refractive index materials being greater than the refractive index of the one or more lower refractive index materials; and a maximum hardness, measured at the layered film and by the Berkovich Indenter Hardness Test, of at least 8 GPa, wherein the quantity, the thicknesses, and materials of the alternating layers of the layered film are configured so that the window has: an average percentage transmittance of greater than 75% for electromagnetic radiation having a wavelength of 1550 nm at normal or near normal incidence; and an average percentage reflectance of less than 10% for electromagnetic radiation having a wavelength of 1550 nm at any angle of incidence within the range of 0° to 8°.

Aspect (24) pertains to the LIDAR system of Aspect (23), the window further comprising: a second layered film disposed on the second surface of the substrate, the second layered film comprising alternating layers of the one or more higher refractive index materials and the one or more lower refractive index materials, each of the one or more higher refractive index materials and the one or more lower refractive index materials having a refractive index, and the refractive index of the one or more higher refractive index materials being greater than the refractive index of the one or more lower refractive index materials, wherein, the quantity, the thicknesses, and materials of the alternating layers of the layered film and the second layered film are configured so that the window has an average percentage transmittance of greater than 75% for electromagnetic radiation having a wavelength of 1550 nm at normal or near normal incidence.

Aspect (25) pertains to the LIDAR system of Aspect (23) or Aspect (24), wherein the quantity, the thicknesses, and materials of the alternating layers of the layered film are configured so that the window has: an average percentage transmittance of greater than 75% for electromagnetic radiation having any wavelength within the range of 1500 nm to 1600 nm at normal or near normal incidence; and an average reflectance of less than 10% for electromagnetic radiation having any wavelength within the range of 1500 nm to 1600 nm at any angle of incidence within the range of 0° to 8°.

Aspect (26) pertains to the LIDAR system of any one of Aspects (23) through (25), wherein the quantity, the thicknesses, and materials of the alternating layers of the layered film are configured so that the window has: an average percentage transmittance of greater than 75% for electromagnetic radiation having wavelengths of 905 nm and 1550 nm at normal or near normal incidence; and an average percentage reflectance of less than 10% for electromagnetic radiation having wavelengths of 905 nm and 1550 nm at any angle of incidence within the range of 0° to 8°.

Aspect (27) pertains to the LIDAR system of any one of Aspects (23) through (26), wherein the quantity, the thicknesses, and materials of the alternating layers of the layered film are configured so that the window has an average percentage transmittance of greater than 75% for electromagnetic radiation having any wavelength within the range of 880 nm to 1580 nm, or 850 nm to 1800 nm, at normal or near normal incidence.

Aspect (28) pertains to the LIDAR system of any one of Aspects (23) through (27), wherein the quantity, the thicknesses, and materials of the alternating layers of the layered film are configured so that the window has: an average percentage transmittance of less than 10% for electromagnetic radiation having any wavelength within the range of 300 nm to 600 nm, at normal or near normal incidence; and an average percentage reflectance of more than 80% for electromagnetic radiation having any wavelength within the range of 300 nm to 600 nm, at any angle of incidence within the range of 0° to 8°.

It will be apparent to those skilled in the art that various modifications and variations can be made without departing from the spirit or scope of the claims.

What is claimed is:

1. A window for a sensing system comprising:
   a substrate that comprises a refractive index, a first surface, and a second surface, the first surface and the second surface being primary surfaces of the substrate;
   a layered film disposed on the first surface of the substrate, the layered film comprising alternating layers of one or more higher refractive index materials and one or more lower refractive index materials, each of the one or more higher refractive index materials and the one or more lower refractive index materials having a refractive index, and the refractive index of the one or more higher refractive index materials being greater than the refractive index of the one or more lower refractive index materials; and
   a maximum hardness, measured at the layered film and by the Berkovich Indenter Hardness Test, of at least 8 GPa,
   wherein the quantity, the thicknesses, and materials of the alternating layers of the layered film are configured so that the window has:
   an average percentage transmittance of greater than 75% for electromagnetic radiation having a wavelength of 1550 nm at normal or near normal incidence; and
   an average percentage reflectance of less than 10% for electromagnetic radiation having a wavelength of 1550 nm at any angle of incidence within the range of 0° to 8°, and wherein the one or more lower refractive index materials comprises SiO$_2$, and wherein a layer of SiO$_2$ is disposed directly onto the first surface of the substrate.

2. The window of claim 1, wherein:
the substrate is a glass substrate, and
the substrate has a region contiguous with the first surface that is under compressive stress, and the absolute value of a maximum of the compressive stress is at least 600 MPa.

3. The window of claim 1, wherein the refractive index of the one or more higher refractive index materials is from about 1.7 to about 4.0, and wherein the refractive index of the one or more lower refractive index materials is from about 1.3 to about 1.6.

4. The window of claim 1, wherein the one or more higher refractive index materials comprises Si$_3$N$_4$.

5. The window of claim 1, wherein the maximum hardness, measured at the layered film and by the Berkovich Indenter Hardness Test, is at least 12 GPa.

6. The window of claim 1, wherein one of the layers of the one or more higher refractive index materials has a thickness of between about 500 nm and about 10,000 mm.

7. The window of claim 1, wherein at least one layer of the one or more higher refractive index materials is 65% or more of the thickness of the layered film.

8. The window of claim 1, wherein the layer of the layered film that is farthest from the substrate forms a terminal surface material of the window, the terminal surface material of the window comprising the lower refractive index material, and wherein the terminal surface material has a thickness of between about 150 nm and about 310 nm.

9. The window of claim 1, wherein the quantity, the thicknesses, and materials of the alternating layers of the layered film are configured so that the window has:
an average percentage transmittance of greater than 75% for electromagnetic radiation having any wavelength within the range of 1500 nm to 1600 nm at normal or near normal incidence; and
an average reflectance of less than 10% for electromagnetic radiation having any wavelength within the range of 1500 nm to 1600 nm at any angle of incidence within the range of 0° to 8°.

10. The window of claim 1, wherein the quantity, the thicknesses, and materials of the alternating layers of the layered film are configured so that the window has:
an average percentage transmittance of greater than 75% for electromagnetic radiation having wavelengths of 905 nm and 1550 nm at normal or near normal incidence; and
an average percentage reflectance of less than 10% for electromagnetic radiation having wavelengths of 905 nm and 1550 nm at any angle of incidence within the range of 0° to 8°.

11. The window of claim 1, wherein the quantity, the thicknesses, and materials of the alternating layers of the layered film are configured so that the window has an average percentage transmittance of greater than 75% for electromagnetic radiation having any wavelength within the range of 880 nm to 1580 nm, or 850 nm to 1800 nm, at normal or near normal incidence.

12. The window of claim 1, wherein the quantity, the thicknesses, and materials of the alternating layers of the layered film are configured so that the window has:
an average percentage transmittance of less than 10% for electromagnetic radiation having any wavelength within the range of 300 nm to 600 nm, at normal or near normal incidence; and
an average percentage reflectance of more than 80% for electromagnetic radiation having any wavelength within the range of 300 nm to 600 nm, at any angle of incidence within the range of 0° to 8°.

13. The window of claim 1, further comprising:
a second layered film disposed on the second surface of the substrate, the second layered film comprising alternating layers of the one or more higher refractive index materials and the one or more lower refractive index materials, each of the one or more higher refractive index materials and the one or more lower refractive index materials having a refractive index, and the refractive index of the one or more higher refractive index materials being greater than the refractive index of the one or more lower refractive index materials,
wherein, the quantity, the thicknesses, and materials of the alternating layers of the layered film and the second layered film are configured so that the window has an average percentage transmittance of greater than 75% for electromagnetic radiation having a wavelength of 1550 nm at normal or near normal incidence.

14. The window of claim 13, wherein the one or more lower refractive index materials of the second layered film comprises SiO$_2$, and wherein the one or more higher refractive index materials of the second layered film comprises amorphous silicon.

15. The window of claim 13, wherein the one or more lower refractive index materials of the layered film comprises SiO$_2$, wherein the one or more higher refractive index materials of the layered film comprises Si$_3$N$_4$, wherein the one or more lower refractive index materials of the second layered film comprises SiO$_2$, and wherein the one or more higher refractive index materials of the second layered film comprises amorphous silicon.

16. A LIDAR system comprising:
an electromagnetic radiation emitter and sensor that emits electromagnetic radiation having a wavelength of 1550 nm; and
a window in the path of the electromagnetic radiation, the window comprising:
a substrate that comprises a refractive index, a first surface, and a second surface, the first surface and the second surface being primary surfaces of the substrate;
a layered film disposed on the first surface of the substrate, the layered film comprising alternating layers of one or more higher refractive index materials and one or more lower refractive index materials, each of the one or more higher refractive index materials and the one or more lower refractive index materials having a refractive index, and the refractive index of the one or more higher refractive index materials being greater than the refractive index of the one or more lower refractive index materials; and
a maximum hardness, measured at the layered film and by the Berkovich Indenter Hardness Test, of at least 8 GPa,
wherein the quantity, the thicknesses, and materials of the alternating layers of the layered film are configured so that the window has:
an average percentage transmittance of greater than 75% for electromagnetic radiation having a wavelength of 1550 nm at normal or near normal incidence; and an average percentage reflectance of less than 10% for electromagnetic radiation having a wavelength of 1550 nm at any angle of incidence within the range of 0° to 8°, and wherein the one or more lower refractive index materials comprises SiO$_2$, and wherein a layer of SiO$_2$ is disposed directly onto the first surface of the substrate.

17. The LIDAR system of claim 16, the window further comprising:

a second layered film disposed on the second surface of the substrate, the second layered film comprising alternating layers of the one or more higher refractive index materials and the one or more lower refractive index materials, each of the one or more higher refractive index materials and the one or more lower refractive index materials having a refractive index, and the refractive index of the one or more higher refractive index materials being greater than the refractive index of the one or more lower refractive index materials, wherein, the quantity, the thicknesses, and materials of the alternating layers of the layered film and the second layered film are configured so that the window has an average percentage transmittance of greater than 75% for electromagnetic radiation having a wavelength of 1550 nm at normal or near normal incidence.

18. The LIDAR system of claim 16, wherein the quantity, the thicknesses, and materials of the alternating layers of the layered film are configured so that the window has:

an average percentage transmittance of greater than 75% for electromagnetic radiation having any wavelength within the range of 1500 nm to 1600 nm at normal or near normal incidence;

an average reflectance of less than 10% for electromagnetic radiation having any wavelength within the range of 1500 nm to 1600 nm at any angle of incidence within the range of 0° to 8°, an average percentage transmittance of greater than 75% for electromagnetic radiation having wavelengths of 905 nm and 1550 nm at normal or near normal incidence; and an average percentage reflectance of less than 10% for electromagnetic radiation having wavelengths of 905 nm and 1550 nm at any angle of incidence within the range of 0° to 8°.

19. The LIDAR system of claim 16, wherein the quantity, the thicknesses, and materials of the alternating layers of the layered film are configured so that the window has an average percentage transmittance of greater than 75% for electromagnetic radiation having any wavelength within the range of 880 nm to 1580 nm, or 850 nm to 1800 nm, at normal or near normal incidence.

20. The LIDAR system of claim 16, wherein the quantity, the thicknesses, and materials of the alternating layers of the layered film are configured so that the window has:

an average percentage transmittance of less than 10% for electromagnetic radiation having any wavelength within the range of 300 nm to 600 nm, at normal or near normal incidence; and an average percentage reflectance of more than 80% for electromagnetic radiation having any wavelength within the range of 300 nm to 600 nm, at any angle of incidence within the range of 0° to 8°.

* * * * *